United States Patent
Brunel et al.

(10) Patent No.: US 10,924,164 B2
(45) Date of Patent: Feb. 16, 2021

(54) BEAMFORMING COMMUNICATION SYSTEMS WITH POWER CONTROL BASED ON ANTENNA PATTERN CONFIGURATION

(71) Applicant: Skyworks Solutions, Inc., Woburn, MA (US)

(72) Inventors: Dominique Michel Yves Brunel, Antibes (FR); William J. Domino, Yorba Linda, CA (US); Stephen Joseph Kovacic, Ottawa (CA)

(*) Notice: Subject to any disclaimer, the term of this patent is extended or adjusted under 35 U.S.C. 154(b) by 0 days.

(21) Appl. No.: 16/421,065

(22) Filed: May 23, 2019

(65) Prior Publication Data
US 2019/0372630 A1    Dec. 5, 2019

Related U.S. Application Data

(60) Provisional application No. 62/677,298, filed on May 29, 2018, provisional application No. 62/703,671, filed on Jul. 26, 2018.

(51) Int. Cl.
| H04B 7/02 | (2018.01) |
| H04B 7/0426 | (2017.01) |
| H04B 17/13 | (2015.01) |
| H04B 7/06 | (2006.01) |

(52) U.S. Cl.
CPC ......... H04B 7/0426 (2013.01); H04B 7/0617 (2013.01); H04B 17/13 (2015.01)

(58) Field of Classification Search
CPC ..... H04B 7/0426; H04B 17/13; H04B 7/0617
USPC ................ 375/267, 260, 259, 219, 295, 316
See application file for complete search history.

(56) References Cited

U.S. PATENT DOCUMENTS

| 6,122,260 A | 9/2000 | Liu et al. |
| 6,377,812 B1 | 4/2002 | Rashid-farrokhi et al. |
| 6,453,176 B1 | 9/2002 | Lopes et al. |
| 6,539,010 B1 | 3/2003 | Hagerman et al. |
| 6,980,527 B1 | 12/2005 | Liu et al. |

(Continued)

FOREIGN PATENT DOCUMENTS

KR    2003-0039903 A    5/2003

OTHER PUBLICATIONS

International Search Report and Written Opinion for International Application No. PCT/US2019/033767 dated Sep. 18, 2019 in 9 pages.

(Continued)

*Primary Examiner* — Zewdu A Kassa
(74) *Attorney, Agent, or Firm* — Knobbe, Martens, Olson & Bear, LLP

(57) ABSTRACT

Apparatus and methods for beamforming communication systems with power control based on antenna pattern configuration are provided. In certain embodiments, a beamforming communication system includes an antenna array including a plurality of antenna elements. The beamforming communication system further includes a plurality of signal conditioning circuits operatively associated with the antenna elements, and an antenna array management circuit that generates a plurality of control signals that individually control the signal conditioning circuits. The antenna array management circuit achieves a desired level of power control based on generating the control signals to select an antenna pattern configuration associated with a desired power control level.

20 Claims, 38 Drawing Sheets

(56) References Cited

U.S. PATENT DOCUMENTS

| | | |
|---|---|---|
| 7,248,841 B2 | 7/2007 | Agee et al. |
| 7,260,141 B2 | 8/2007 | Bierly et al. |
| 7,392,011 B1 | 6/2008 | Jacomb-Hood |
| 7,529,222 B2 | 5/2009 | Kim et al. |
| 7,702,029 B2 | 4/2010 | Kotecha et al. |
| 7,761,059 B2 | 7/2010 | Lau |
| 7,778,599 B2 | 8/2010 | Li et al. |
| 7,864,725 B2 | 1/2011 | Li et al. |
| 7,881,265 B2 | 2/2011 | Koo et al. |
| 7,899,414 B2 | 3/2011 | Sugar et al. |
| 8,363,744 B2 | 1/2013 | Agee et al. |
| 8,433,241 B2 | 4/2013 | Dutta et al. |
| 8,451,928 B2 | 5/2013 | Agee et al. |
| 8,451,929 B2 | 5/2013 | Agee et al. |
| 8,537,922 B2 | 9/2013 | Wang et al. |
| 8,626,104 B2 | 1/2014 | Huang et al. |
| 8,699,968 B2 | 4/2014 | Harel |
| 8,838,051 B1 | 9/2014 | Su et al. |
| 8,855,702 B2 | 10/2014 | Kwon et al. |
| 8,923,218 B2 | 12/2014 | Luo et al. |
| 8,923,772 B2 | 12/2014 | Yu et al. |
| 9,020,518 B2 | 4/2015 | Huang et al. |
| 9,025,477 B2 | 5/2015 | Kazmi et al. |
| 9,059,760 B2 | 6/2015 | Jiang et al. |
| 9,065,528 B2 | 6/2015 | Frenger et al. |
| 9,167,535 B2 | 10/2015 | Christoffersson et al. |
| 9,362,991 B2 | 6/2016 | Maltsev et al. |
| 9,402,237 B2 | 7/2016 | Harel |
| 9,407,341 B2 | 8/2016 | Kazmi et al. |
| 9,438,323 B2 | 9/2016 | Tian et al. |
| 9,871,568 B2 | 1/2018 | Jung et al. |
| 9,948,439 B2 | 4/2018 | Kwak et al. |
| 9,948,488 B2 | 4/2018 | Li et al. |
| 9,986,461 B2 | 5/2018 | Dao et al. |
| 10,038,480 B2 | 7/2018 | Kim et al. |
| 10,148,400 B2 | 12/2018 | Zhang et al. |
| 10,164,697 B2 | 12/2018 | Aryafar et al. |
| 10,211,904 B2 | 2/2019 | Hessler et al. |
| 10,321,412 B2 | 6/2019 | Meng |
| 10,341,992 B2 | 7/2019 | Pelletier et al. |
| 2005/0078763 A1* | 4/2005 | Choi ................. H04L 27/2626 375/267 |
| 2008/0137577 A1 | 6/2008 | Habetha |
| 2010/0103877 A1 | 4/2010 | Wang et al. |
| 2010/0231452 A1 | 9/2010 | Babakhani et al. |
| 2011/0098055 A1 | 4/2011 | Kwon et al. |
| 2011/0210901 A1 | 9/2011 | Tikka et al. |
| 2012/0202555 A1 | 8/2012 | Bergman et al. |
| 2013/0121342 A1 | 5/2013 | Kim |
| 2014/0079155 A1 | 3/2014 | Wang et al. |
| 2014/0179249 A1 | 6/2014 | Burgener et al. |
| 2014/0187174 A1* | 7/2014 | Safavi ................. H01Q 3/24 455/73 |
| 2015/0244449 A1 | 8/2015 | Frenger et al. |
| 2016/0095107 A1 | 3/2016 | Negus et al. |
| 2017/0142757 A1 | 5/2017 | Mckibben et al. |
| 2017/0201301 A1 | 7/2017 | Kotecha et al. |
| 2017/0222315 A1* | 8/2017 | Hozouri ............. H04W 72/085 |
| 2017/0332359 A1 | 11/2017 | Tsai et al. |
| 2018/0084502 A1 | 3/2018 | Choi et al. |
| 2018/0167177 A1 | 6/2018 | Huang et al. |
| 2018/0192375 A1 | 7/2018 | Xia et al. |
| 2018/0198204 A1 | 7/2018 | Kovacic |
| 2018/0224490 A1 | 8/2018 | Brunel et al. |
| 2018/0227034 A1 | 8/2018 | Brunel et al. |
| 2018/0262994 A1* | 9/2018 | Park ................. H04W 52/52 |
| 2018/0324603 A1 | 11/2018 | Hessler et al. |
| 2018/0367267 A1 | 12/2018 | Caretti et al. |
| 2019/0007115 A1 | 1/2019 | Luong et al. |
| 2019/0089566 A1 | 3/2019 | Li et al. |
| 2019/0132033 A1 | 5/2019 | Akkarakaran et al. |
| 2019/0173540 A1 | 6/2019 | Kotecha et al. |

OTHER PUBLICATIONS

Kim et al., "A 28-GHz CMOS Direct Conversion Transceiver With Packaged 2 x 4 Antenna Array for 5G Cellular System" IEEE Journal of Solid-State Circuits, vol. 53, No. 5, May 2018, in 15 pages.

* cited by examiner

FIG. 9

BEAMFORMING COMMUNICATION SYSTEMS WITH POWER CONTROL BASED ON ANTENNA PATTERN CONFIGURATION

CROSS-REFERENCE TO RELATED APPLICATIONS

This application claims the benefit of priority under 35 U.S.C. § 119 of U.S. Provisional Patent Application No. 62/703,671, filed Jul. 26, 2018 and titled "BEAMFORMING COMMUNICATION SYSTEMS WITH POWER CONTROL BASED ON ANTENNA PATTERN CONFIGURATION," and of U.S. Provisional Patent Application No. 62/677,298, filed May 29, 2018 and titled "BEAMFORMING COMMUNICATION SYSTEMS WITH POWER CONTROL BASED ON ANTENNA PATTERN CONFIGURATION," each of which is herein incorporated by reference in its entirety.

BACKGROUND

Technical Field

Embodiments of the invention relate to electronic systems, and in particular, to radio frequency (RF) electronics.

Description of Related Technology

A communication system can include a transceiver, a front end, and one or more antennas for wirelessly transmitting and/or receiving signals. The front end can include low noise amplifier(s) for amplifying relatively weak signals received via the antenna(s), and power amplifier(s) for boosting signals for transmission via the antenna(s).

Examples of communication systems include, but are not limited to, mobile phones, tablets, base stations, network access points, customer-premises equipment (CPE), laptops, and wearable electronics.

SUMMARY

In certain embodiments, the present disclosure relates to a beamforming communication system. The beamforming communication system includes an antenna array including a plurality of antenna elements, a plurality of signal conditioning circuits each operatively associated with a corresponding one of the plurality of antenna elements, and an antenna array management circuit configured to generate a plurality of control signals each operable to individually control a corresponding one of the plurality of signal conditioning circuits to operate the antenna array in a selected antenna pattern configuration. The selected antenna pattern configuration is chosen from a plurality of antenna pattern configurations providing different levels of power control.

In various embodiments, the plurality of control signals are each operable to set the corresponding signal conditioning circuit in an on state or an off state.

In a number of embodiments, the plurality of control signals are each operable to set the corresponding signal conditioning circuit in an on state, an off state, or an attenuated state, the attenuated state providing a portion of the gain provided by the on state.

In several embodiments, the antenna array is a dual polarization antenna array, and the selected antenna pattern configuration provides power control for at least one antenna polarization.

In various embodiments, the selected antenna pattern configuration provides a coarse power control adjustment. In accordance with a number of embodiments, the selected antenna pattern configuration includes one or more active antenna elements, and the antenna array management circuit is further configured to provide a fine power control adjustment by setting a signal path gain of each of the one or more active antenna elements.

In some embodiments, the antenna array is configured for wireless transmission, and the plurality of antenna pattern configurations provide different steps of effective isotropic radiated power.

In a number of embodiments, the antenna array is configured for wireless reception, and the plurality of antenna pattern configurations provide different values of effective isotropic sensitivity.

In several embodiments, the beamforming communication system further includes a plurality of antenna termination circuits each connected to a corresponding one of the plurality of antenna elements, and the antenna array management circuit is further configured to control the plurality of antenna termination circuits based on the selected antenna pattern configuration. According to various embodiments, the selected antenna pattern configuration includes one or more inactive antenna elements, and the antenna array management circuit is further configured to terminate each of the one or more inactive antenna elements using the corresponding one of the plurality of antenna termination circuits.

In some embodiments, the beamforming communication system further includes a front end integrated circuit including at least one front end component connected along a signal path to the antenna array, and a memory circuit programmed with data operable to control one or more settings of the at least one front end component. According to a number of embodiments, the data of the memory circuit provides compensation for electromagnetic coupling associated with the selected antenna pattern configuration.

In various embodiments, each of the plurality of signal conditioning circuits includes a power amplifier, and the beamforming communication system further includes a power amplifier output tuning control circuit configured to tune an output impedance of each power amplifier based on the selected antenna pattern configuration.

In several embodiments, each of the plurality of signal conditioning circuits includes a low noise amplifier, and the beamforming communication system further includes a low noise amplifier input tuning control circuit configured to tune an input impedance of each low noise amplifier based on the selected antenna pattern configuration.

In certain embodiments, the present disclosure relates to a radio frequency module for a beamforming communication system. The radio frequency module includes a substrate, an antenna array attached to the substrate and including a plurality of antenna elements, and a semiconductor die attached to the substrate and including a plurality of signal conditioning circuits each operatively associated with a corresponding one of the plurality of antenna elements. The semiconductor die further includes an antenna array management circuit configured to generate a plurality of control signals each operable to individually control a corresponding one of the plurality of signal conditioning circuits to operate the antenna array in a selected antenna pattern configuration. The selected antenna pattern configuration is chosen from a plurality of antenna pattern configurations providing different levels of power control.

In some embodiments, the plurality of control signals are each operable to set the corresponding signal conditioning circuit in an on state or an off state.

In several embodiments, the plurality of control signals are each operable to set the corresponding signal conditioning circuit in an on state, an off state, or an attenuated state, the attenuated state providing a portion of the gain provided by the on state.

In a number of embodiments, the antenna array is a dual polarization antenna array, and the selected antenna pattern configuration provides power control for at least one antenna polarization.

In some embodiments, the selected antenna pattern configuration provides a coarse power control adjustment. According to various embodiments, the selected antenna pattern configuration includes one or more active antenna elements, and the antenna array management circuit is further configured to provide a fine power control adjustment by setting a signal path gain of each of the one or more active antenna elements.

In several embodiments, the antenna array is configured for wireless transmission, and the plurality of antenna pattern configurations provide different steps of effective isotropic radiated power.

In a number of embodiments, the antenna array is configured for wireless reception, and the plurality of antenna pattern configurations provide different values of effective isotropic sensitivity.

In various embodiments, the semiconductor die further includes a plurality of antenna termination circuits each connected to a corresponding one of the plurality of antenna elements, and the antenna array management circuit is further configured to control the plurality of antenna termination circuits based on the selected antenna pattern configuration. According to several embodiments, the selected antenna pattern configuration includes one or more inactive antenna elements chosen from the plurality of antenna elements, and the antenna array management circuit is further configured to terminate each of the one or more inactive antenna elements using the corresponding one of the plurality of antenna termination circuits.

In some embodiments, the semiconductor die further includes at least one front end component connected along a signal path to the antenna array, and a memory circuit programmed with data operable to control one or more settings of the at least one front end component. According to a number of embodiments, the data of the memory circuit provides compensation for electromagnetic coupling associated with the selected antenna pattern configuration.

In various embodiments, each of the plurality of signal conditioning circuits includes a power amplifier, and the semiconductor die further includes a power amplifier output tuning control circuit configured to tune an output impedance of each power amplifier based on the selected antenna pattern configuration.

In several embodiments, each of the plurality of signal conditioning circuits includes a low noise amplifier, and the semiconductor die further includes a low noise amplifier input tuning control circuit configured to tune an input impedance of each low noise amplifier based on the selected antenna pattern configuration.

In certain embodiments, the present disclosure relates to a method of power control in a beamforming communication system. The method includes selecting an antenna pattern configuration from a plurality of available antenna pattern configurations providing different levels of power control, generating a plurality of control signals based on the selected antenna pattern configuration using an antenna array management circuit, and operating an array of antenna elements in the selected antenna pattern configuration by controlling a plurality of signal conditioning circuits with the plurality of control signals, each of the plurality of signal conditioning circuits coupled to a corresponding antenna element of the array.

In some embodiments, controlling the plurality of signal conditioning circuits with the plurality of control signals includes individually setting each signal conditioning circuit in an on state or an off state.

In several embodiments, controlling the plurality of signal conditioning circuits with the plurality of control signals includes individually setting each signal conditioning circuit in an on state, an off state, or an attenuated state, the attenuated state providing a portion of the gain provided by the on state.

In a number of embodiments, the method further includes providing a coarse power control adjustment using the selected antenna pattern configuration. According to various embodiments, the selected antenna pattern configuration includes one or more active antenna elements chosen from the array of antenna elements, and the method further includes providing a fine power control adjustment by setting a signal path gain of each of the one or more active antenna elements.

In some embodiments, selecting the antenna pattern configuration includes choosing the antenna pattern configuration to achieve a target effective isotropic radiated power, and the method further includes transmitting a signal using the array.

In several embodiments, selecting the antenna pattern configuration includes choosing the antenna pattern configuration to achieve a target effective isotropic sensitivity, and the method further includes receiving a signal using the array.

In various embodiments, the method further includes controlling a plurality of antenna termination circuits based on the selected antenna pattern configuration, each of the plurality of antenna termination circuits connected to a corresponding antenna element of the array. According to a number of embodiments, the selected antenna pattern configuration includes one or more inactive antenna elements chosen from the array of antenna elements, and the method further includes terminating each of the one or more inactive antenna elements using the corresponding one of the plurality of antenna termination circuits.

In some embodiments, method further includes controlling at least one front end component connected along a signal path to the array using data in a memory circuit, and compensating for electromagnetic coupling associated with the selected antenna pattern configuration using the data.

In a number of embodiments, each of the plurality of signal conditioning circuits includes a power amplifier, and the method further includes tuning an output impedance of each power amplifier based on the selected antenna pattern configuration.

In several embodiments, each of the plurality of signal conditioning circuits includes a low noise amplifier, and the method further includes tuning an input impedance of each low noise amplifier based on the selected antenna pattern configuration.

BRIEF DESCRIPTION OF THE DRAWINGS

Embodiments of this disclosure will now be described, by way of non-limiting example, with reference to the accompanying drawings.

FIG. 9 is a schematic diagram of another embodiment of power control based on antenna pattern configuration.

DETAILED DESCRIPTION OF CERTAIN EMBODIMENTS

Figure 1:
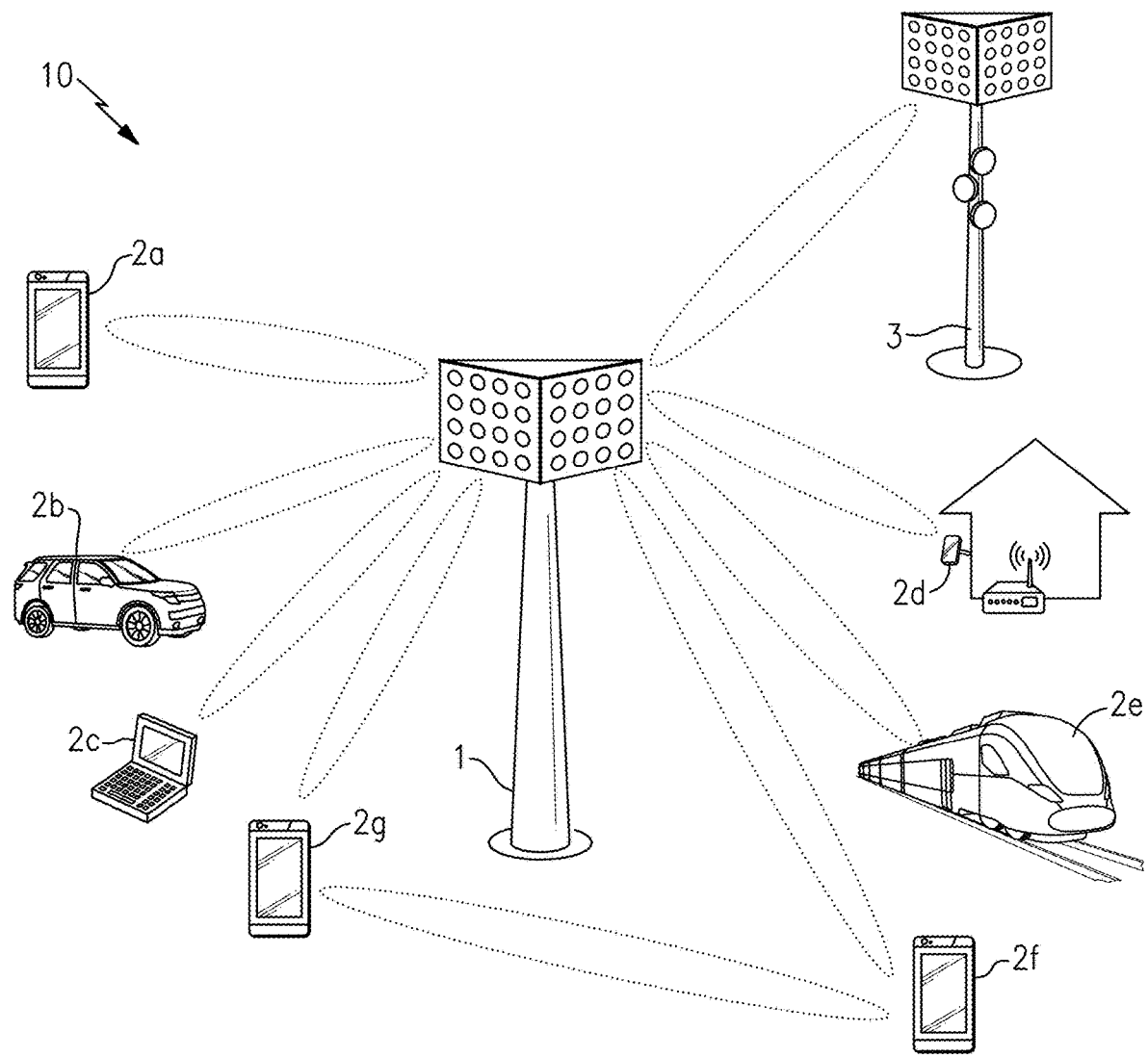
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2019). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
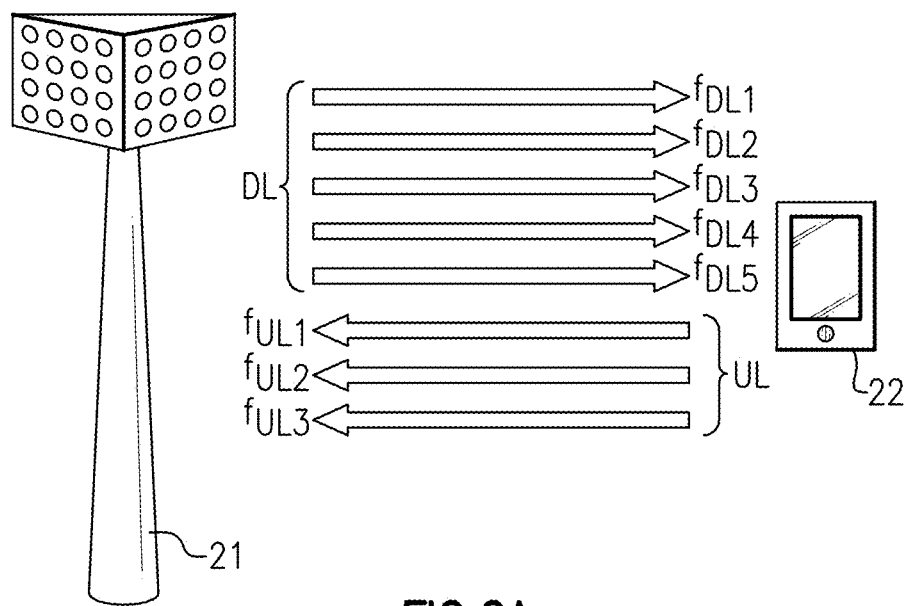
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
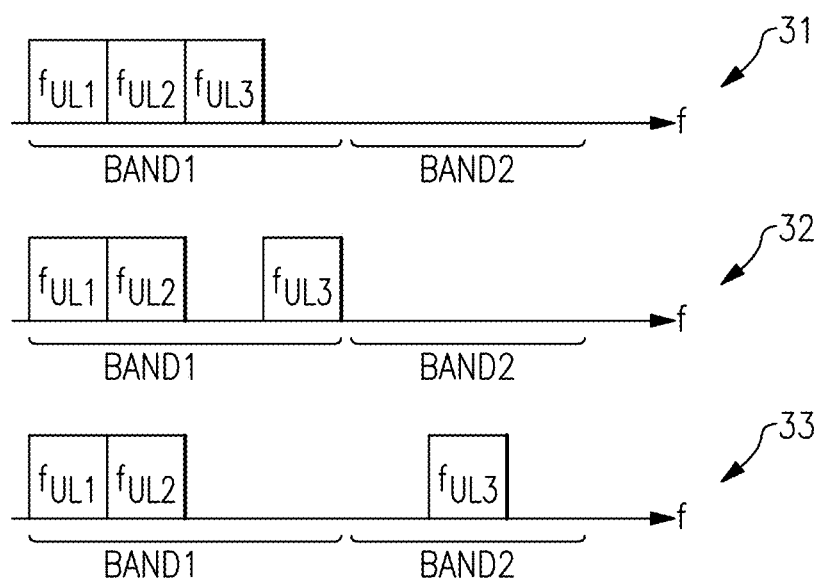
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
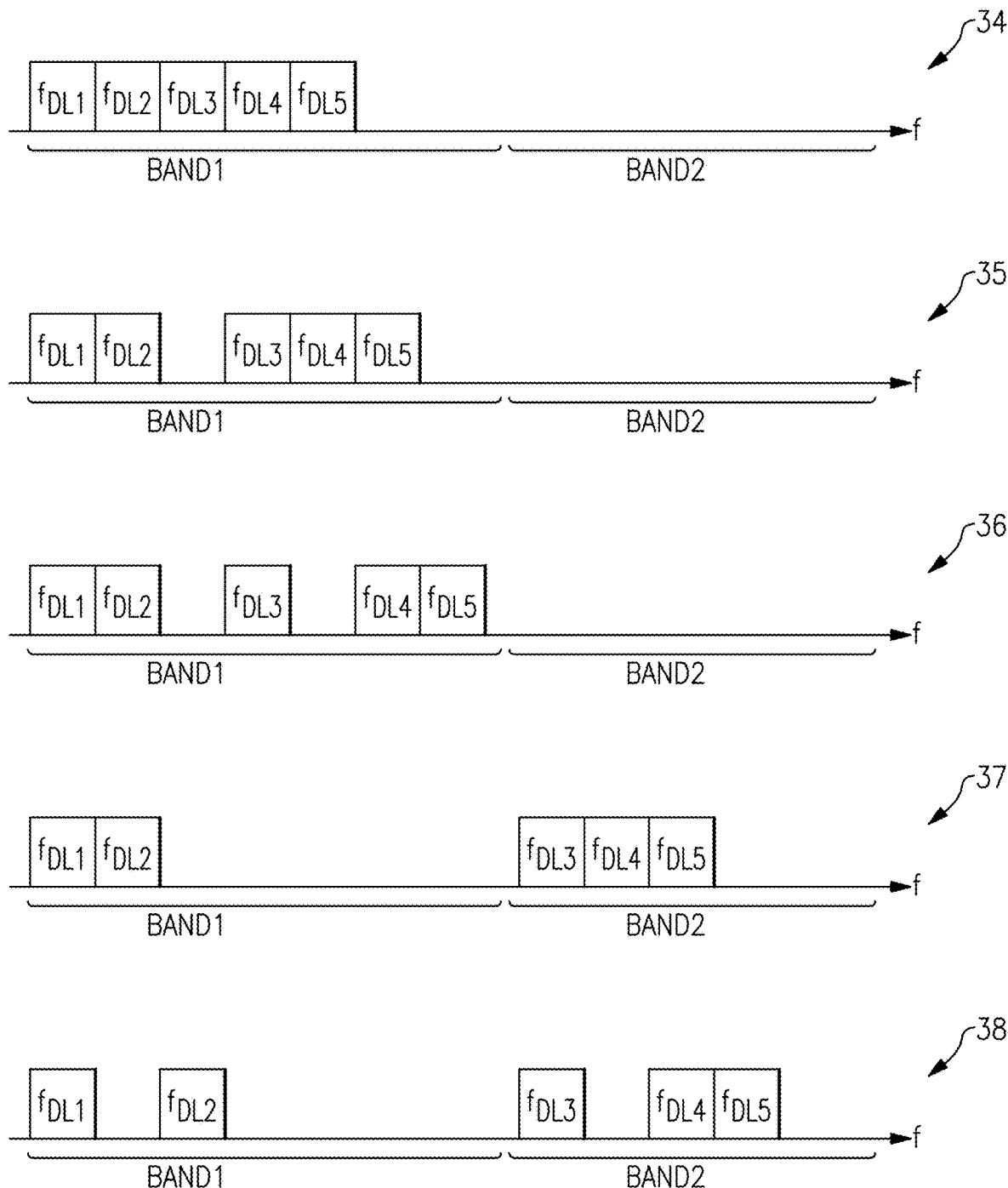
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
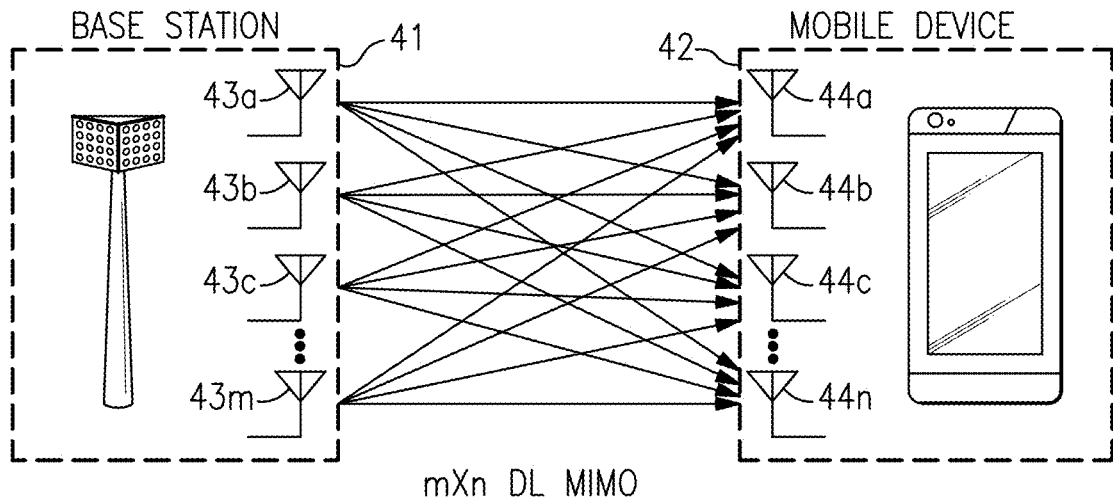
FIG. 3A is a schematic diagram of one example of a downlink channel using multi-input and multi-output (MIMO) communications.
Figure 3B:
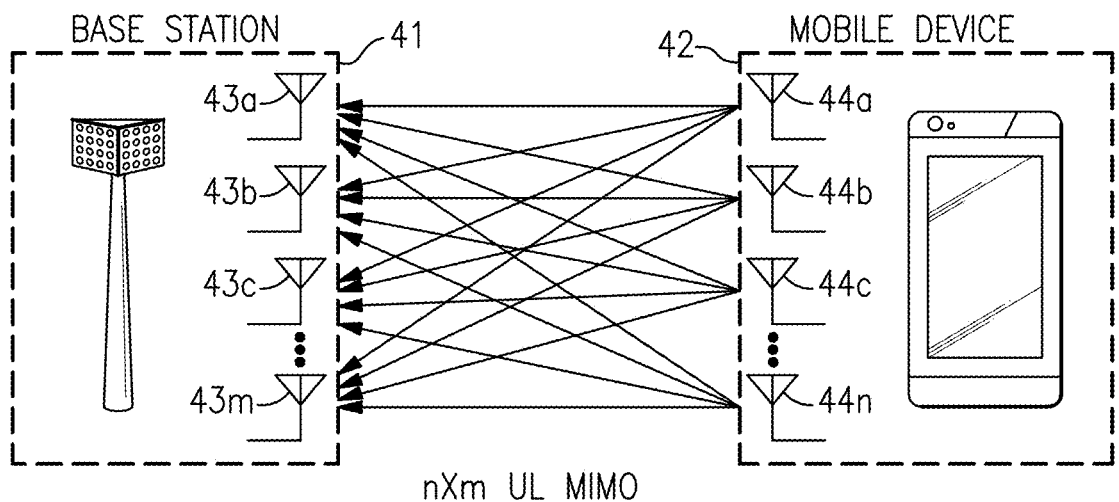
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, ... 43m of the base station 41 and receiving using N antennas 44a, 44b, 44c, ... 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, ... 44n of the mobile device 42 and receiving using M antennas 43a, 43b, 43c, ... 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
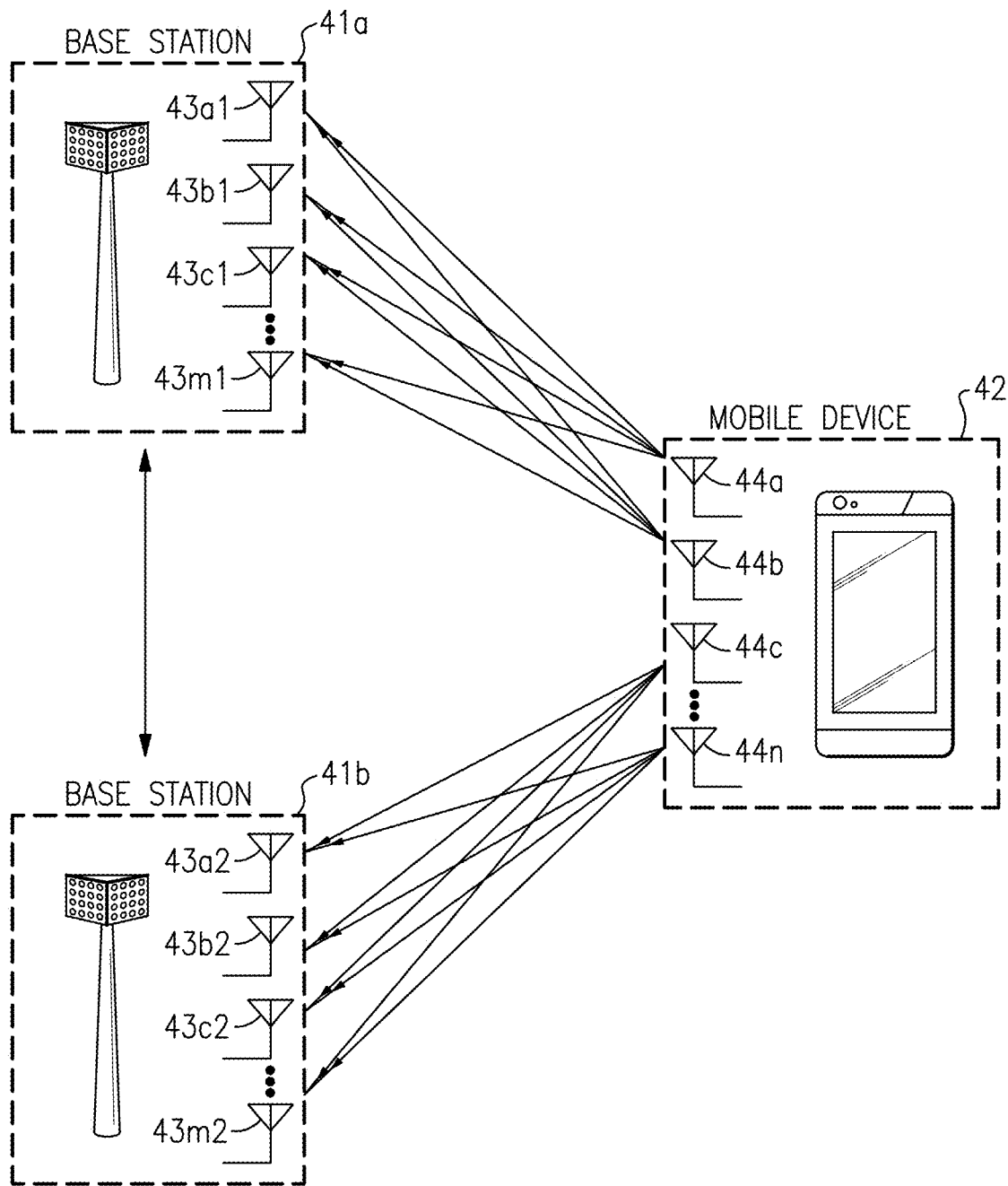
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, ... 44n of the mobile device 42. Additional a first portion of the uplink transmissions are received using M antennas 43a1, 43b1, 43c1, ... 43m1 of a first base station 41a, while a second portion of the uplink transmissions are received using M antennas 43a2, 43b2, 43c2, ... 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Examples of Power Control Based on Antenna Pattern Configuration

Antenna arrays can be used in a wide variety of applications. For instance, antenna arrays can be used to transmit and/or receive radio frequency (RF) signals in base stations, network access points, mobile phones, tablets, customer-premises equipment (CPE), laptops, computers, wearable electronics, and/or other communication devices.

Communication devices that utilize millimeter wave carriers (for instance, 30 GHz to 300 GHz), centimeter wave carriers (for instance, 3 GHz to 30 GHz), and/or other carrier frequencies can employ an antenna array to provide beam formation and directivity for transmission and/or reception of signals.

For example, in the context of signal transmission, the signals from the antenna elements of the antenna array combine using constructive and destructive interference to generate an aggregate transmit signal exhibiting beam-like qualities with more signal strength propagating in a given direction away from the antenna array. In the context of signal reception, more signal energy is received by the antenna array when the signal is arriving from a particular direction. Accordingly, an antenna array can also provide directivity for reception of signals.

A signal conditioning circuit can be used to condition a transmit signal for transmission via an antenna element and/or to condition a received signal from the antenna element. In one example, a signal conditioning circuit includes a power amplifier that amplifies the transmit signal for transmission, and a low noise amplifier (LNA) that amplifies the received signal for further processing while introducing a relatively small amount of noise. Such amplifiers can include variable gain stages for providing gain control and/or the signal conditioning circuit can include other gain control circuitry. In certain implementations, the signal conditioning circuit further includes a phase shifter for providing phase control. The signal conditioning circuits of a communication device consume power when activated.

The power level of a beamforming communication system can change over time to achieve desired operating characteristics. For example, a transmit power level and/or a receive power level of the beamforming communication system can be selected to achieve a desired trade-off between power consumption and communication range/rate for a given operating environment.

Apparatus and methods for beamforming communication systems with power control based on antenna pattern configuration are provided. In certain embodiments, a beamforming communication system includes an antenna array including a plurality of antenna elements. The beamforming communication system further includes a plurality of signal conditioning circuits operatively associated with the antenna elements, and an antenna array management circuit that generates a plurality of control signals that individually control the signal conditioning circuits. The antenna array management circuit achieves a desired level of power control based on generating the control signals to select an antenna pattern configuration associated with a desired power control level.

Accordingly, different patterns of active antenna elements of the antenna array can be used to provide different levels of power control. In the context of transmission, the antenna pattern configurations can provide different transmit power levels, while in the context of reception the antenna pattern configurations can provide different receive power levels. For example, the pattern of the antenna array can change based on a setting for transmit power control (TPC) and/or a setting for automatic gain control (AGC).

Using an antenna pattern configuration for power control provides a number of advantages relative to a beamforming communication system that provides power control by operating the signal path of each antenna element with common gain or power settings. In particular, operating fewer paths at full power can be more efficient than operating all paths at reduced power.

For example, in the context of signal transmission, the power amplifiers of such a beamforming communication system can operate at an inefficient operating point, for instance, a backed off power level. In contrast, certain beamforming communication systems herein disable a first portion of the total available power amplifiers while operating a second portion of the power amplifiers at an efficient operating point, for instance, at or near saturated power. Furthermore, when a signal conditioning circuit for a particular antenna element is disabled, other circuitry such as phase-locked loops (PLLs) and/or mixers for providing frequency conversion can also be disabled. Thus, providing power control via antenna pattern configuration also provides energy savings.

In certain implementations, an antenna pattern configuration is achieved by turning on or off the signal conditioning circuit associated with each antenna element. Thus, each signal conditioning circuit can be controlled to an ON state or an OFF state to achieve the antenna pattern configuration. In another example, each signal conditioning circuit can be controlled to an ON state, an OFF state, or an attenuated state that provides a portion of the gain of the ON state. Including the attenuated state can aid in meeting power control accuracy and/or AGC specifications.

Furthermore, in certain configurations power control can be provided to each path in the ON state to provide finer grain power steps. In such configurations, antenna pattern configuration provides coarse power control while gain adjustment to the signal path provides fine power control.

The teachings herein are applicable to antenna arrays that only transmit signals, to antenna arrays that only receive signals, and to antenna arrays that both transmit signals and receive signals. In certain implementations, the antenna array management circuit provides control over up/down steps of effective isotropic radiated power (EIRP) to thereby provide transmit power control. In certain implementations, the antenna array management circuit controls receive power by providing an antenna pattern configuration that achieves a desired value of effective isotropic sensitivity (EIS), which can depend on received power and a signal-to-noise ratio (SNR) for demodulation. Both EIRP and EIS can depend on gain per path and beamforming gain.

In certain implementations, the antenna pattern configuration is selected to change antenna gain towards a base station, rather than using the same power control or AGC for every signal path to the antenna array. In certain implementations, the antenna pattern configuration can also be selected based on a wide variety of other factors, including but not limited to, ability of a particular antenna pattern configuration to provide controlled beam steering and/or to achieve a desired beam angle.

The selection of active, inactive, and/or attenuated antenna elements can impact electromagnetic (EM) coupling between antenna elements. Thus, the load of each antenna element is dependent upon beam power and/or direction. Accordingly, a selected antenna pattern configuration can impact EM coupling between antenna elements. In various implementations, one or more components along one or more signal paths to the antenna array are compensated for EM coupling associated with the selected antenna pattern configuration.

In a first example, the termination of a deactivated antenna element is controlled based on the EM coupling associated with the selected antenna pattern configuration.

In a second example, the termination of a power amplifier, a low noise amplifier, a switch, or other component of an RF signal path is compensated for EM coupling of the selected antenna pattern configuration. For instance, output impedance tuning of a power amplifier and/or input impedance tuning of a low noise amplifier can be provided based on the selected antenna pattern configuration.

In a third example, a front end integrated circuit (IC) includes at least one front end component (for example, one or more amplifiers, switches, phase shifters, and/or filters) and a memory circuit storing settings (for instance, data indicating RF path parameters, such as power, phase shift, etc.) of the component(s), which can vary for each antenna element and/or for each beam of the array. Additionally, the settings can be compensated for EM coupling associated with a particular antenna pattern configuration. Thus, a codebook stored in a memory unit can reflect compensation for antenna pattern configuration.

In a fourth example, data associated with digital pre-distortion and/or analog pre-distortion is compensated for impacts of EM coupling. In certain implementations, such data is stored in a codebook stored of a memory unit.

Accordingly, one or more components along signal paths to an antenna array can be controlled to compensate for EM coupling associated with a particular antenna pattern configuration.

In certain implementations, power control is provided in steps (for instance, steps of about 1 dB) over a range of at least 30 dB. In certain implementations, selection of antenna pattern configuration is combined with power control of each signal path or branch to cover the range of at least 30 dB with the desired power control step. For example, such signal path power control can include adjustments to the amount of gain and/or attenuation provided by various components along the signal path.

Figure 4A:
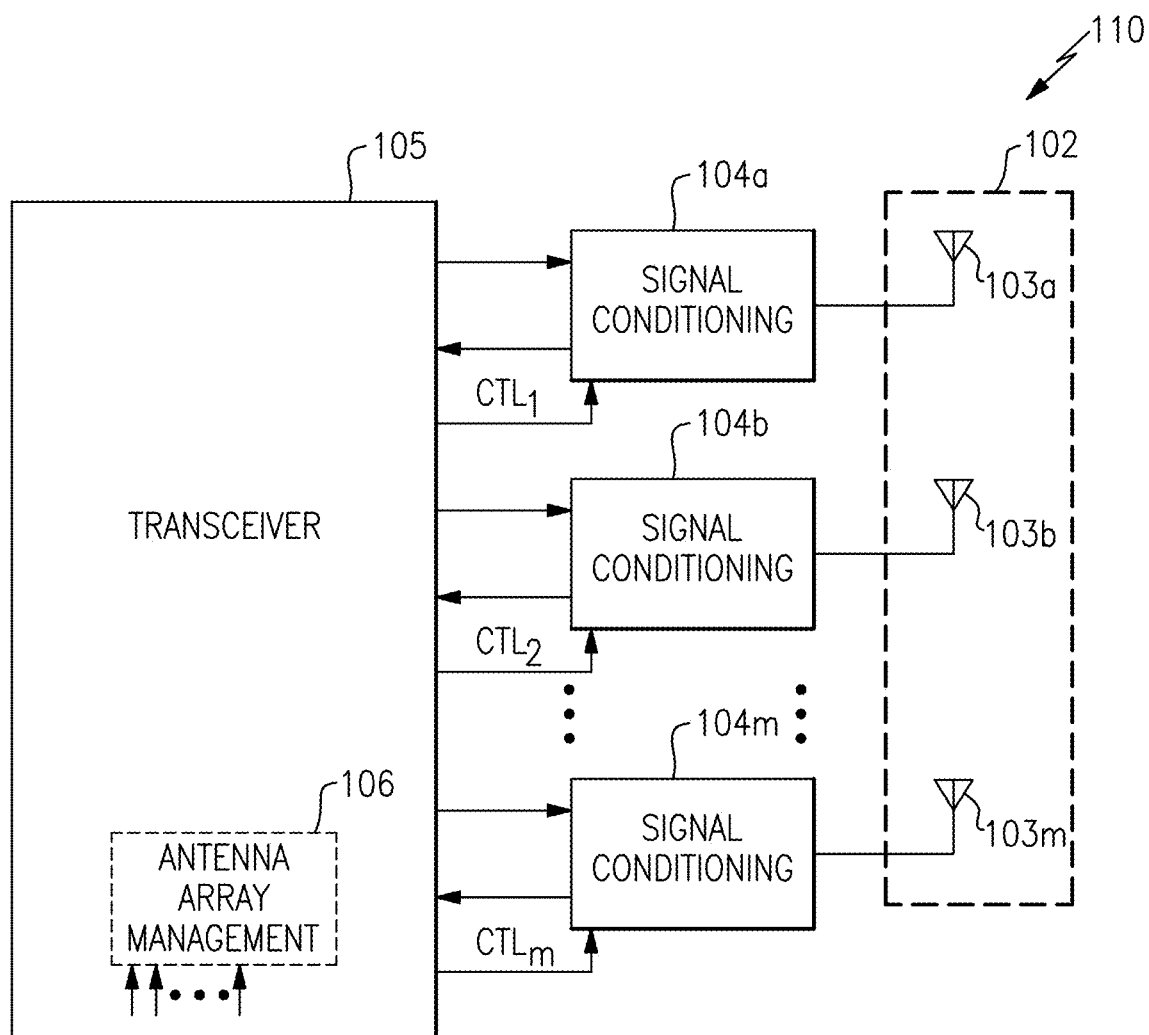
FIG. 4A is a schematic diagram of one embodiment of a radio frequency (RF) system with antenna array management to provide power control.

FIG. 4A is a schematic diagram of one embodiment of an RF system 110 with antenna array management to provide power control. The RF system 110 includes an antenna array 102 including antenna elements 103a, 103b . . . 103m. The RF system 110 further includes signal conditioning circuits 104a, 104b . . . 104m, and a transceiver 105 that includes an antenna array management circuit 106. Thus, the antenna array management circuit 106 is included in the transceiver 105, in this embodiment. However, the antenna array management 106 circuit can be in any suitable location.

Although an embodiment with three antenna elements and corresponding signal conditioning circuits is shown, an RF system can more or fewer antenna elements and/or signal conditioning circuits as indicated by the ellipses.

In the illustrated embodiment, each of the signal conditioning circuits 104a, 104b . . . 104m is coupled to a corresponding one of the antenna elements 103a, 103b . . . 103m. The signal conditioning circuits 104a, 104b . . . 104m can be used to condition signals for transmission and/or reception via the antenna array 102.

Although an embodiment in which the conditioning circuits 104a, 104b . . . 104m provide signal conditioning for both transmission and reception, other implementations are possible. For example, in certain implementations, a communication device includes separate antenna arrays for receiving signals and for transmitting signals. Thus, in certain implementations, a signal conditioning circuit is used for transmit conditioning but not receive conditioning, or for receive conditioning but not transmit conditioning.

As shown in FIG. 4A, the transceiver 105 generates control signals $CTL_1$, $CTL_2$ . . . $CTL_m$ for individually controlling the signal conditioning circuits 104a, 104b . . . 104m, respectively. The control signals $CTL_1$, $CTL_2$ . . . $CTL_m$ are used to provide a desired antenna pattern configuration, for instance, by enabling or disabling each of the signal conditioning circuits 104a, 104b . . . 104m and/or by providing gain adjustment to one or more components therein.

By controlling the selected antenna pattern configuration, power control is provided. Moreover, the antenna array management circuit 106 can change the selected antenna pattern configuration over time based on desired power control, thereby providing suitable performance characteristics at a given moment.

Figure 4B:
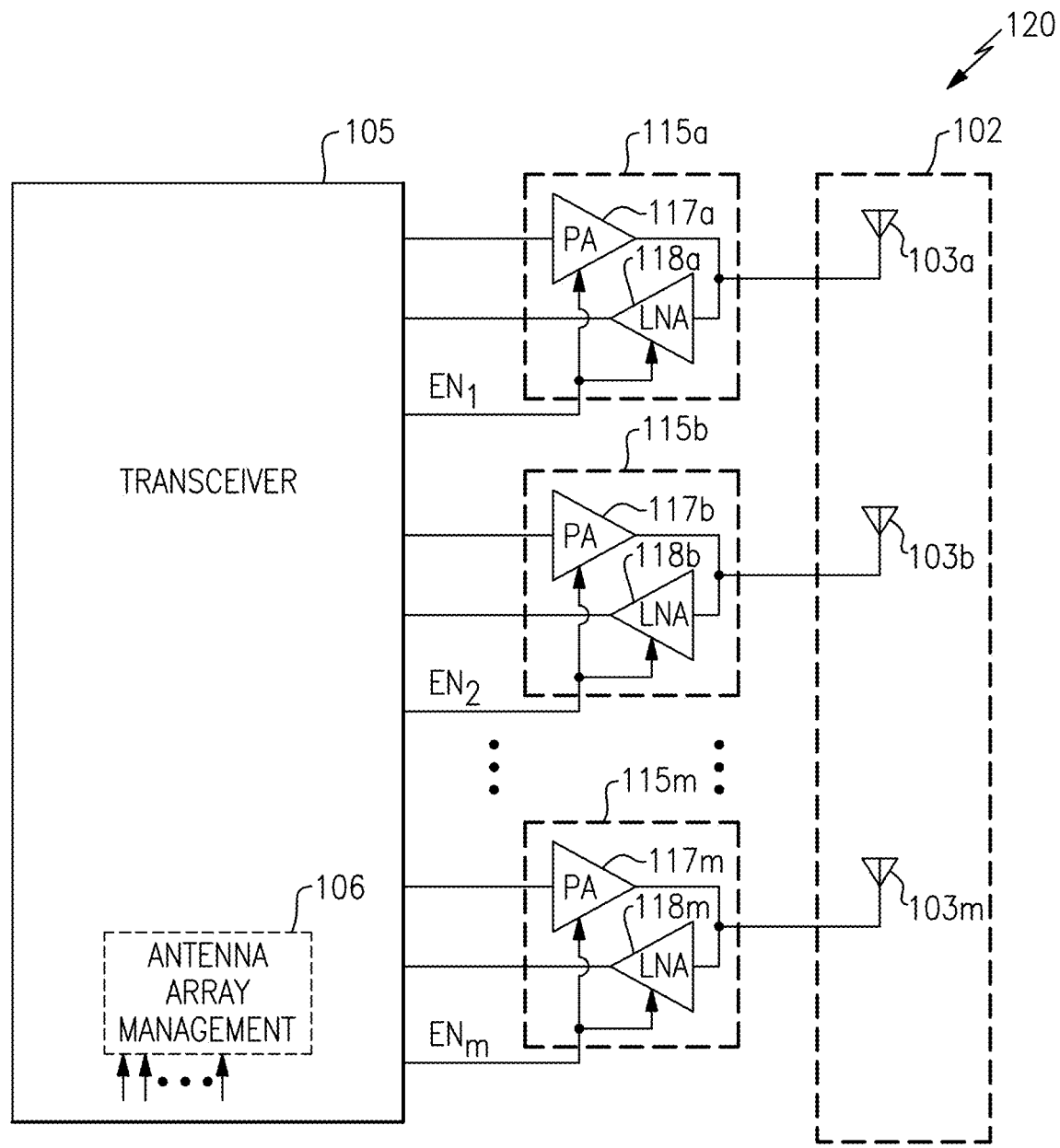
FIG. 4B is a schematic diagram of another embodiment of an RF system with antenna array management to provide power control.

FIG. 4B is a schematic diagram of another embodiment of an RF system 120 with antenna array management to provide power control. The RF system 120 includes an antenna array 102, signal conditioning circuits 115a, 115b . . . 115m, and a transceiver 105.

The RF system 120 of FIG. 4B is similar to the RF system 110 of FIG. 4A, except that the RF system 120 includes a specific implementation of signal conditioning circuits controlled by enable signals $EN_1$, $EN_2$ . . . $EN_m$. In particular, the signaling conditions circuits 115a, 115b . . . 115m of FIG. 4B include power amplifiers 117a, 117b . . . 117m and LNAs 118a, 118b . . . 118m, respectively, which are selectively enabled by the antenna array management circuit 106.

Although FIG. 4B illustrates an implementation in which a power amplifier and an LNA of a particular signal conditioning circuit receive a common enable signal, in certain implementations the antenna array management circuit 106 separately controls enabling/disabling of the power amplifier and the low noise amplifier of a particular signal conditioning circuit.

Furthermore, although an example of signaling conditioning circuits with power amplifiers and LNAs is shown, other implementations of signaling conditioning circuits are possible. For example, a signaling conditioning circuit can include other circuitry used to enable the intended RF communication channel between devices, including, but not limited to, filters, attenuators, phase shifters, switches, and/or other circuitry. Moreover, in certain implementations, a signaling conditioning circuit includes transmit conditioning circuitry (for instance, a power amplifier) but not receive conditioning circuitry, or includes receive conditioning circuitry (for instance, an LNA) but not transmit conditioning circuitry.

Figure 5A:
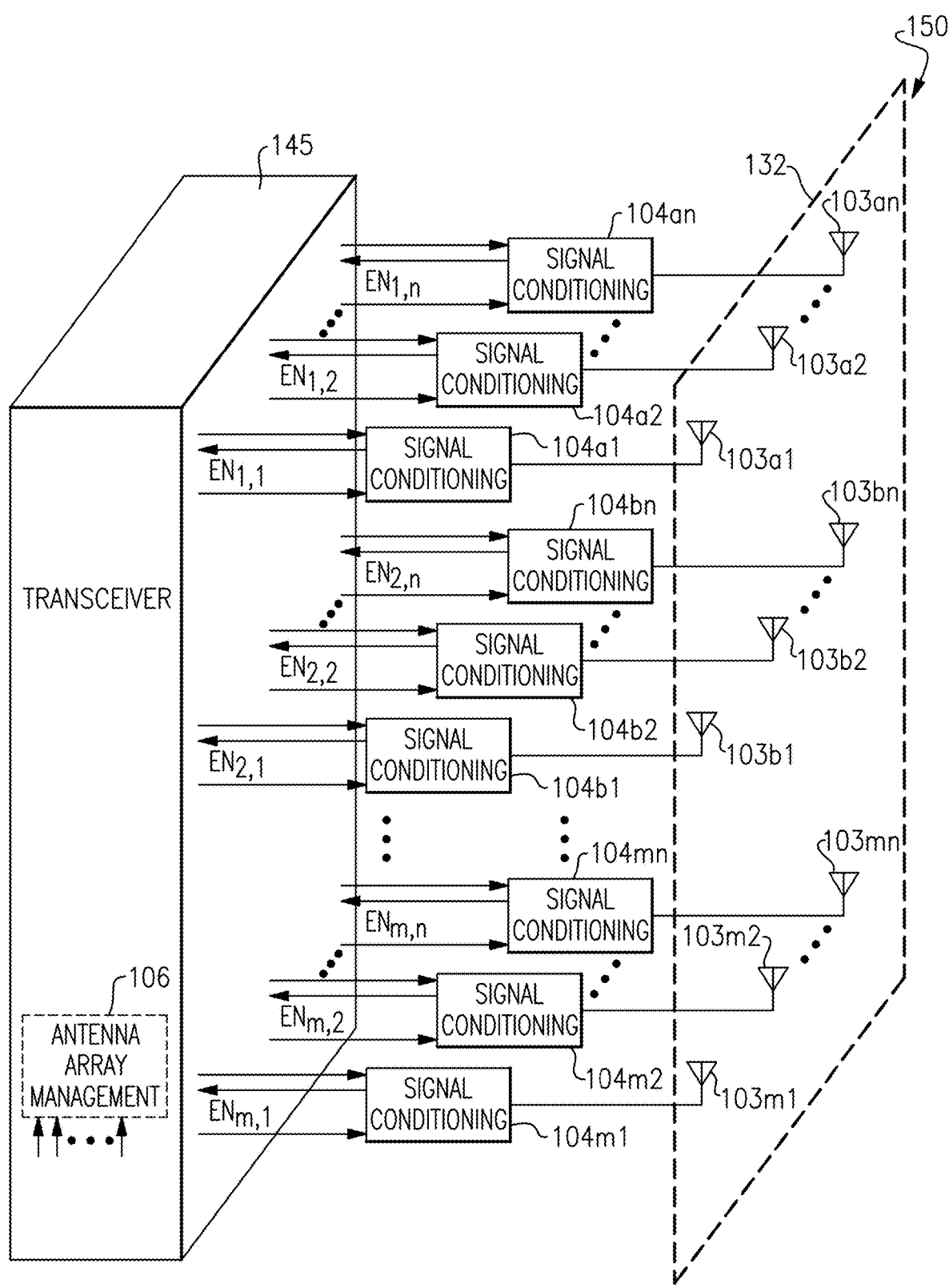
FIG. 5A is a schematic diagram of another embodiment of an RF system with antenna array management to provide power control.

FIG. 5A is a schematic diagram of another embodiment of an RF system 150 with antenna array management to provide power control. The RF system 150 includes an antenna array 132 including antenna elements 103a1, 103a2 . . . 103an, 103b1, 103b2 . . . 103bn, 103m1, 103m2 . . . 103mn. The RF system 150 further includes signal conditioning circuits 104a1, 104a2 . . . 104an, 104b1, 104b2 . . . 104bn, 104m1, 104m2 . . . 104mn and a transceiver 145 that includes an antenna array management circuit 106. The antenna array management circuit 106 generates enable signals $EN_{1,1}$, $EN_{1,2}$ . . . $EN_{1,n}$, $EN_{2,1}$, $EN_{2,2}$ . . . $EN_{2,n}$, $EN_{m,1}$, $EN_{m,2}$ . . . $EN_{m,n}$ for the signal conditioning circuits 104a1, 104a2 . . . 104an, 104b1, 104b2 . . . 104bn, 104m1, 104m2 . . . 104mn, respectively.

The enable signals $EN_{1,1}$, $EN_{1,2}$ . . . $EN_{1,n}$, $EN_{2,1}$, $EN_{2,2}$ . . . $EN_{2,n}$, $EN_{m,1}$, $EN_{m,2}$ . . . $EN_{m,n}$ operate to select an antenna pattern configuration by enabling or disabling the signal conditioning circuits 104a1, 104a2 . . . 104an, 104b1, 104b2 . . . 104bn, 104m1, 104m2 . . . 104mn. In another embodiment, the antenna array management circuit 106 also provides power control (for instance, gain adjustment) to the signal conditioning circuits and/or to components of the transceiver 145 associated with each signal path to the antenna array 132. For example, in certain implementations, coarse power control is provided by selecting the antenna pattern configuration, while fine power control is provided via gain adjustment to signal paths associated with active antenna elements.

The RF system 150 of FIG. 5A is similar to the RF system 110 of FIG. 4A, except that the RF system 150 illustrates a specific implementation using an m×n antenna array 132 and corresponding signal conditioning circuits, where m and n are integers greater than or equal to 1. The product of m*n can vary depending on application. In one embodiment, m*n is in the range of 2 to 2048, or more particular, 16 to 256.

Figure 5B:
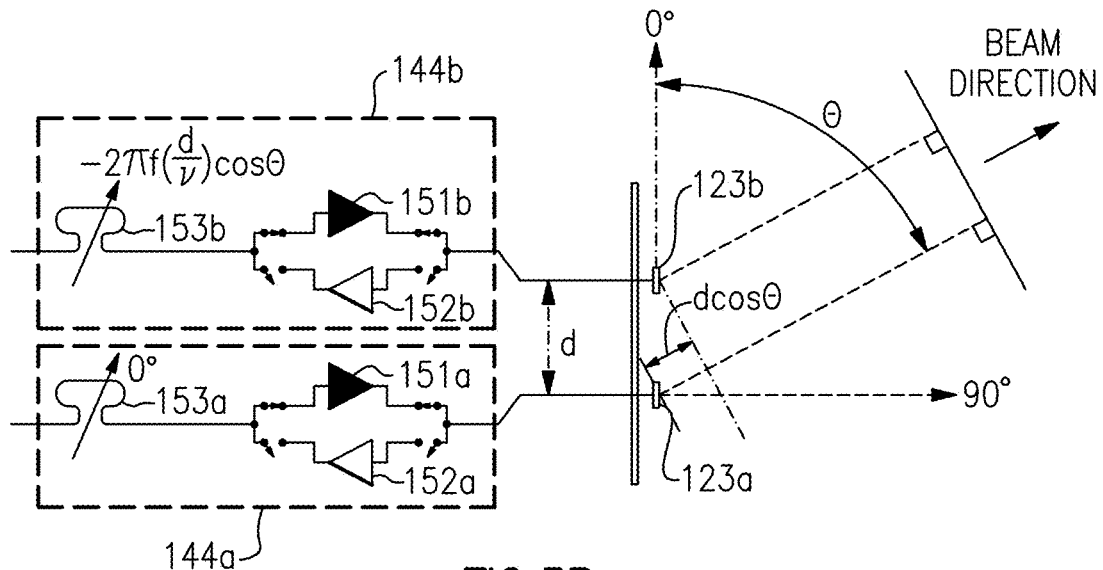
FIG. 5B is a schematic diagram of one example of beamforming to provide a transmit beam.

FIG. 5B is a schematic diagram of one example of beamforming to provide a transmit beam. FIG. 5B illustrates a portion of a communication system including a first signal conditioning circuit 144a, a second signal conditioning circuit 144b, a first antenna element 123a, and a second antenna element 123b.

Although illustrated as including two antenna elements and two signal conditioning circuits, a communication system can include additional antenna elements and/or signal conditioning circuits. For example, FIG. 5B illustrates one embodiment of a portion of the communication system 150 of FIG. 5A.

The first signal conditioning circuit 144a includes a first power amplifier 151a, a first low noise amplifier (LNA) 152a, a first phase shifter 153a, and switches for controlling selection of the power amplifier 151a or LNA 152a. Additionally, the second signal conditioning circuit 144b includes a second power amplifier 151b, a second LNA 152b, a second phase shifter 153b, and switches for controlling selection of the power amplifier 151b or LNA 152b.

Although one embodiment of signal conditioning circuits is shown, other implementations of signal conditioning circuits are possible. For instance, in one example, a signal conditioning circuit includes one or more band filters, duplexers, and/or other components. Furthermore, although an implementation with an analog phase shifter is shown, the teachings herein are also applicable to implementations using digital phase shifting (for instance, phase shifting using digital baseband processing) as well as to implementations using a combination of analog phase shifting and digital phase shifting.

In the illustrated embodiment, the first antenna element 123a and the second antenna element 123b are separated by a distance d. Additionally, FIG. 5B has been annotated with an angle $\Theta$, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 123a, 123b, a desired transmit beam angle $\Theta$ can be achieved. For example, when the first phase shifter 153a has a reference value of 0°, the second phase shifter 153b can be controlled to provide a phase shift of about $-2\pi f(d/v)\cos\Theta$ radians, where f is the fundamental frequency of the transmit signal, d is the distance between the antenna elements, v is the velocity of the radiated wave, and $\pi$ is the mathematic constant pi.

In certain implementations, the distance d is implemented to be about ½λ, where λ is the wavelength of the fundamental component of the transmit signal. In such implementations, the second phase shifter 153b can be controlled to provide a phase shift of about $-\pi \cos\Theta$ radians to achieve a transmit beam angle $\Theta$.

Accordingly, the relative phase of the phase shifters 153a, 153b can be controlled to provide transmit beamforming. In certain implementations, a transceiver (for example, the transceiver 145 of FIG. 5A) controls phase values of one or more phase shifters to control beamforming. In certain implementations, an antenna array management circuit (for instance, the antenna array management circuit 106 of FIG. 5A) controls the phase values of the one or more phase shifters.

Figure 5C:
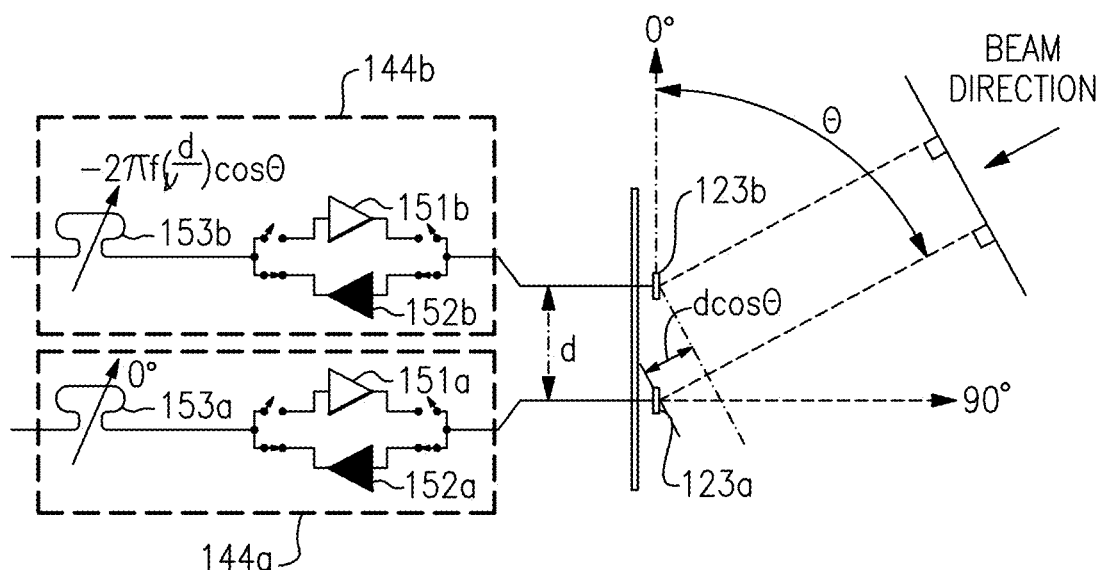
FIG. 5C is a schematic diagram of one example of beamforming to provide a receive beam.

FIG. 5C is a schematic diagram of one example of beamforming to provide a receive beam. FIG. 5C is similar to FIG. 5B, except that FIG. 5C illustrates beamforming in the context of a receive beam rather than a transmit beam.

As shown in FIG. 5C, a relative phase difference between the first phase shifter 153a and the second phase shifter 153b can be selected to about equal to $-2\pi f(d/v)\cos\Theta$ radians to achieve a desired receive beam angle $\Theta$. In implementations in which the distance d corresponds to about ½λ, the phase difference can be selected to about equal to $-\pi \cos\Theta$ radians to achieve a receive beam angle $\Theta$.

Although various equations for phase values to provide beamforming have been provided, other phase selection values are possible, such as phase values selected based on implementation of an antenna array, implementation of signal conditioning circuits, and/or a radio environment.

Figure 6:
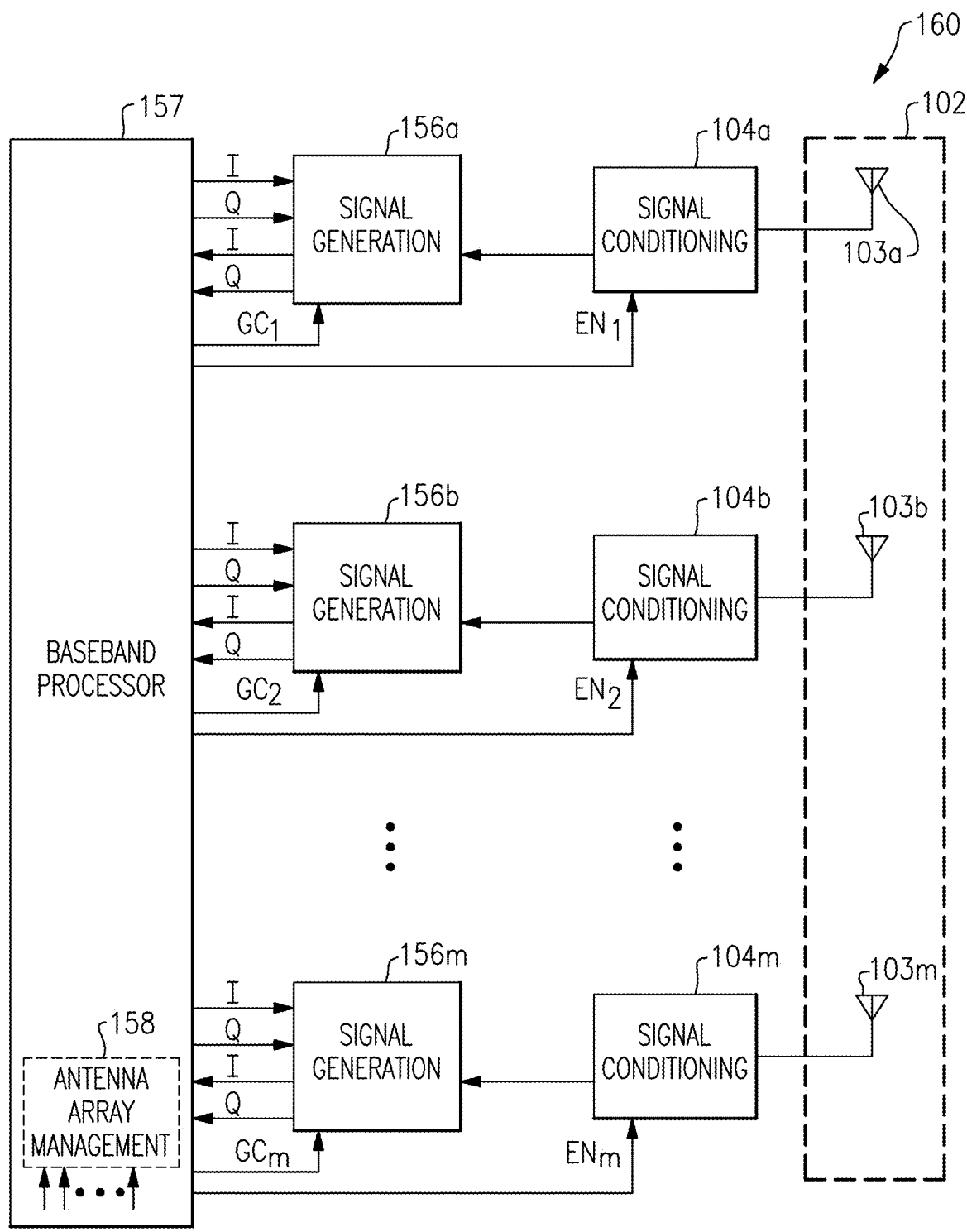
FIG. 6 is a schematic diagram of another embodiment of an RF system with antenna array management to provide power control.

FIG. 6 is a schematic diagram of another embodiment of an RF system 160 with antenna array management to provide power control. The RF system 160 includes an antenna array 102, signal conditioning circuits 104a, 104b . . . 104m, signal generation circuits 156a, 156b . . . 156m, and a baseband processor 157.

The RF system 160 of FIG. 6 is similar to the RF system 110 of FIG. 4A, except that the RF system 160 of FIG. 6 includes signal generation circuits 156a, 156b . . . 156m and a baseband processor 157 that includes an antenna array management circuit 158. Although shown as being included in the baseband processor 157, the antenna array management circuit 158 can be in any suitable location.

In the illustrated embodiment, the signal generation circuits 156a, 156b . . . 156m are coupled to corresponding signal conditioning circuits 104a, 104b . . . 104m, respectively. Accordingly, in this embodiment, signal generation circuits and signal conditioning circuits are one-to-one in ratio. However, other implementations are possible, such as configurations in which a signal generation circuit is shared by multiple signal conditioning circuits.

As shown in FIG. 6, the baseband processor 157 communicates digital in-phase (I) and quadrature-phase (Q) signals with the signal generation circuits 156a, 156b . . . 156m. The antenna array management circuit 158 generates enable signals $EN_1$, $EN_2$ . . . $EN_m$ for enabling or disabling the signal conditioning circuits 104a, 104b . . . 104m to achieve a desired antenna pattern configuration. The antenna array management circuit 158 also generates signal generation gain control signals $GC_1$, $GC_2$ . . . $GC_m$ for the signal generation circuits 156a, 156b . . . 156m, respectively. The signal generation gain control signals $GC_1$, $GC_2$ . . . $GC_m$ can be used for selectively enabling and/or providing gain adjustment to the signal generation circuits 156a, 156b . . . 156m, respectively.

In certain implementations, the enable signals $EN_1$, $EN_2$ . . . $EN_m$ are used to activate a pattern of antenna elements associated with a particular antenna pattern configuration. Additionally, the signal generation gain control signals $GC_1$, $GC_2$ . . . $GC_m$ are used to provide gain control over the active antenna elements. Additionally or alternatively the signal generation gain control signals $GC_1$, $GC_2$ . . . $GC_m$ are used to disable the signal generation circuits associated with deactivated antenna elements to thereby conserve power.

In one embodiment, the enable signals $EN_1$, $EN_2$ . . . $EN_m$ select an antenna pattern configuration to provide coarse power control, while the signal generation gain control signals $GC_1$, $GC_2$ . . . $GC_m$ control a gain of the signal path of each active antenna element to provide fine power control.

Figure 7A:
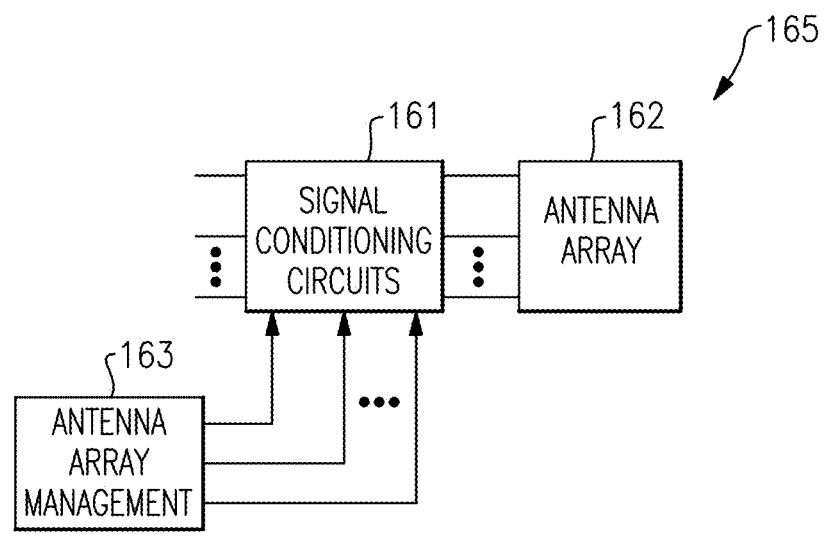
FIG. 7A is a schematic diagram of another embodiment of an RF system with antenna array management to provide power control.

FIG. 7A is a schematic diagram of another embodiment of an RF system 165 with antenna array management to provide power control. The RF system 165 includes signal conditioning circuits 161, an antenna array 162, and an antenna array management circuit 163.

The antenna array 162 is electrically connected to the signal conditioning circuits 161 along multiple RF signal paths or routes. In one example, a corresponding RF signal path is included for each antenna element of the antenna array 162.

In certain implementations, the RF system 165 further includes a transceiver, and the signal conditioning circuits 161 are included in a front end system interposed between the transceiver and the antenna array 162.

As shown in FIG. 7A, the antenna array management circuit 163 provides control signals to the signal conditioning circuits 161. The control signals provide power control in accordance with the teachings herein. For example, the control signals can be used to control the signal conditioning circuits 161 to select an antenna pattern configuration of the antenna array 162 associated with a desired power control level.

Figure 7B:
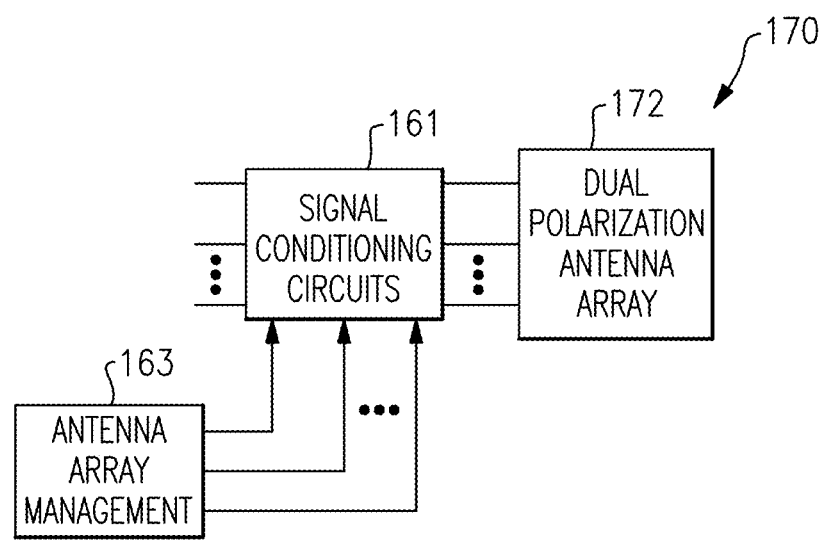
FIG. 7B is a schematic diagram of another embodiment of an RF system with antenna array management to provide power control.

FIG. 7B is a schematic diagram of another embodiment of an RF system 170 with antenna array management to provide power control. The RF system 170 includes signal conditioning circuits 161, a dual polarization antenna array 172, and an antenna array management circuit 163.

The RF system 170 of FIG. 7B is similar to the RF system 165 of FIG. 7A, except that the RF system 170 is illustrated as including the dual polarization antenna array 172. Thus, the signal conditioning circuits 161 communicate using an antenna array with dual polarization, in this example.

In certain implementations, a common antenna pattern configuration is used for each polarization of the dual polarization antenna array 172. In other implementations, different antenna pattern configurations are used for each polarization of the dual polarization antenna array 172.

Any of the embodiments herein can be implemented with a dual polarization antenna array.

Figure 8:
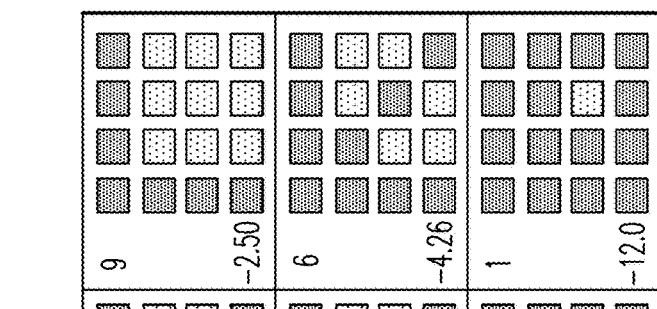
FIG. 8 is a schematic diagram of one embodiment of power control based on antenna pattern configuration.

FIG. 8 is a schematic diagram of one embodiment of power control based on antenna pattern configuration. The diagram depicts eighteen antenna pattern configurations for one implementation of a four by four (4×4) antenna array in which the selected antenna pattern configuration provides power control. However, the teachings herein are applicable to other antenna pattern configurations as well as to other array sizes.

For each antenna pattern configuration, a type of fill is used to graphically illustrate whether a particular antenna element is in an activated or ON state or in a deactivated or OFF state. Furthermore, for each antenna pattern configuration, the total number of active antenna elements (ON) and a total calculated amount of conducted power (DB) is indicated.

Although an example depicting conducted power is shown, in certain implementations power control is provided in steps of EIRP or EIS. For example, different antenna pattern configurations with the same conducted power can have different antenna gain and different amounts of EIRP.

In certain implementations, gain control is also provided to the signal path (for instance, controlling a gain or attenuation provided by one or more components along the signal path) of each active antenna element to provide finer grain power steps. Accordingly, in certain implementations an antenna pattern configuration provides coarse power control while a gain or attenuation of the active signal paths is controlled to provide fine power control.

Figure 9:
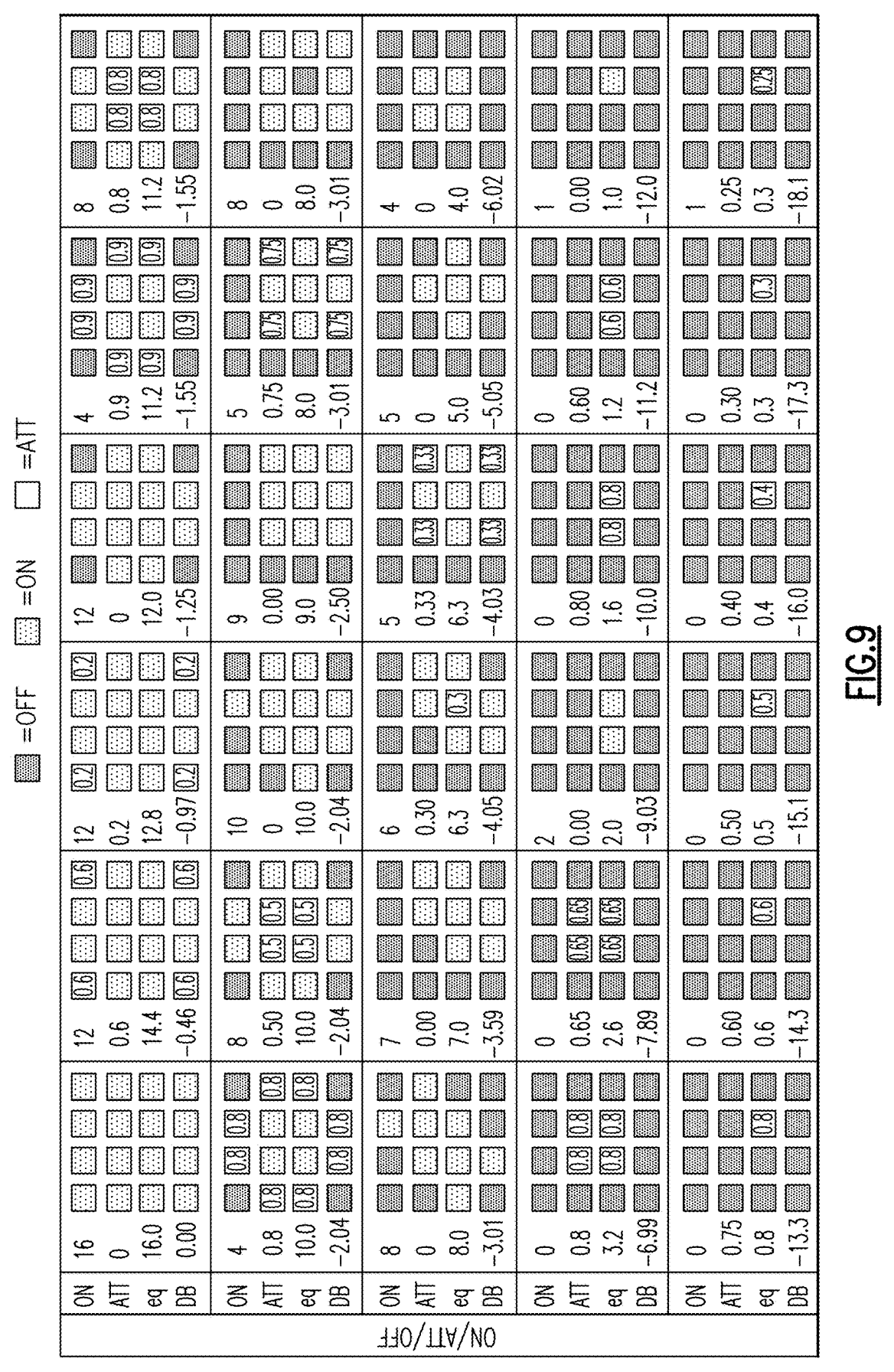

FIG. 9 is a schematic diagram of another embodiment of power control based on antenna pattern configuration. The diagram depicts thirty antenna pattern configurations for one implementation of a 4×4 antenna array. However, the teachings herein are applicable to other antenna pattern configurations as well as to other array sizes and/or shapes.

For each antenna pattern configuration, each antenna element is graphically depicted with a fill to indicate whether the antenna element is in an activated state, a deactivated state, or an attenuated state. Furthermore, each antenna pattern configuration indicates the total number of active antenna elements (ON), the portion of power provided by an antenna element in an attenuated state relative to an on state (ATT), an equivalent number of fully on antenna elements (eq), and a total amount of conducted power (DB). Although an example depicting conducted power is shown, in certain implementations power control is provided in steps of EIRP or EIS.

Figure 10A:
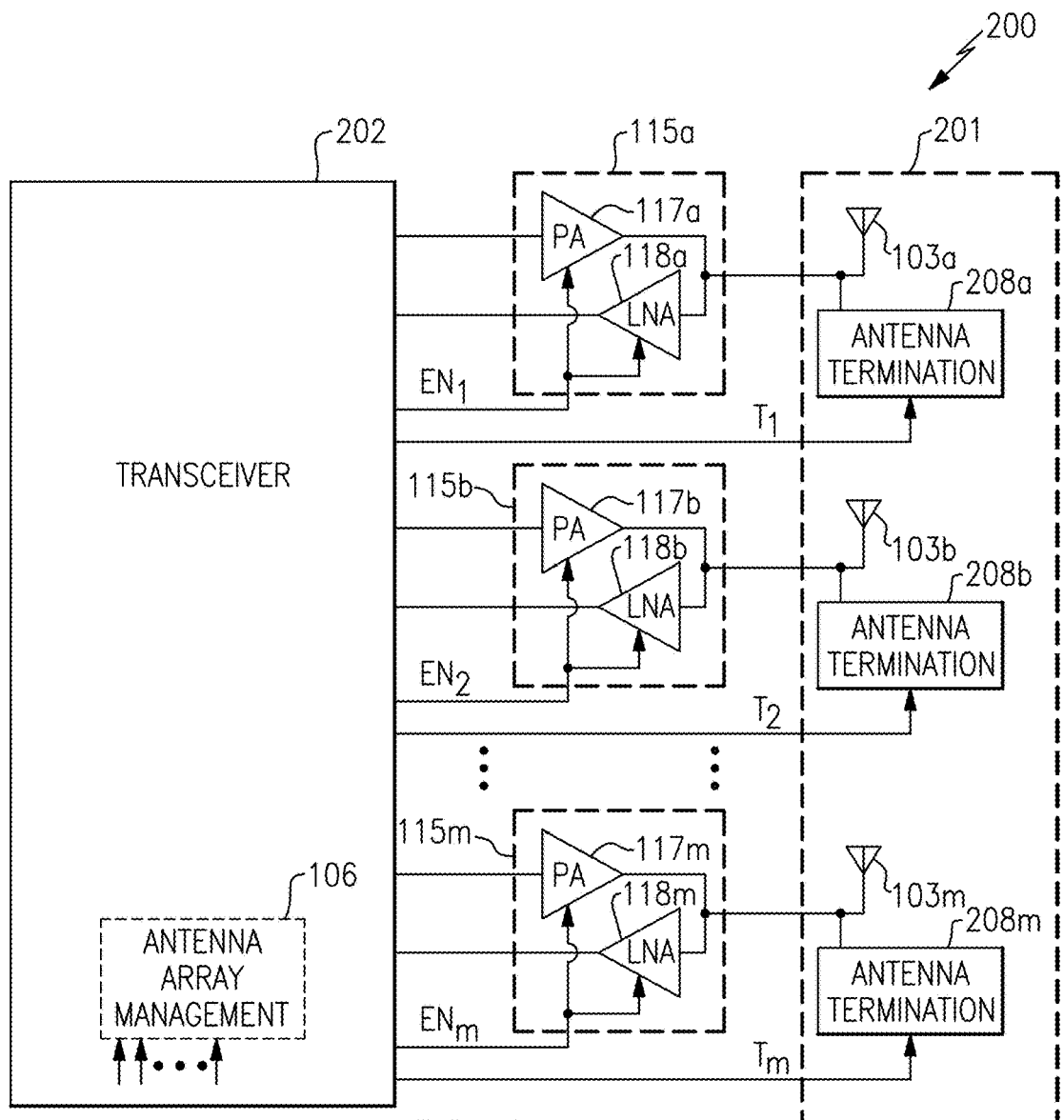
FIG. 10A is a schematic diagram of an RF system with antenna array management to provide power control and with antenna termination based on antenna pattern configuration according to one embodiment.

FIG. 10A is a schematic diagram of an RF system 200 with antenna array management to provide power control and with antenna termination based on antenna pattern configuration according to one embodiment. The RF system 200 includes an antenna array 201, signal conditioning circuits 115a, 115b . . . 115m, and a transceiver 202.

The RF system 200 of FIG. 10A is similar to the RF system 120 of FIG. 4B, except that the antenna array 201 of the RF system 200 further includes controllable antenna termination circuits 208a, 208b . . . 208m. Additionally, the transceiver 202 includes an antenna array management circuit 106 that generates tuning control signals $T_1$, $T_2$ . . . $T_m$ for controlling the antenna termination provided by each of the controllable antenna termination circuits 208a, 208b . . . 208m. In one example, the termination provided can be open, short to ground, or a particular impedance value to ground.

In certain implementations, the selection of active, inactive, and/or attenuated antenna elements impacts EM coupling between antenna elements. Thus, the load of each antenna element is dependent upon beam power and/or direction. Accordingly, a selected antenna pattern configuration can impact EM coupling between antenna elements.

In the illustrated embodiment, the termination of a deactivated antenna element is controlled based on the EM coupling associated with the selected antenna pattern configuration. Thus, the tuning control signals $T_1$, $T_2$ . . . $T_m$ change based on the state of the enable signals $EN_1$, $EN_2$ . . . $EN_m$ used to select the antenna pattern configuration. Accordingly, compensation for EM coupling is provided.

Figure 10B:
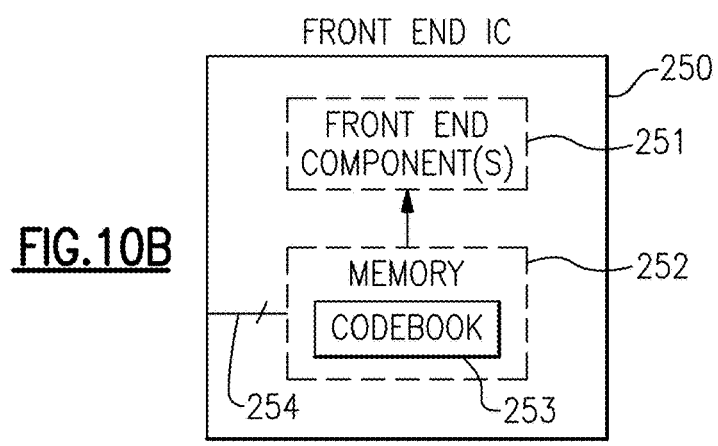
FIG. 10B is a schematic diagram of a front end integrated circuit according to one embodiment.

FIG. 10B is a schematic diagram of a front end IC or semiconductor die 250 according to one embodiment. The front end IC 250 includes at least one front end component 251, a memory circuit 252 including a codebook 253, and an interface 254.

One or more instantiations of the front end IC 250 can be included in an RF system to process signals of an antenna array. For example, the at least one front end component 251 can include one or more components for handling signals processed along one or more RF signal paths connecting to the antenna array. Examples of front end components include, but are not limited to, amplifiers, phase shifters, and/or filters.

The memory circuit 252 includes a codebook 253, which stores settings of the at least one front end component 251, such as power, phase shift, and/or other parameters, which can change for each antenna element and/or for each beam of the array. In the illustrated embodiment, the data of the codebook 253 is compensated for EM coupling associated with a particular antenna pattern configuration. Thus, the codebook 253 stored in the memory circuit 252 reflects compensation for antenna pattern configuration. In certain implementations, the codebook 253 further includes data for compensation digital pre-distortion and/or analog pre-distortion for impacts of EM coupling.

The front end IC 250 further includes the interface 254, which can be, for example, a serial interface such as a MIPI RFFE bus. In certain implementations, the codebook 253 is programmed in the memory circuit 252 via the interface 254.

Figure 11A:
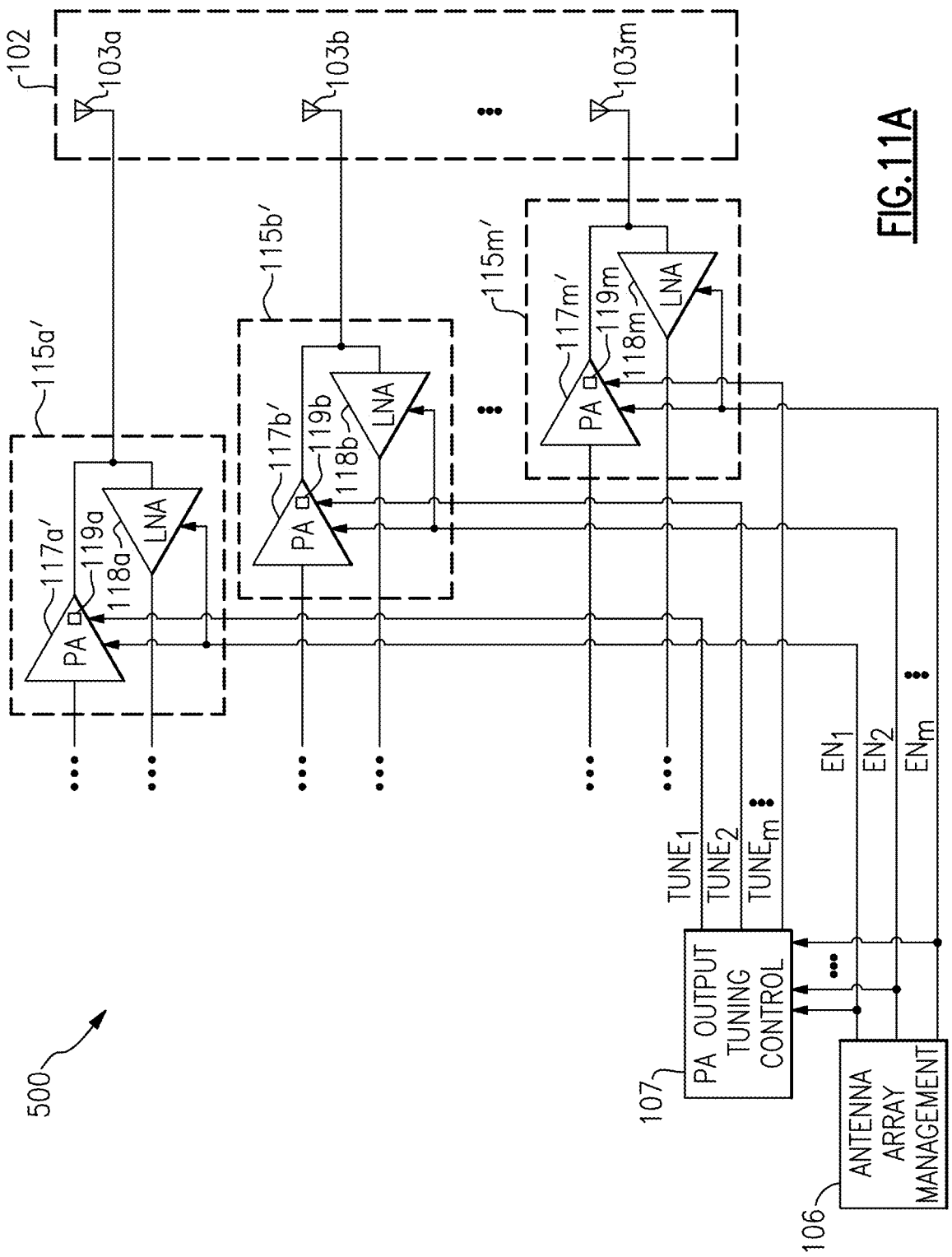
FIG. 11A is a schematic diagram of an RF system with antenna array management to provide power control and with power amplifier output tuning compensation according to one embodiment.

FIG. 11A is a schematic diagram of an RF system 500 with antenna array management to provide power control and with power amplifier output tuning compensation according to one embodiment. The RF system 500 includes an antenna array 102, signal conditioning circuits 115a', 115b' . . . 115m', an antenna array management circuit 106, and a power amplifier output tuning control circuit 107.

Although an embodiment with three antenna elements and corresponding signal conditioning circuits is shown, an RF system can more or fewer antenna elements and/or signal conditioning circuits as indicated by the ellipses.

In the embodiment shown in FIG. 11A, each of the signal conditioning circuits includes a power amplifier and an LNA. For example, the signal conditioning circuit 115a' includes a power amplifier 117a' and an LNA 118a, the signal conditioning circuit 115b' includes a power amplifier 117b' and an LNA 118b, and the signal conditioning circuit 115m' includes a power amplifier 117m' and an LNA 118m.

Although an example of signal conditioning circuits with power amplifiers and LNAs is shown, other implementations of signal conditioning circuits are possible. For example, a signal conditioning circuit can include additional circuitry, including, for example, switches, phase shifters, duplexers, diplexers, and/or other components.

As shown in FIG. 11A, the antenna array management circuit 106 generates enable signals $EN_1$, $EN_2$ . . . $EN_m$ for individually enabling or disabling the signal conditioning circuits 115a', 115b' . . . 115m', respectively. The antenna array management circuit 106 uses the enable signals $EN_1$, $EN_2$ . . . $EN_m$ to provide a particular antenna pattern configuration of the antenna array 102 to provide power control.

As shown in FIG. 11A, the RF system 500 further includes the power amplifier output tuning control circuit 107, which generates tuning control signals $TUNE_1$, $TUNE_2$ . . . $TUNE_m$ based on the antenna pattern configuration, which is indicated by the enable signals enable signals $EN_1$, $EN_2$ . . . $EN_m$, in this embodiment.

When a particular antenna pattern configuration is selected, the impedance matching at an output of one or more of the power amplifiers 117a', 117b' . . . 117m' can be impacted.

In the illustrated embodiment, each of the power amplifiers includes a tunable output impedance circuit. For example, the power amplifier 117a' includes a tunable output impedance circuit 119a, the power amplifier 117b' includes a tunable output impedance circuit 119b, and the power amplifier 117m' includes a tunable output impedance circuit 119m. The tuning control signals $TUNE_1$, $TUNE_2$ . . . $TUNE_m$ are operable to tune the tunable output impedance circuits 119a, 119b . . . 119m, respectively, to compensate for a variation in output impedance arising from a particular antenna pattern configuration.

Figure 11B:
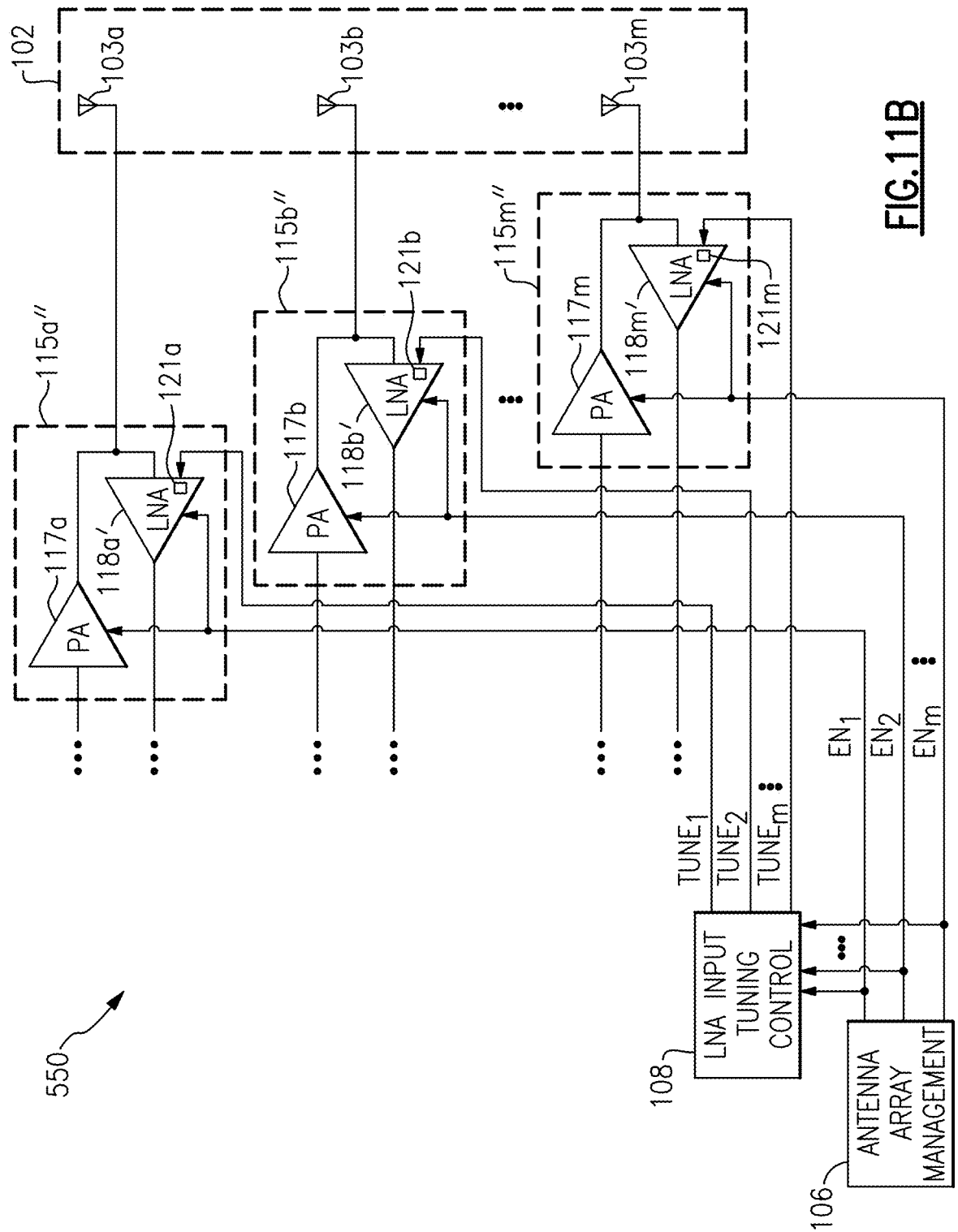
FIG. 11B is a schematic diagram of an RF system with antenna array management to provide power control and with low noise amplifier input tuning compensation according to one embodiment.

FIG. 11B is a schematic diagram of an RF system 550 with antenna array management to provide power control and with low noise amplifier input tuning compensation according to one embodiment. The RF system 550 includes an antenna array 102, signal conditioning circuits 115a", 115b" . . . 115m", an antenna array management circuit 106, and an LNA input tuning control circuit 108.

Although an embodiment with three antenna elements and corresponding signal conditioning circuits is shown, an RF system can more or fewer antenna elements and/or signal conditioning circuits as indicated by the ellipses.

In the embodiment shown in FIG. 11B, each of the signal conditioning circuits includes a power amplifier and an LNA. For example, the signal conditioning circuit 115a" includes a power amplifier 117a and an LNA 118a', the signal conditioning circuit 115b" includes a power amplifier 117b and an LNA 118b', and the signal conditioning circuit 115m" includes a power amplifier 117m and an LNA 118m'.

Although an example of signal conditioning circuits with power amplifiers and LNAs is shown, other implementations of signal conditioning circuits are possible. For example, a signal conditioning circuit can include additional circuitry, including, for example, switches, phase shifters, duplexers, diplexers, and/or other components.

As shown in FIG. 11B, the antenna array management circuit 106 generates enable signals $EN_1$, $EN_2$ . . . $EN_m$ for individually controlling the signal conditioning circuits 115a", 115b" . . . 115m", respectively. The enable signals $EN_1$, $EN_2$ . . . $EN_m$ are used to select a particular antenna pattern configuration to provide power control.

As shown in FIG. 11B, the RF system 550 further includes the LNA input tuning control circuit 108, which generates tuning control signals $TUNE_1$, $TUNE_2$ . . . $TUNE_m$ based on the antenna pattern configuration, which is indicated by the enable signals enable signals $EN_1$, $EN_2$ . . . $EN_m$, in this embodiment.

When a particular antenna pattern configuration is selected, the impedance matching at an input of one or more of the LNAs 118a', 118b' . . . 118m' can be impacted.

In the illustrated embodiment, each of the LNAs includes a tunable input impedance circuit. For example, the LNA 118a' includes a tunable input impedance circuit 121a, the LNA 118b' includes a tunable input impedance circuit 121b, and the LNA 118m' includes a tunable input impedance circuit 121m. The tuning control signals $TUNE_1$, $TUNE_2$ . . . $TUNE_m$ are operable to tune the tunable input impedance circuits 121a, 121b . . . 121m, respectively, to compensate for a variation in input impedance arising from a particular antenna pattern configuration.

An RF system can provide compensation for EM coupling in a wide variety of ways including, but not limited to, using one or more of the compensation schemes described herein. For example, an RF system can provide compensation using the compensation schemes of FIG. 10A, FIG. 10B, FIG. 11A, and/or FIG. 11B.

Figure 12B:
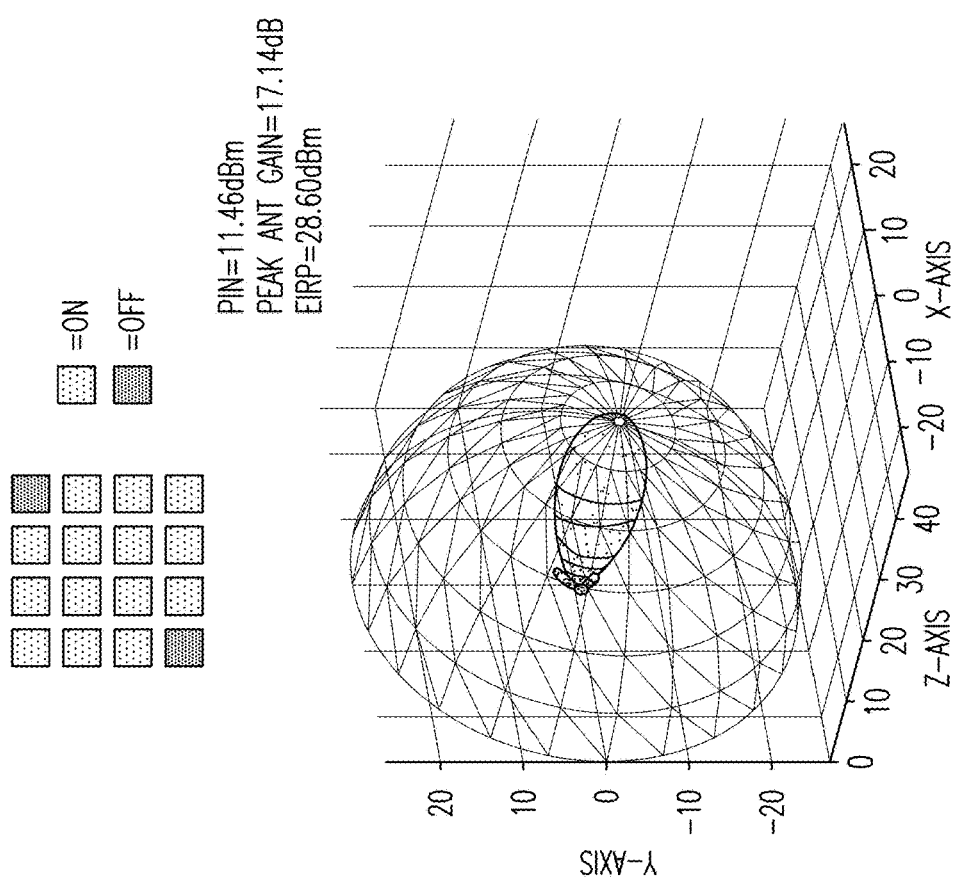
FIG. 12B is graph of simulated beam pattern of a 4×4 array of antenna elements for one scan angle for one example of an antenna pattern configuration with fourteen active antenna elements.
Figure 12A:
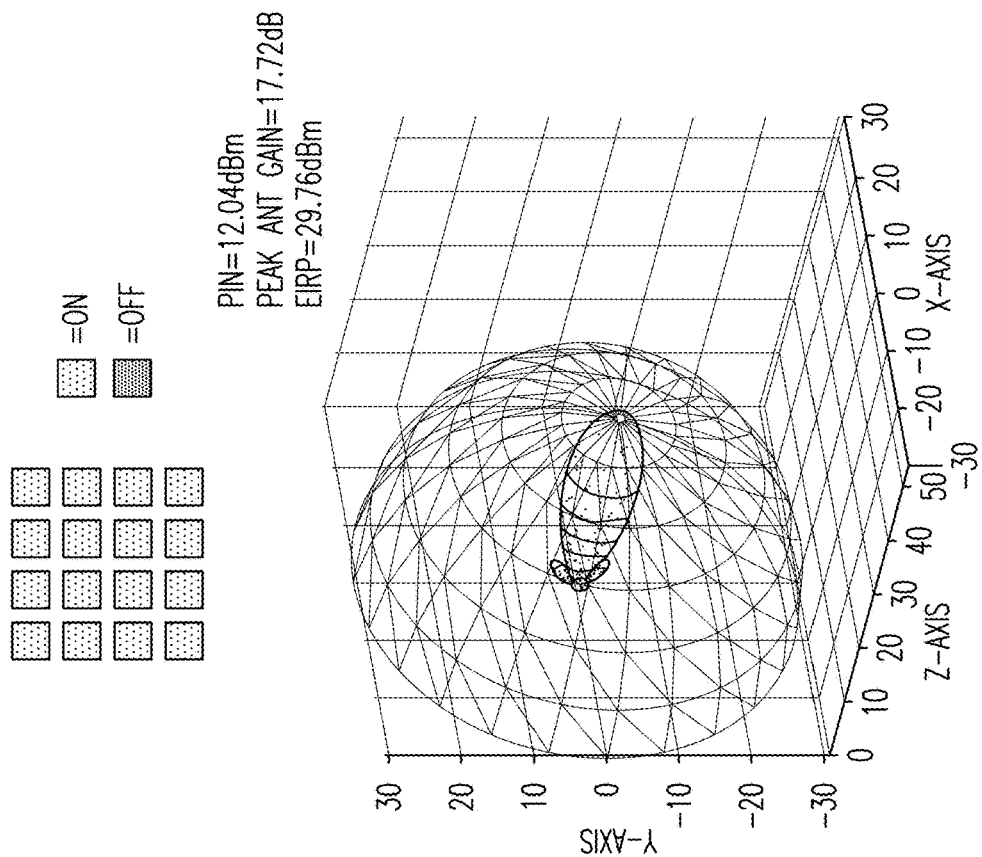
FIG. 12A is graph of simulated beam pattern of a four by four (4×4) array of antenna elements for one scan angle for one example of an antenna pattern configuration with sixteen active antenna elements.

FIG. 12A is graph of simulated beam pattern of a four by four (4×4) array of antenna elements for one scan angle for one example of an antenna pattern configuration with sixteen active antenna elements.

FIG. 12B is graph of simulated beam pattern of a 4×4 array of antenna elements for one scan angle for one example of an antenna pattern configuration with fourteen active antenna elements.

Figure 12D:
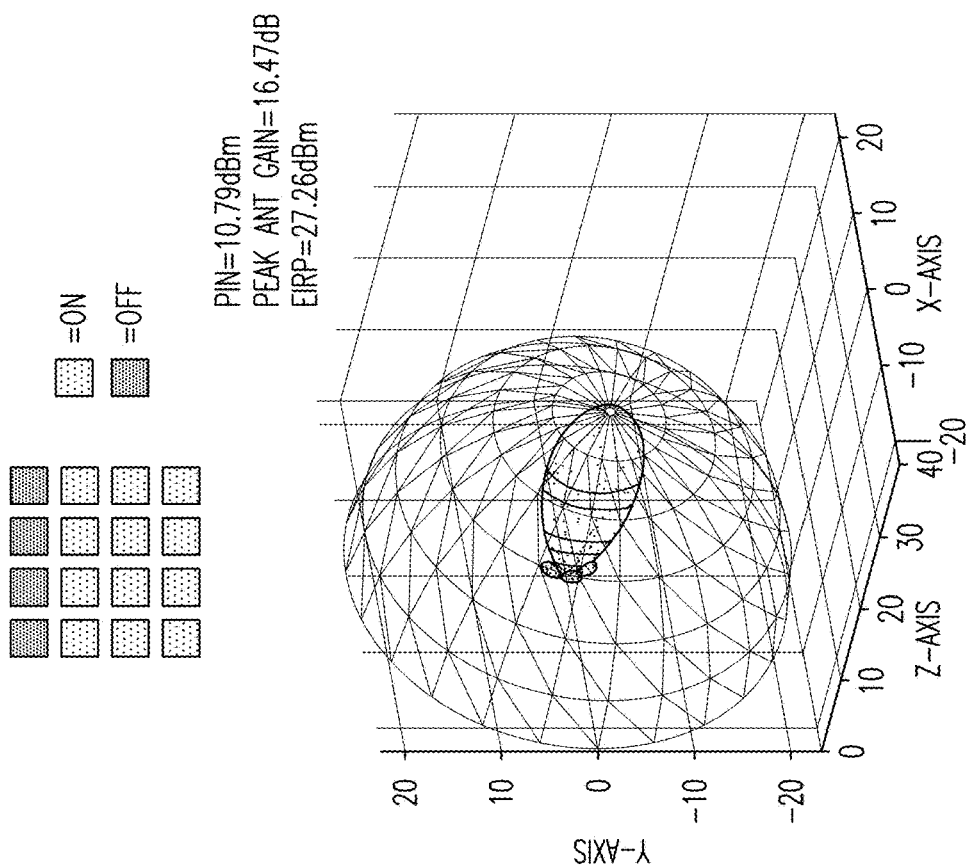
FIG. 12D is graph of simulated beam pattern of a 4×4 array of antenna elements for one scan angle for another example of an antenna pattern configuration with twelve active antenna elements.
Figure 12C:
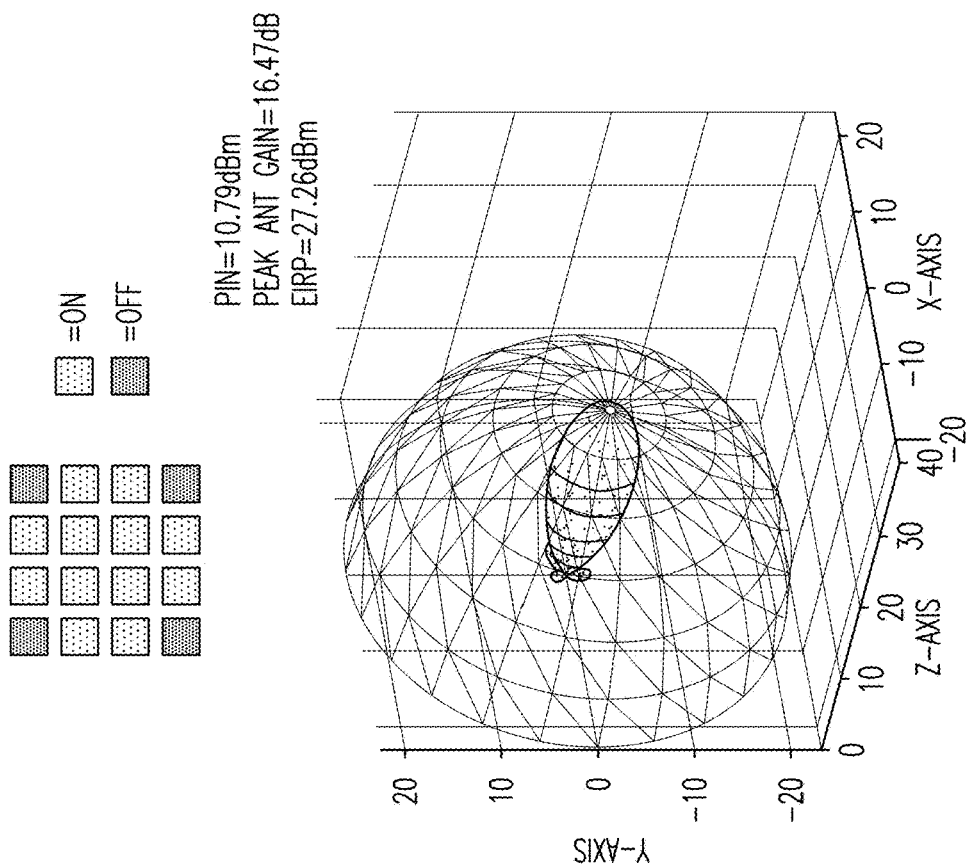
FIG. 12C is graph of simulated beam pattern of a 4×4 array of antenna elements for one scan angle for one example of an antenna pattern configuration with twelve active antenna elements.

FIG. 12C is graph of simulated beam pattern of a 4×4 array of antenna elements for one scan angle for one example of an antenna pattern configuration with twelve active antenna elements.

FIG. 12D is graph of simulated beam pattern of a 4×4 array of antenna elements for one scan angle for another example of an antenna pattern configuration with twelve active antenna elements.

Figure 12F:
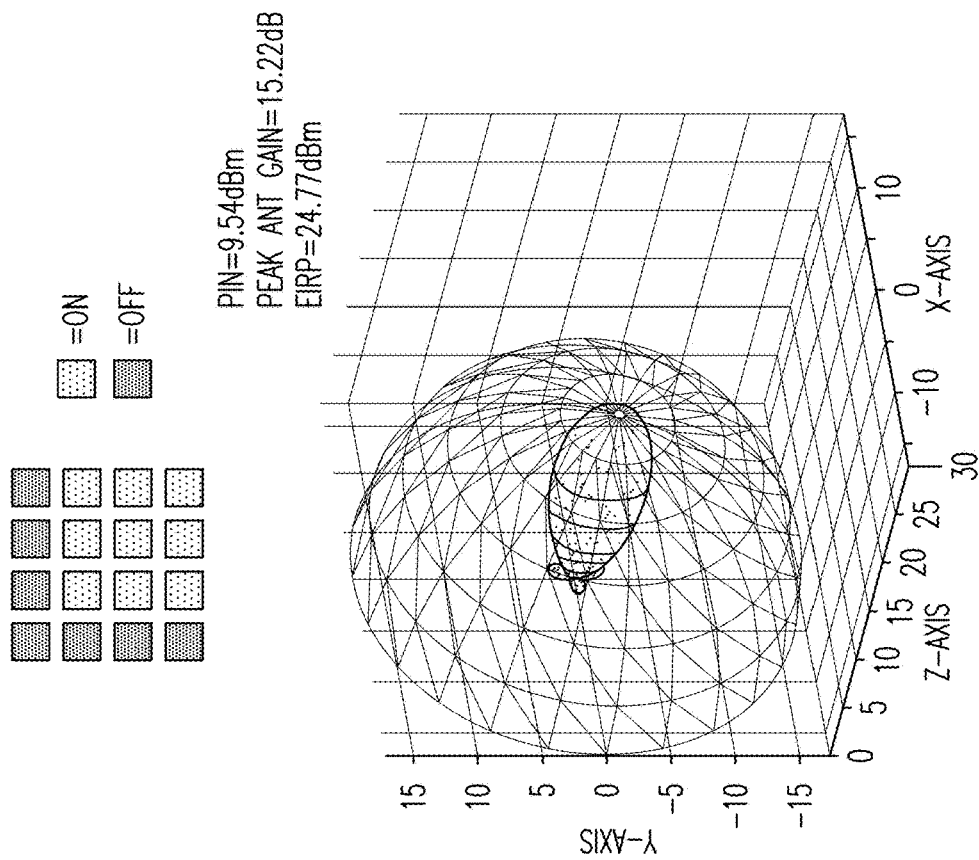
FIG. 12F is graph of simulated beam pattern of a 4×4 array of antenna elements for one scan angle for one example of an antenna pattern configuration with nine active antenna elements.
Figure 12E:
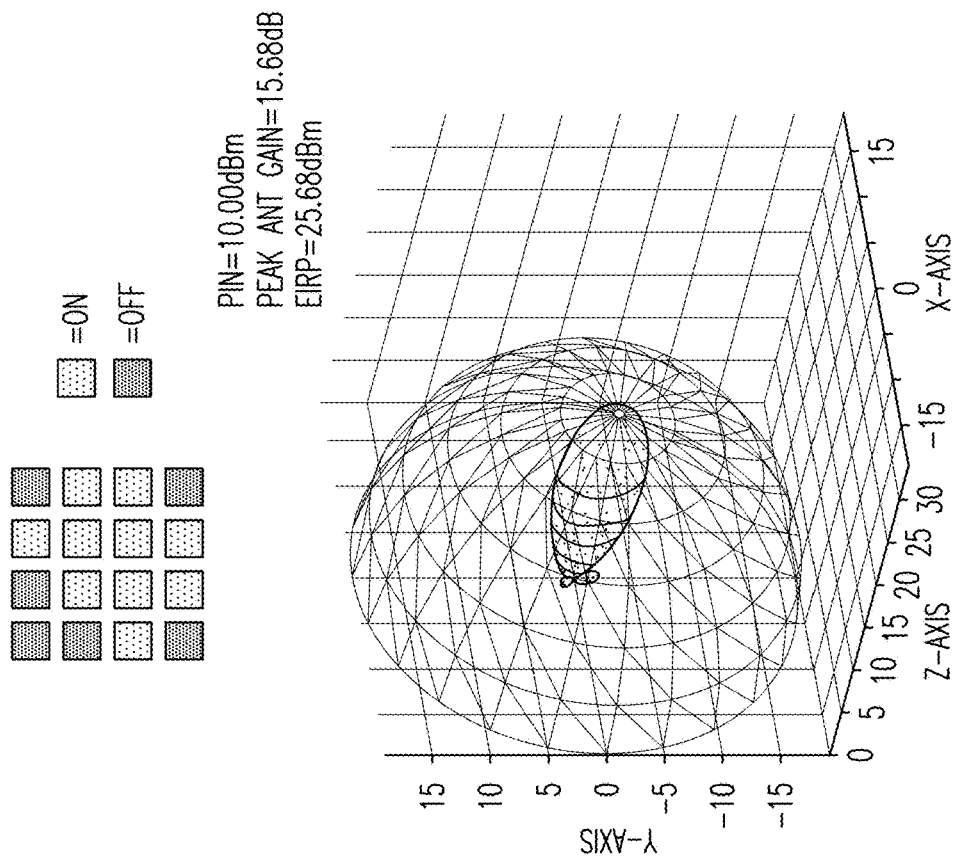
FIG. 12E is graph of simulated beam pattern of a 4×4 array of antenna elements for one scan angle for one example of an antenna pattern configuration with ten active antenna elements.

FIG. 12E is graph of simulated beam pattern of a 4×4 array of antenna elements for one scan angle for one example of an antenna pattern configuration with ten active antenna elements.

FIG. 12F is graph of simulated beam pattern of a 4×4 array of antenna elements for one scan angle for one example of an antenna pattern configuration with nine active antenna elements.

Figure 12H:
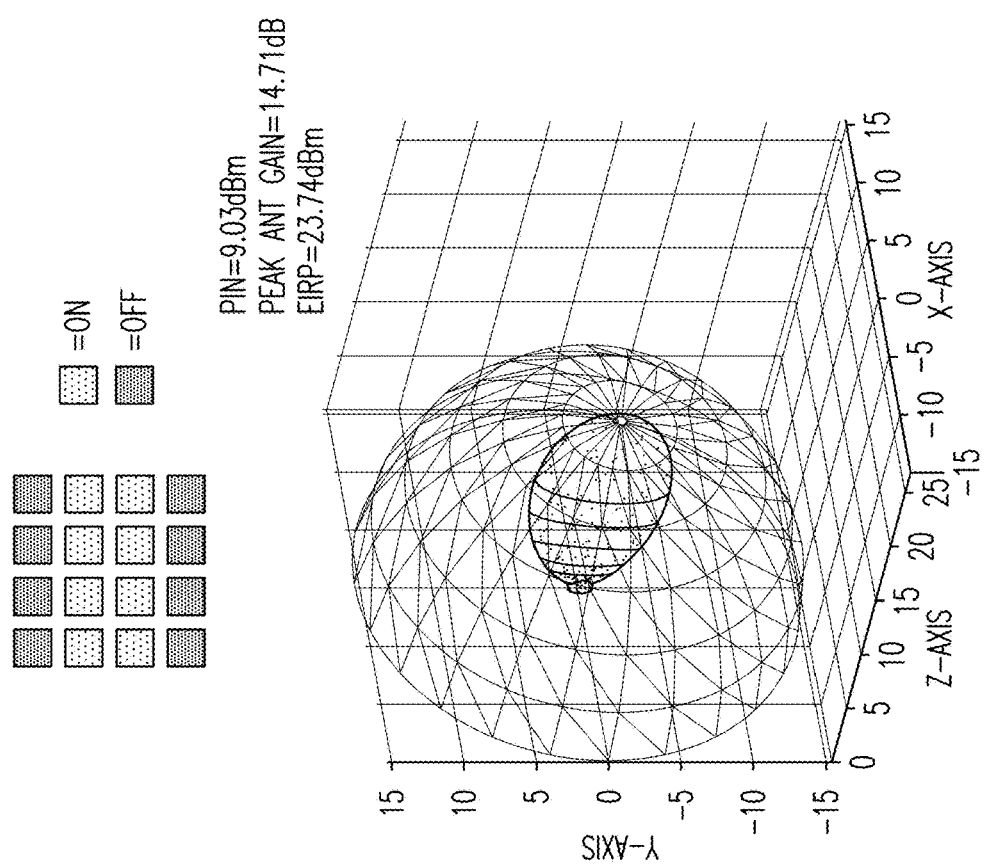
FIG. 12H is graph of simulated beam pattern of a 4×4 array of antenna elements for one scan angle for another example of an antenna pattern configuration with eight active antenna elements.
Figure 12G:
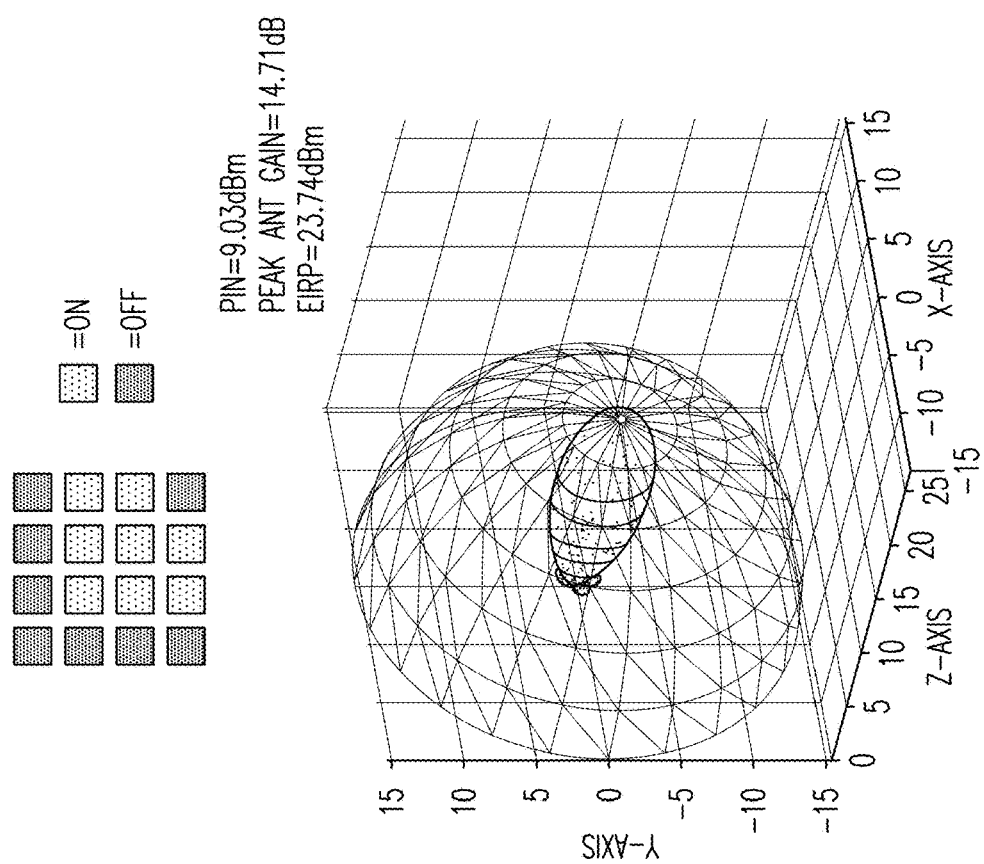
FIG. 12G is graph of simulated beam pattern of a 4×4 array of antenna elements for one scan angle for one example of an antenna pattern configuration with eight active antenna elements.

FIG. 12G is graph of simulated beam pattern of a 4×4 array of antenna elements for one scan angle for one example of an antenna pattern configuration with eight active antenna elements.

FIG. 12H is graph of simulated beam pattern of a 4×4 array of antenna elements for one scan angle for another example of an antenna pattern configuration with eight active antenna elements.

Figure 12J:
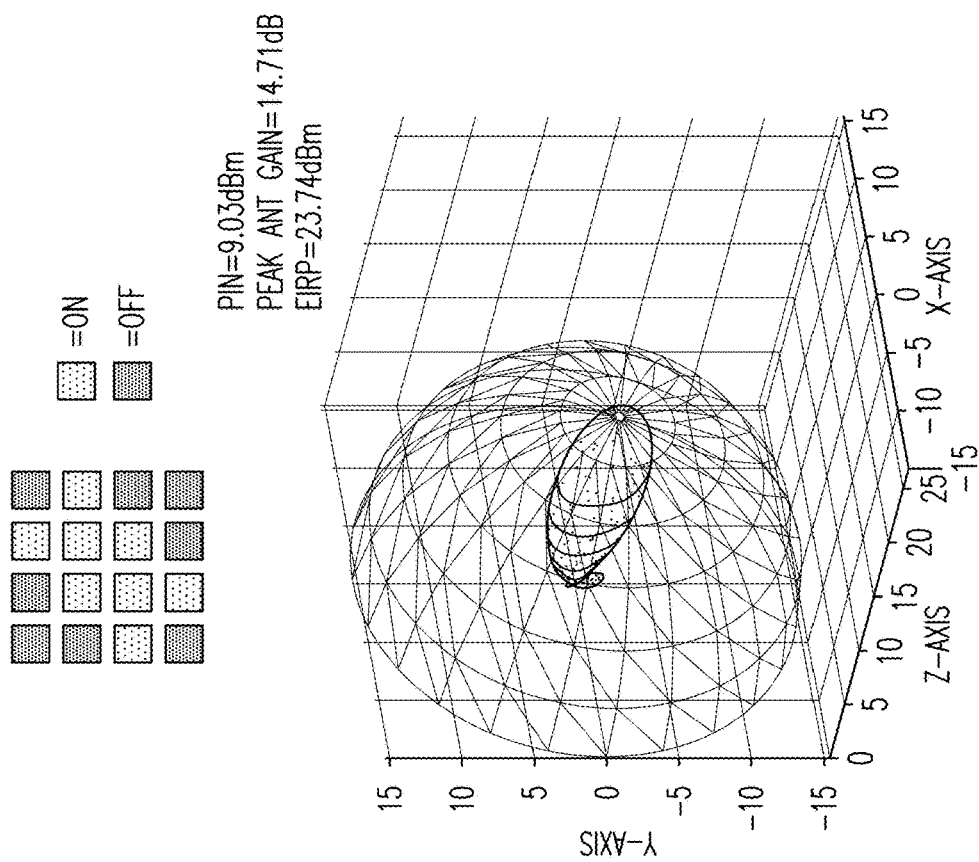
FIG. 12J is graph of simulated beam pattern of a 4×4 array of antenna elements for one scan angle for another example of an antenna pattern configuration with eight active antenna elements.
Figure 12I:
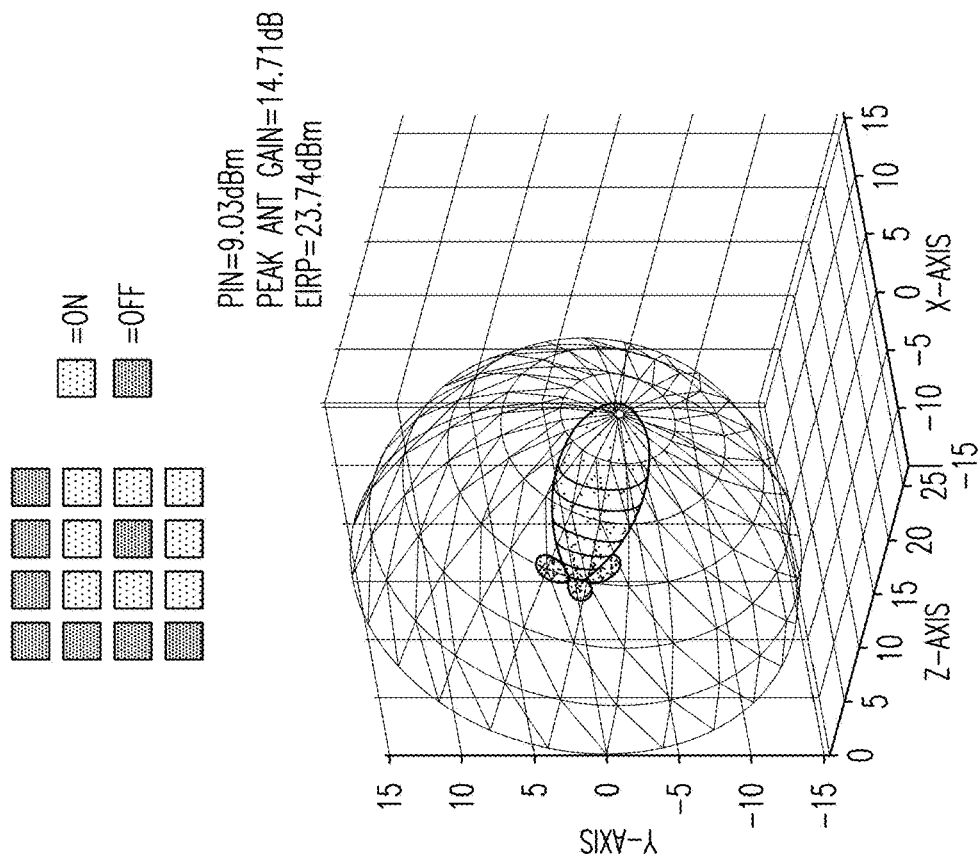
FIG. 12I is graph of simulated beam pattern of a 4×4 array of antenna elements for one scan angle for another example of an antenna pattern configuration with eight active antenna elements.

FIG. 12I is graph of simulated beam pattern of a 4×4 array of antenna elements for one scan angle for another example of an antenna pattern configuration with eight active antenna elements.

FIG. 12J is graph of simulated beam pattern of a 4×4 array of antenna elements for one scan angle for another example of an antenna pattern configuration with eight active antenna elements.

Figure 12L:
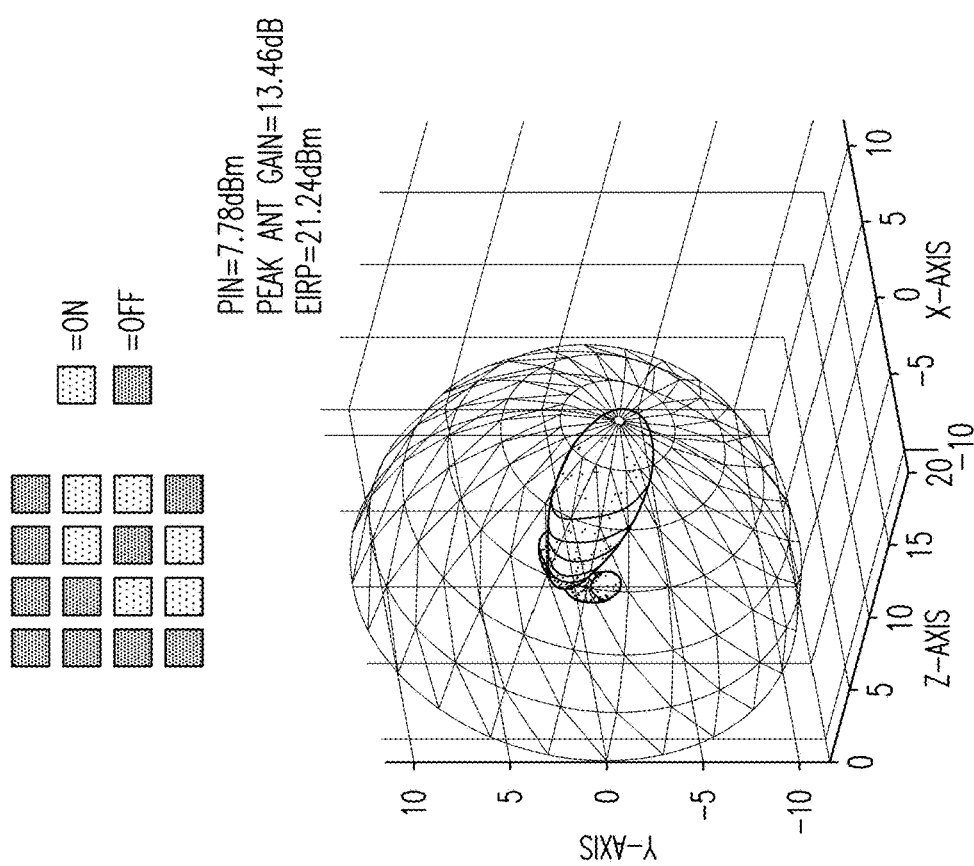
FIG. 12L is graph of simulated beam pattern of a 4×4 array of antenna elements for one scan angle for one example of an antenna pattern configuration with six active antenna elements.
Figure 12K:
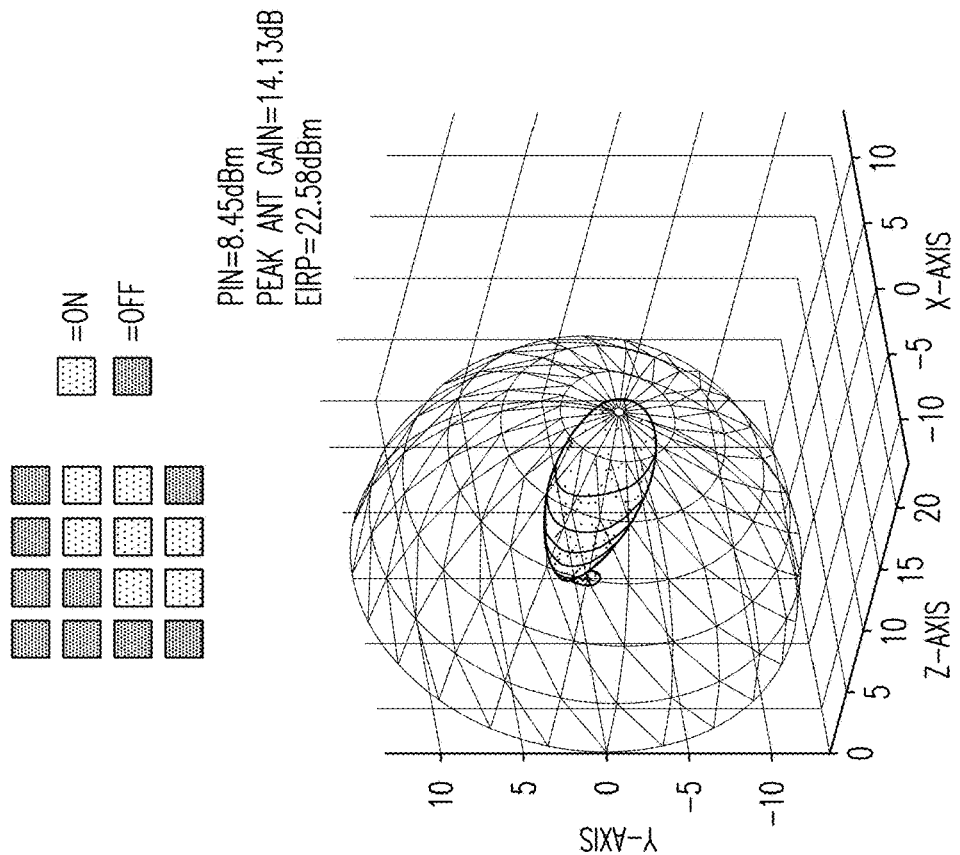
FIG. 12K is graph of simulated beam pattern of a 4×4 array of antenna elements for one scan angle for one example of an antenna pattern configuration with seven active antenna elements.

FIG. 12K is graph of simulated beam pattern of a 4×4 array of antenna elements for one scan angle for one example of an antenna pattern configuration with seven active antenna elements.

FIG. 12L is graph of simulated beam pattern of a 4×4 array of antenna elements for one scan angle for one example of an antenna pattern configuration with six active antenna elements.

Figure 12N:
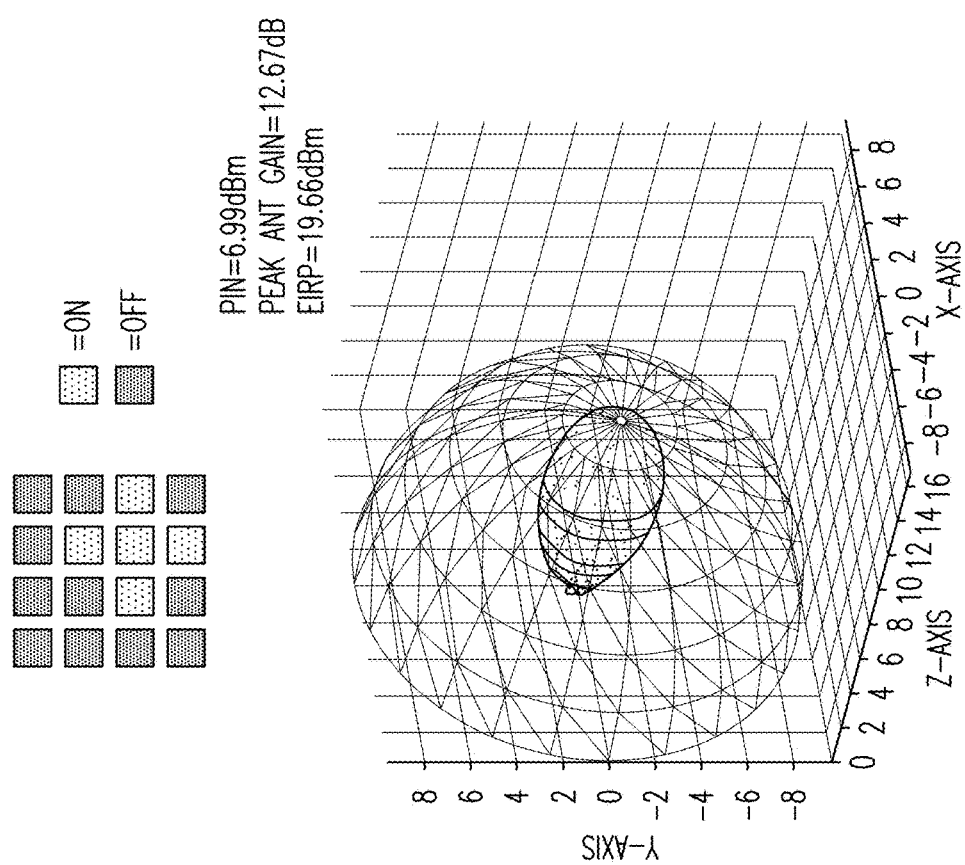
FIG. 12N is graph of simulated beam pattern of a 4×4 array of antenna elements for one scan angle for one example of an antenna pattern configuration with five active antenna elements.
Figure 12M:
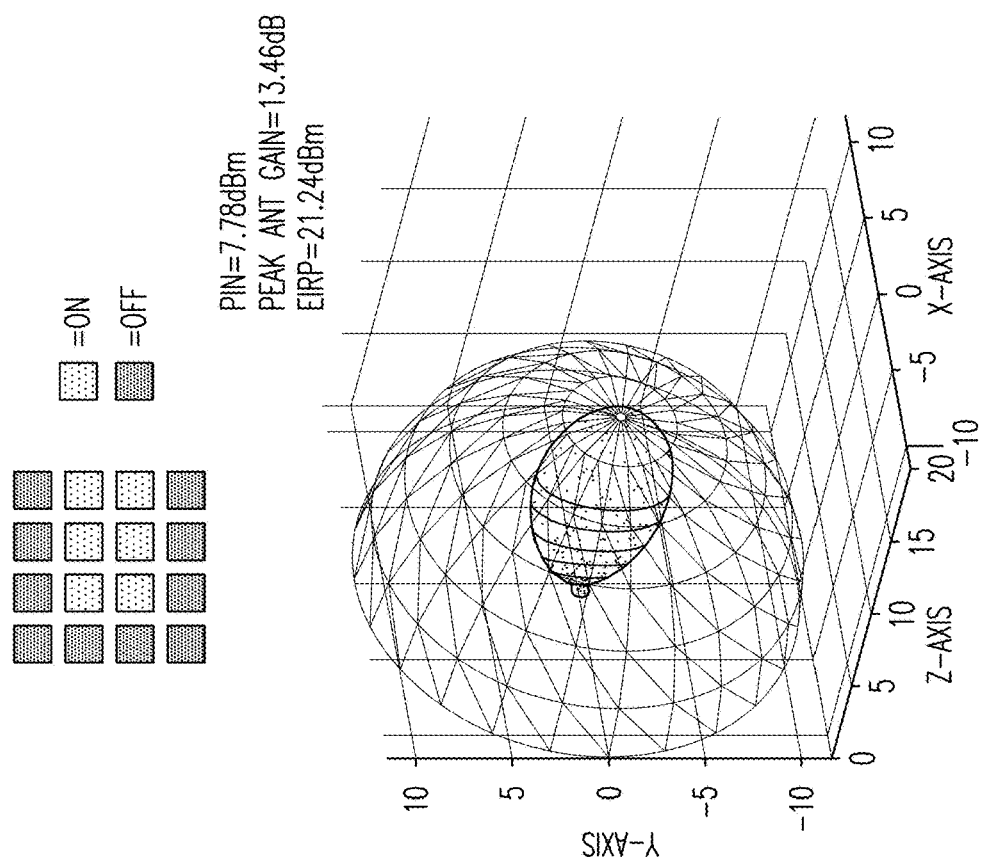
FIG. 12M is graph of simulated beam pattern of a 4×4 array of antenna elements for one scan angle for another example of an antenna pattern configuration with six active antenna elements.

FIG. 12M is graph of simulated beam pattern of a 4×4 array of antenna elements for one scan angle for another example of an antenna pattern configuration with six active antenna elements.

FIG. 12N is graph of simulated beam pattern of a 4×4 array of antenna elements for one scan angle for one example of an antenna pattern configuration with five active antenna elements.

Figure 12P:
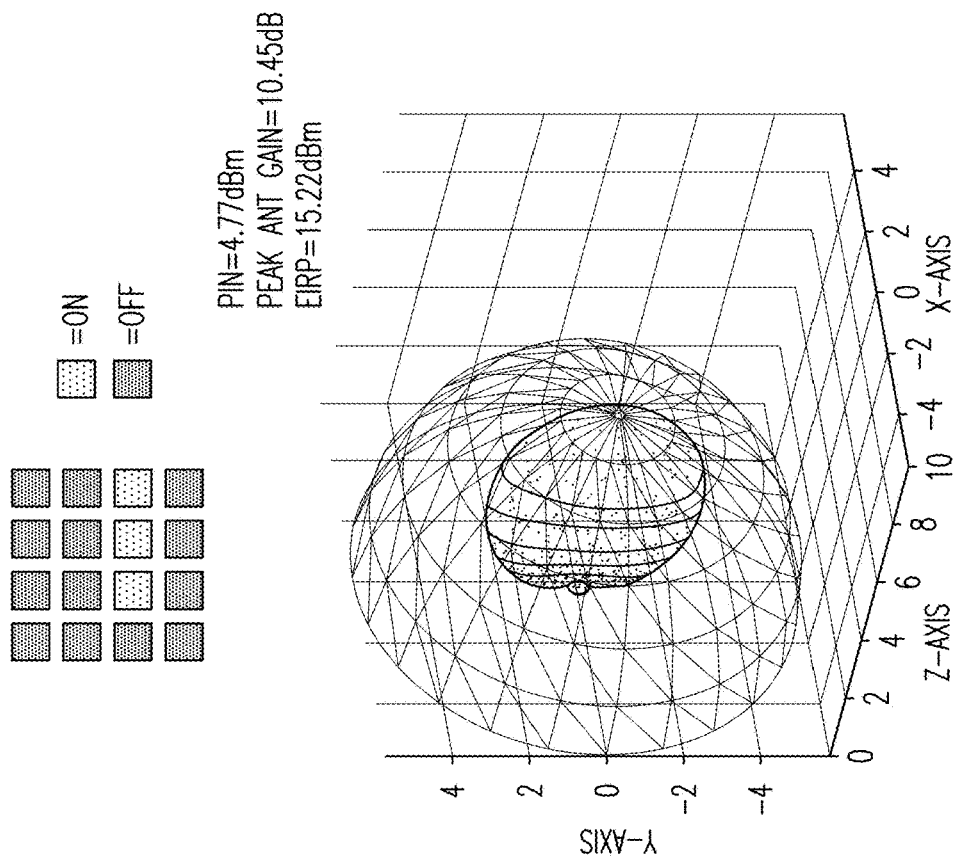
FIG. 12P is graph of simulated beam pattern of a 4×4 array of antenna elements for one scan angle for one example of an antenna pattern configuration with three active antenna elements.
Figure 12O:
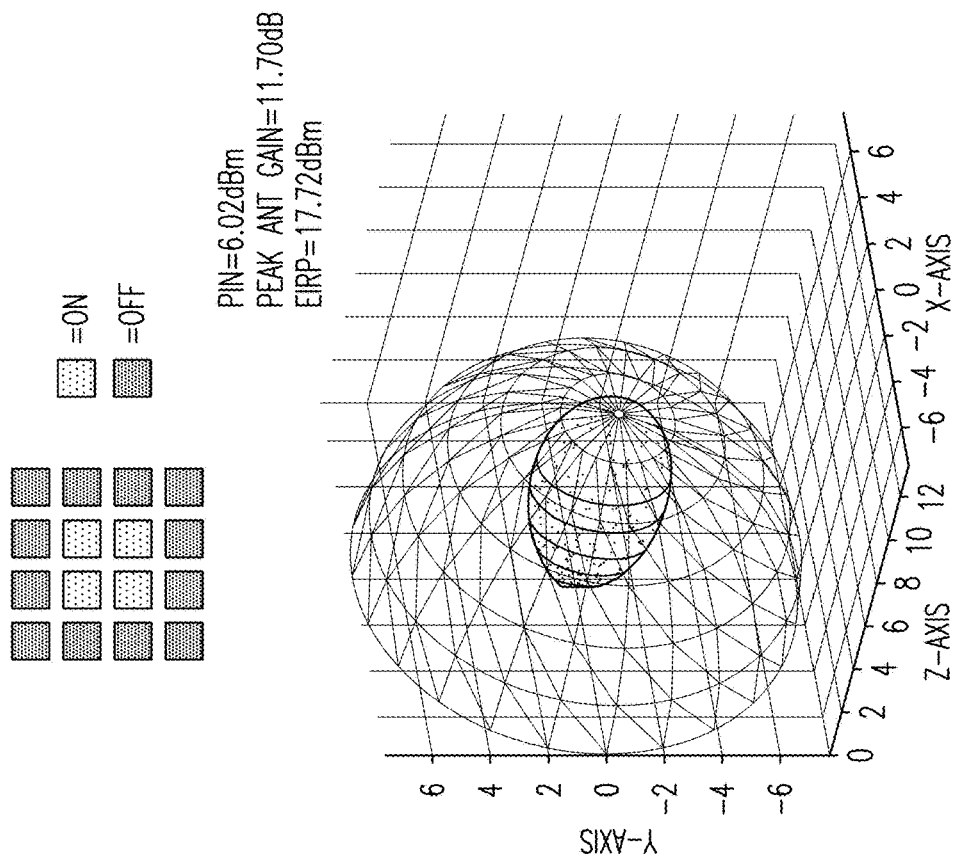
FIG. 12O is graph of simulated beam pattern of a 4×4 array of antenna elements for one scan angle for one example of an antenna pattern configuration with four active antenna elements.

FIG. 12O is graph of simulated beam pattern of a 4×4 array of antenna elements for one scan angle for one example of an antenna pattern configuration with four active antenna elements.

FIG. 12P is graph of simulated beam pattern of a 4×4 array of antenna elements for one scan angle for one example of an antenna pattern configuration with three active antenna elements.

Figure 12R:
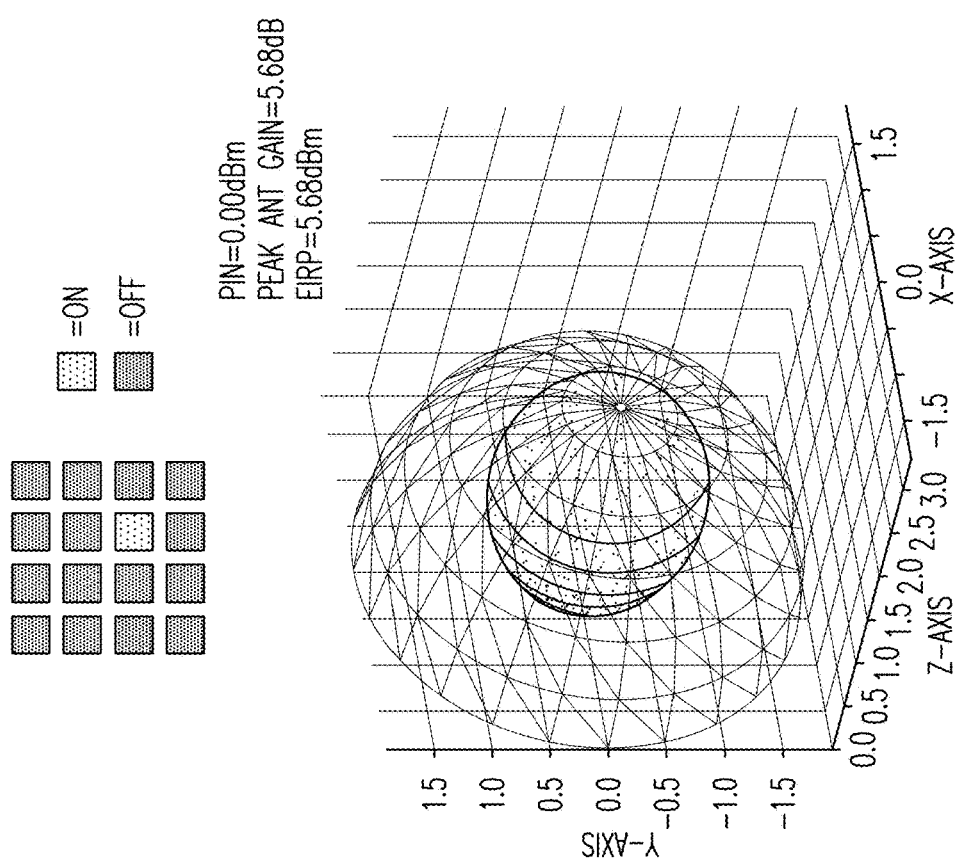
FIG. 12R is graph of simulated beam pattern of a 4×4 array of antenna elements for one scan angle for one example of an antenna pattern configuration with one active antenna elements.
Figure 12Q:
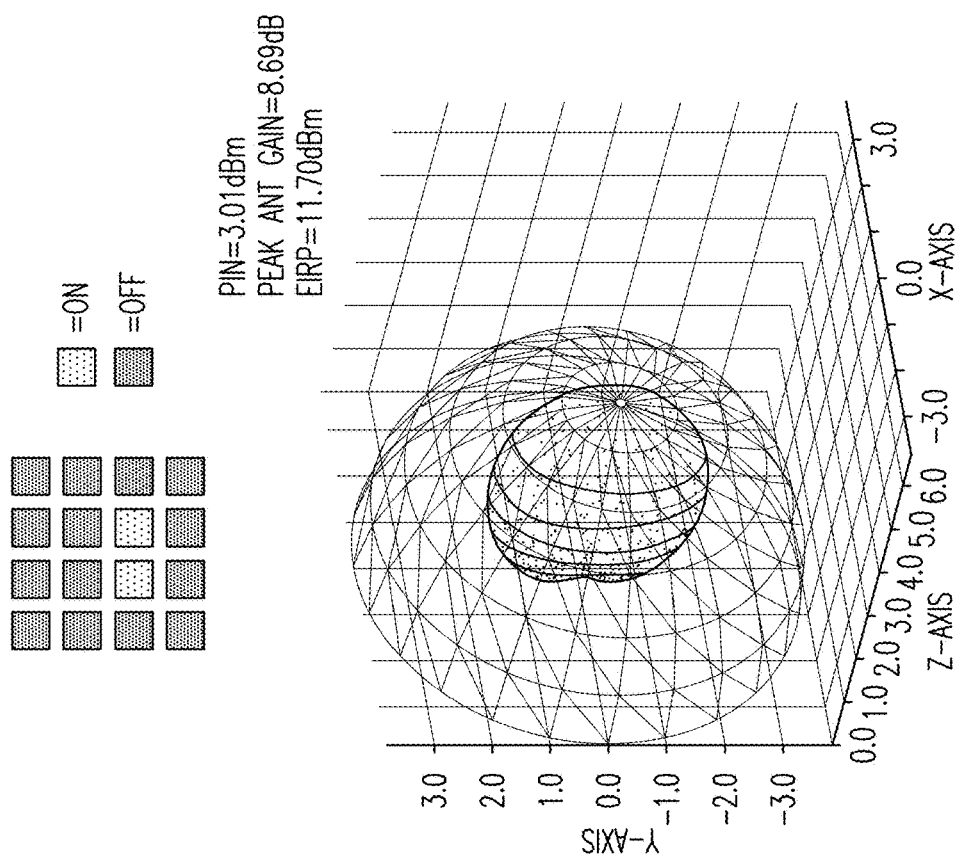
FIG. 12Q is graph of simulated beam pattern of a 4×4 array of antenna elements for one scan angle for one example of an antenna pattern configuration with two active antenna elements.

FIG. 12Q is graph of simulated beam pattern of a 4×4 array of antenna elements for one scan angle for one example of an antenna pattern configuration with two active antenna elements.

FIG. 12R is graph of simulated beam pattern of a 4×4 array of antenna elements for one scan angle for one example of an antenna pattern configuration with one active antenna element.

The graphs shown in FIGS. 12A-12R depict simulated beam pattern for eighteen antenna pattern configurations of a 4×4 antenna array. However, the teachings herein are applicable to other antenna pattern configurations as well as to other array sizes and/or shapes. In this example, the antenna pattern configurations were selected to provide at least some symmetry about a center point of the antenna pattern.

The simulations were performed for one example of an antenna model in which each antenna element has a peak gain of about 5.7 dB, a lateral gain of about −6.3 dB, an efficiency of about 61.4%, a 3 dB beamwidth of about 84 degrees (°), and a 10 dB beamwidth of about 153°. The simulations in FIGS. 12A-12R were performed for a scan angle of about 0° with respect to the x-axis and about 0° with respect to the y-axis. Thus, the beam points substantially along the z-axis, in this example.

For each simulated antenna pattern configuration, each antenna element is graphically depicted with a fill to indicate whether a particular antenna element is in an activated or ON state or in a deactivated or OFF state. The graphs have also been annotated to show the simulated input power, peak antenna gain, and EIRP for the particular simulated antenna pattern configuration. In the simulations, a length of the lobe (relative to the origin of the graph) is an indication of the electric field strength of the beam.

Table 1 below depicts a summary of simulation results associated with the graphs of FIGS. 12A-12R.

TABLE 1

| Number of Active Antenna Elements | Antenna Pattern | Power Input mW | Power Input dB | Peak Ant Gain dB | EIRP at Peak dBm | Delta EIRP dB below max | 3 dB Beamwidth at widest pt | 10 dB Beam width at widest pt |
|---|---|---|---|---|---|---|---|---|
| 16 | FIG. 12A | 16 | 12.04 | 17.72 | 29.76 | 0.00 | 25.5° | 45.5° |
| 14 | FIG. 12B | 14 | 11.46 | 17.14 | 28.60 | −1.16 | 31.0° | 55.5° |
| 12 | FIG. 12C | 12 | 10.79 | 16.47 | 27.26 | −2.50 | 29.0° | 51.5° |
| 12 | FIG. 12D | 12 | 10.79 | 16.47 | 27.26 | −2.50 | 33.0° | 57.5° |
| 10 | FIG. 12E | 10 | 10.00 | 15.68 | 25.68 | −4.08 | 34.0° | 60.0° |
| 9 | FIG. 12F | 9 | 9.54 | 15.22 | 24.77 | −4.99 | 33.5° | 61.0° |
| 8 | FIG. 12G | 8 | 9.03 | 14.71 | 23.74 | −6.02 | 39.0° | 71.5° |
| 8 | FIG. 12H | 8 | 9.03 | 14.71 | 23.74 | −6.02 | 48.5° | 87.5° |
| 8 | FIG. 12I | 8 | 9.03 | 14.71 | 23.74 | −6.02 | 31.5° | 56.5° |
| 8 | FIG. 12J | 8 | 9.03 | 14.71 | 23.74 | −6.02 | 42.0° | 74.5° |
| 7 | FIG. 12K | 7 | 8.45 | 14.13 | 22.58 | −7.18 | 47.0° | 86.5° |
| 6 | FIG. 12L | 6 | 7.78 | 13.46 | 21.24 | −8.52 | 44.0° | 79.5° |
| 6 | FIG. 12M | 6 | 7.78 | 13.46 | 21.24 | −8.52 | 48.5° | 87.5° |
| 5 | FIG. 12N | 5 | 6.99 | 12.67 | 19.66 | −10.10 | 42.0° | 79.0° |
| 4 | FIG. 12O | 4 | 6.02 | 11.70 | 17.72 | −12.04 | 49.5° | 92.5° |
| 3 | FIG. 12P | 3 | 4.77 | 10.45 | 15.22 | −14.54 | 84.0° | 153.0° |
| 2 | FIG. 12Q | 2 | 3.01 | 8.69 | 11.70 | −18.06 | 84.0° | 153.0° |
| 1 | FIG. 12R | 1 | 0.00 | 5.68 | 5.68 | −24.08 | 84.0° | 153.0° |

Figure 13B:
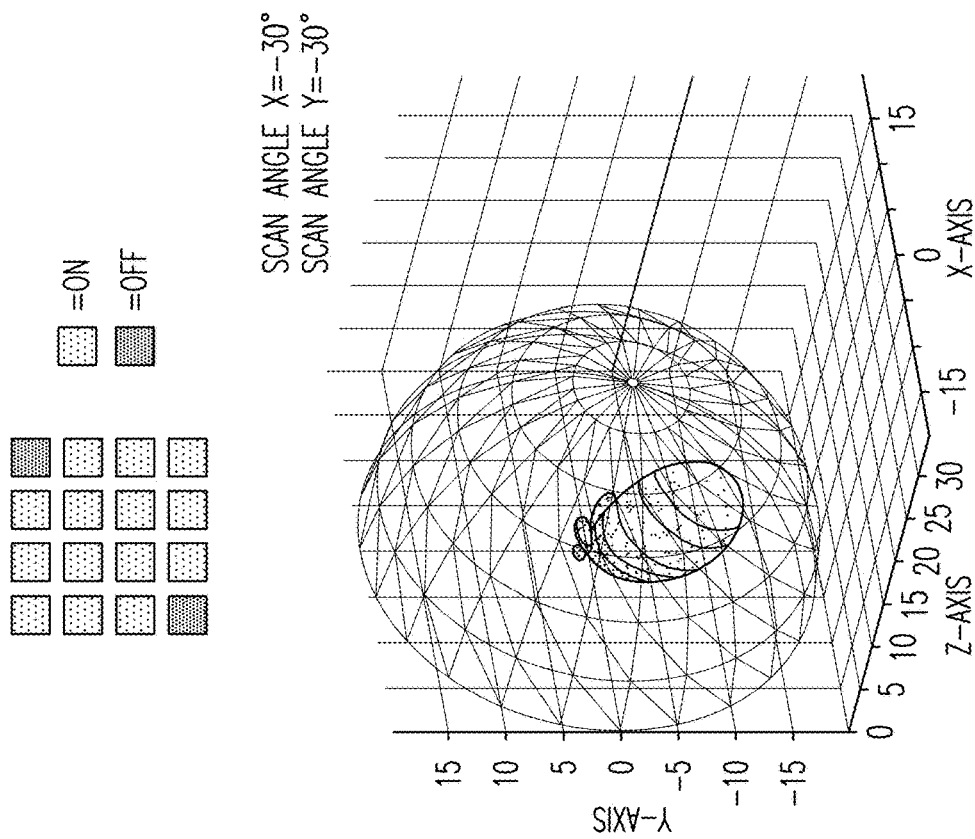
FIG. 13B is graph of simulated beam pattern of a 4×4 array of antenna elements for another scan angle for one example of an antenna pattern configuration with fourteen active antenna elements.
Figure 13A:
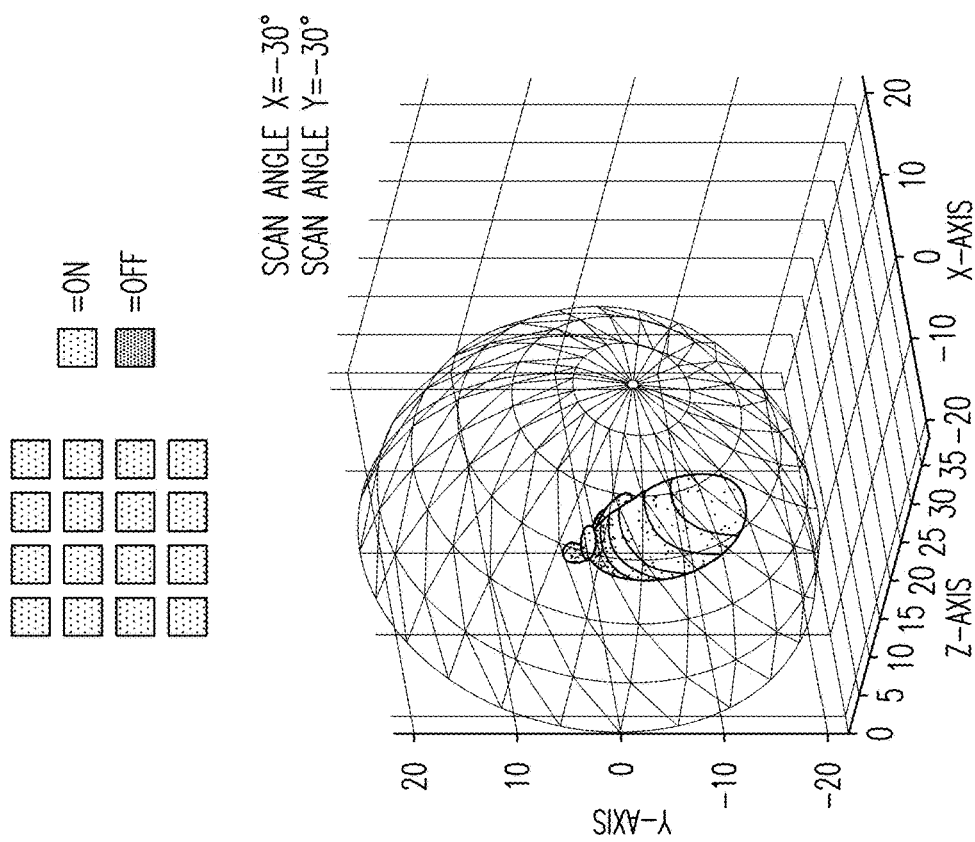
FIG. 13A is graph of simulated beam pattern of a 4×4 array of antenna elements for another scan angle for one example of an antenna pattern configuration with sixteen active antenna elements.

FIG. 13A is graph of simulated beam pattern of a 4×4 array of antenna elements for another scan angle for one example of an antenna pattern configuration with sixteen active antenna elements.

FIG. 13B is graph of simulated beam pattern of a 4×4 array of antenna elements for another scan angle for one example of an antenna pattern configuration with fourteen active antenna elements.

Figure 13D:
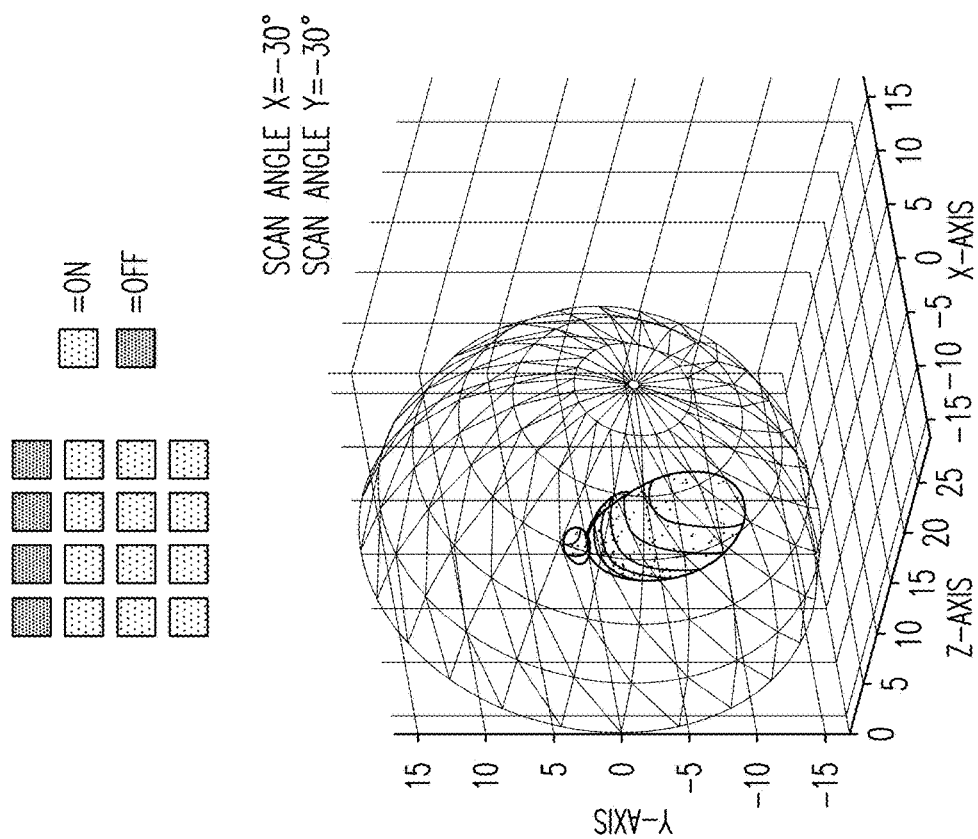
FIG. 13D is graph of simulated beam pattern of a 4×4 array of antenna elements for another scan angle for another example of an antenna pattern configuration with twelve active antenna elements.
Figure 13C:
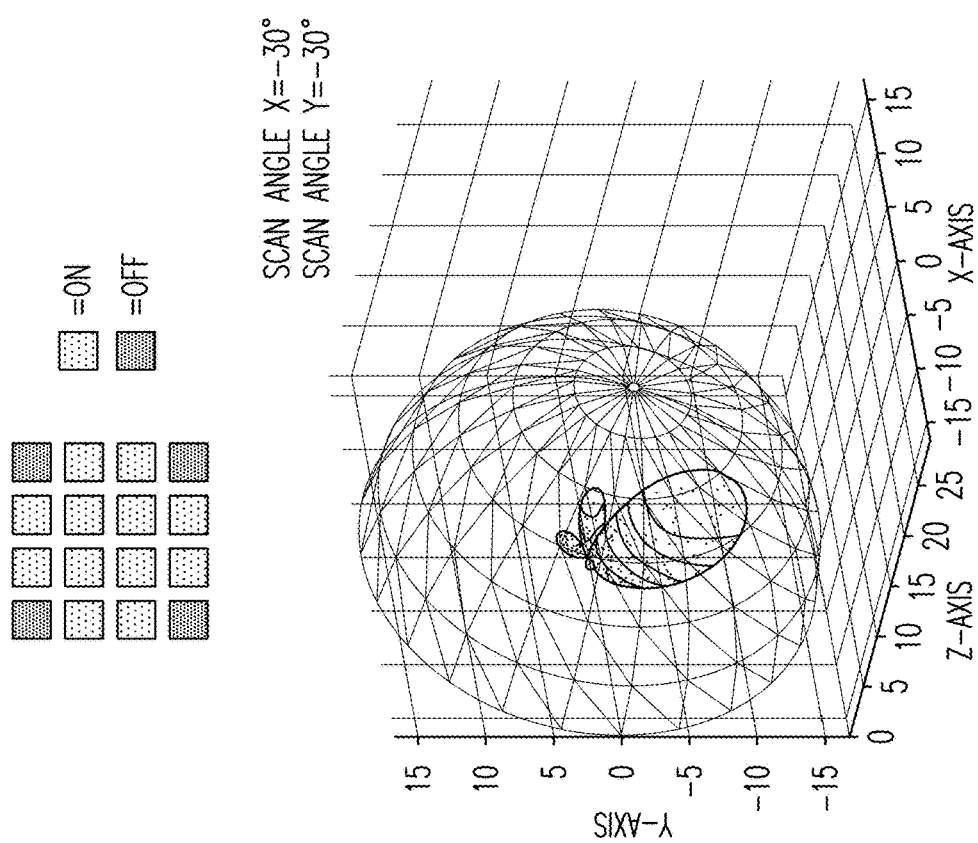
FIG. 13C is graph of simulated beam pattern of a 4×4 array of antenna elements for another scan angle for one example of an antenna pattern configuration with twelve active antenna elements.

FIG. 13C is graph of simulated beam pattern of a 4×4 array of antenna elements for another scan angle for one example of an antenna pattern configuration with twelve active antenna elements.

FIG. 13D is graph of simulated beam pattern of a 4×4 array of antenna elements for another scan angle for another example of an antenna pattern configuration with twelve active antenna elements.

Figure 13F:
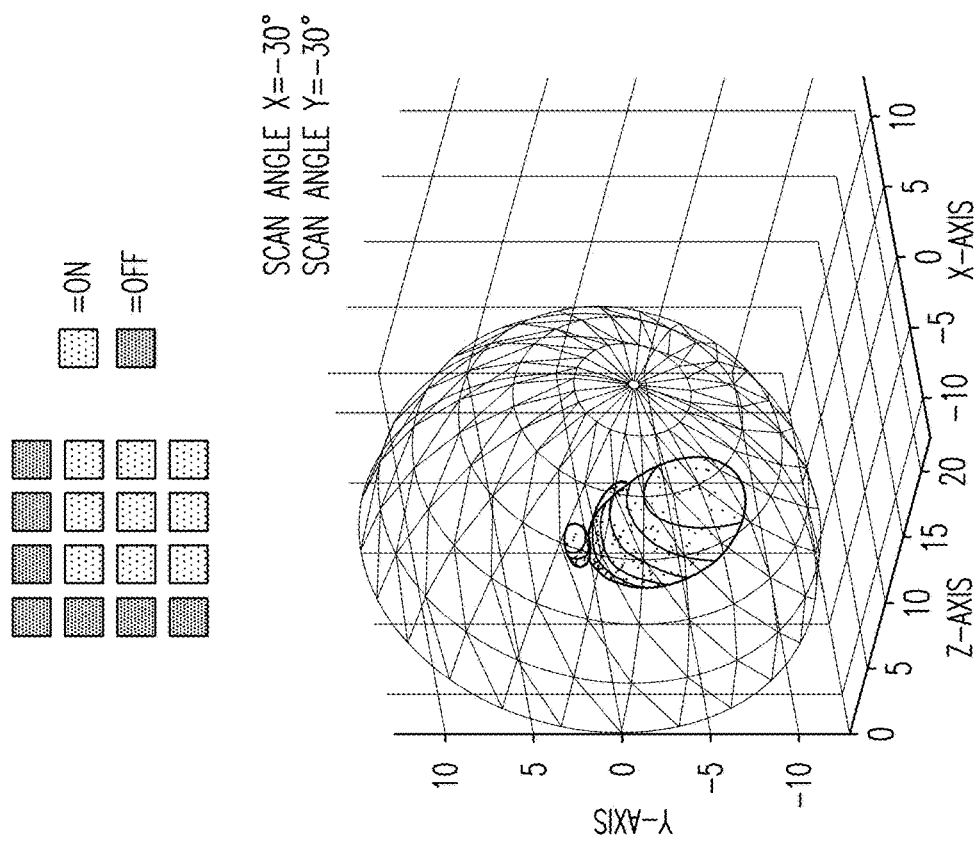
FIG. 13F is graph of simulated beam pattern of a 4×4 array of antenna elements for another scan angle for one example of an antenna pattern configuration with nine active antenna elements.
Figure 13E:
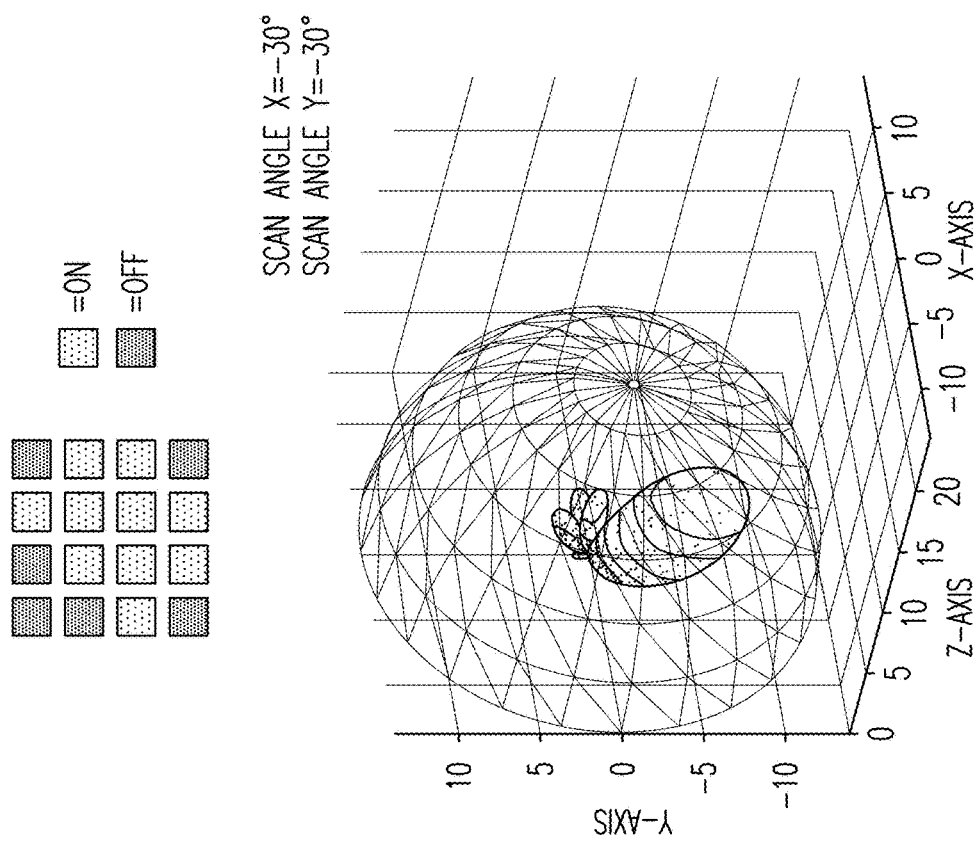
FIG. 13E is graph of simulated beam pattern of a 4×4 array of antenna elements for another scan angle for one example of an antenna pattern configuration with ten active antenna elements.

FIG. 13E is graph of simulated beam pattern of a 4×4 array of antenna elements for another scan angle for one example of an antenna pattern configuration with ten active antenna elements.

FIG. 13F is graph of simulated beam pattern of a 4×4 array of antenna elements for another scan angle for one example of an antenna pattern configuration with nine active antenna elements.

Figure 13H:
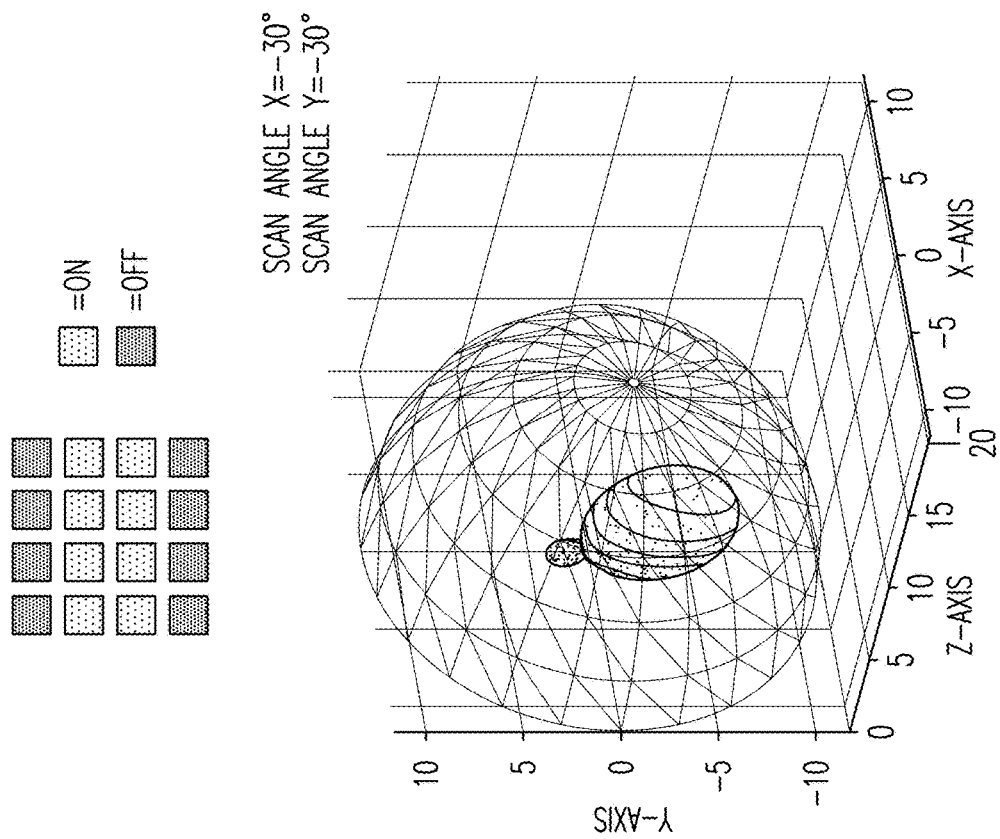
FIG. 13H is graph of simulated beam pattern of a 4×4 array of antenna elements for another scan angle for another example of an antenna pattern configuration with eight active antenna elements.
Figure 13G:
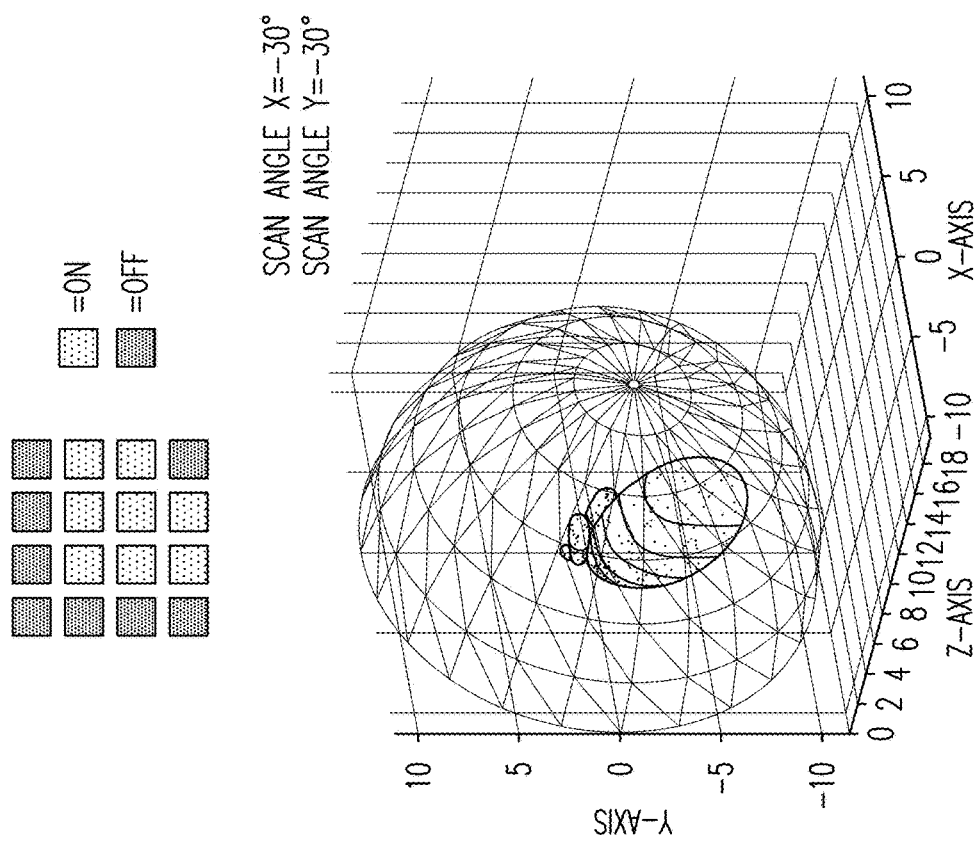
FIG. 13G is graph of simulated beam pattern of a 4×4 array of antenna elements for another scan angle for one example of an antenna pattern configuration with eight active antenna elements.

FIG. 13G is graph of simulated beam pattern of a 4×4 array of antenna elements for another scan angle for one example of an antenna pattern configuration with eight active antenna elements.

FIG. 13H is graph of simulated beam pattern of a 4×4 array of antenna elements for another scan angle for another example of an antenna pattern configuration with eight active antenna elements.

Figure 13J:
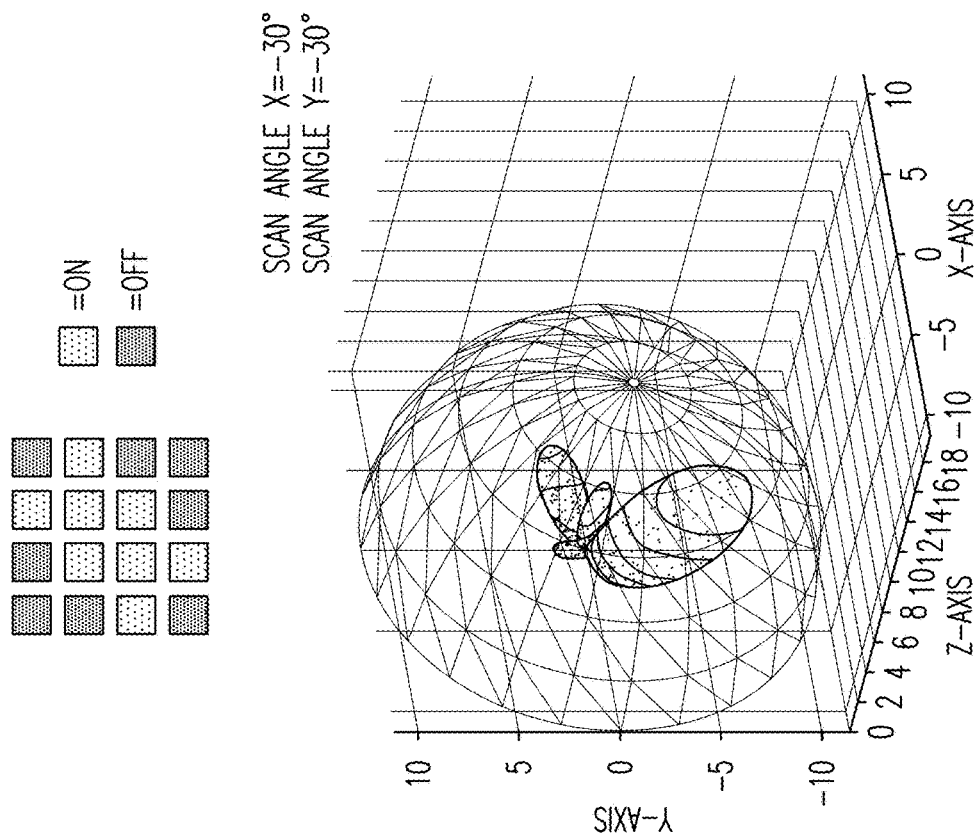
FIG. 13J is graph of simulated beam pattern of a 4×4 array of antenna elements for another scan angle for another example of an antenna pattern configuration with eight active antenna elements.
Figure 13I:
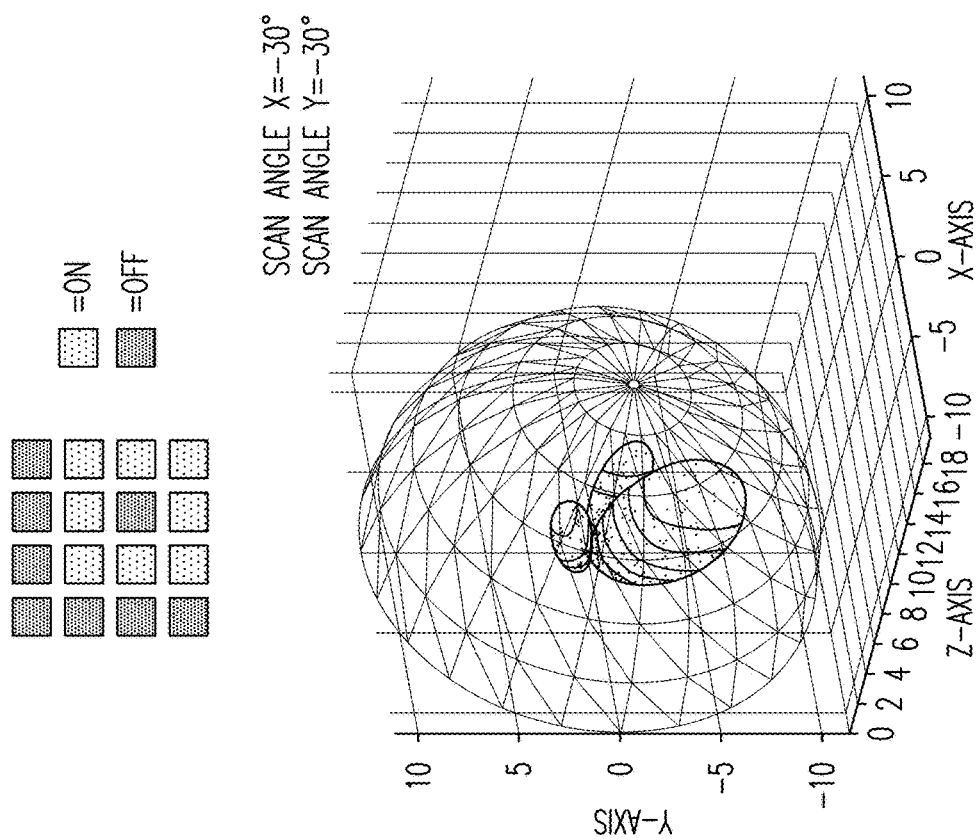
FIG. 13I is graph of simulated beam pattern of a 4×4 array of antenna elements for another scan angle for another example of an antenna pattern configuration with eight active antenna elements.

FIG. 13I is graph of simulated beam pattern of a 4×4 array of antenna elements for another scan angle for another example of an antenna pattern configuration with eight active antenna elements.

FIG. 13J is graph of simulated beam pattern of a 4×4 array of antenna elements for another scan angle for another example of an antenna pattern configuration with eight active antenna elements.

Figure 13L:
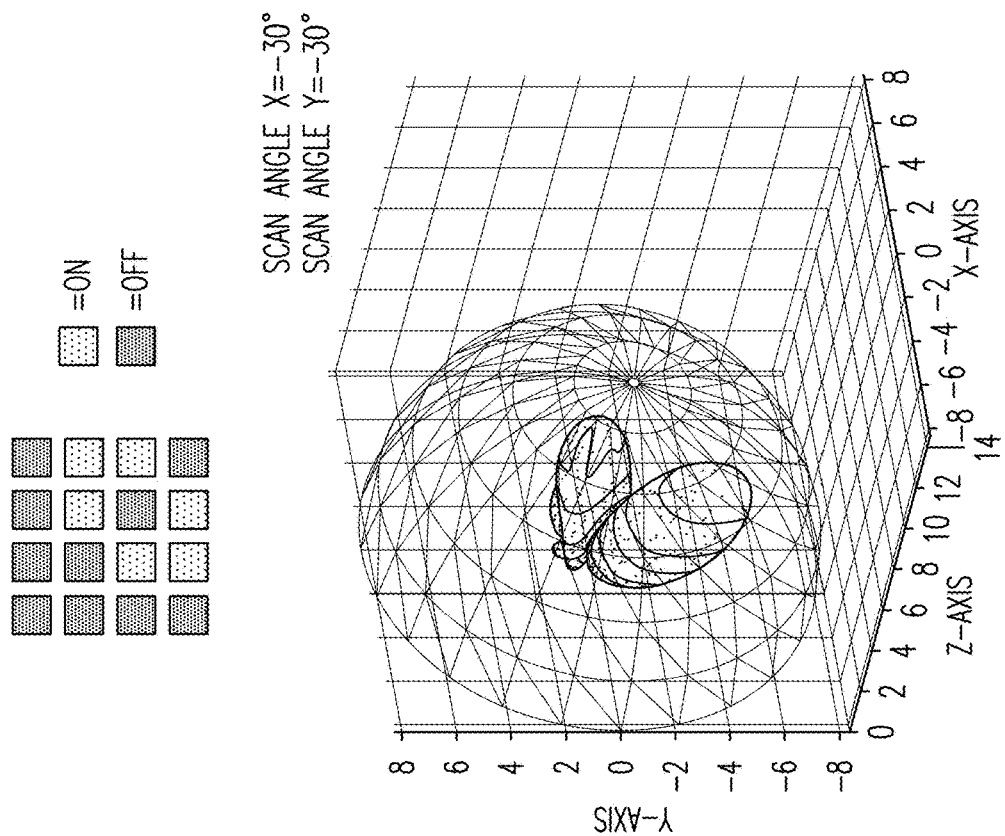
FIG. 13L is graph of simulated beam pattern of a 4×4 array of antenna elements for another scan angle for one example of an antenna pattern configuration with six active antenna elements.
Figure 13K:
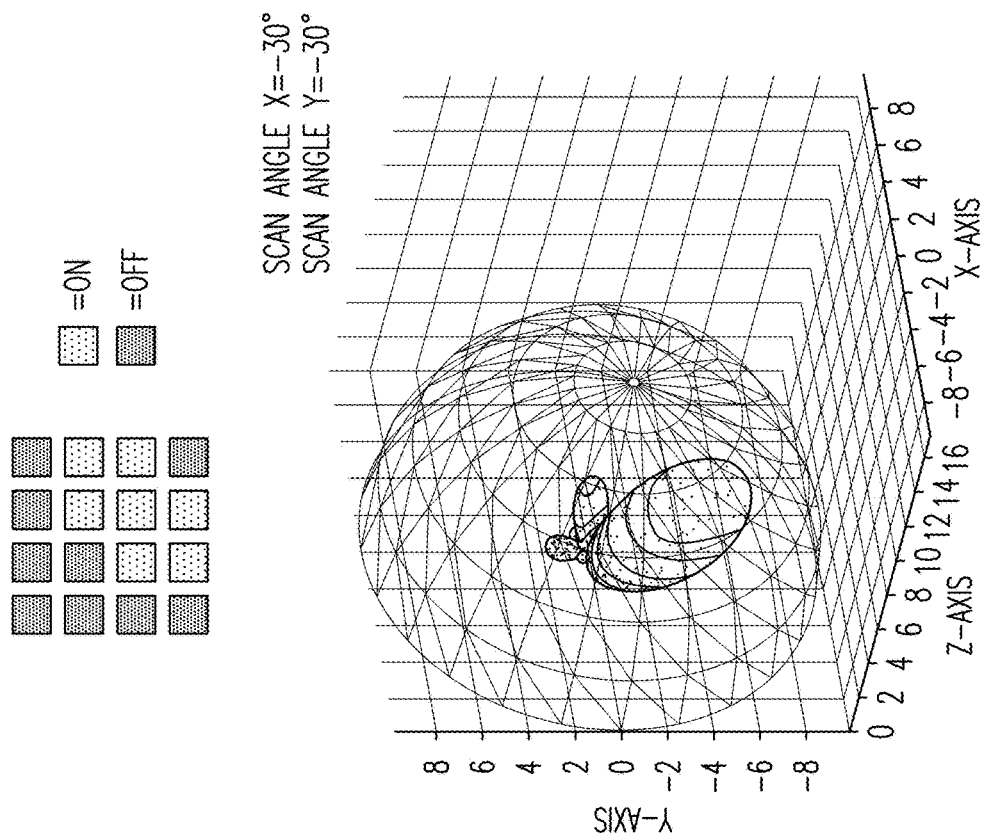
FIG. 13K is graph of simulated beam pattern of a 4×4 array of antenna elements for another scan angle for one example of an antenna pattern configuration with seven active antenna elements.

FIG. 13K is graph of simulated beam pattern of a 4×4 array of antenna elements for another scan angle for one example of an antenna pattern configuration with seven active antenna elements.

FIG. 13L is graph of simulated beam pattern of a 4×4 array of antenna elements for another scan angle for one example of an antenna pattern configuration with six active antenna elements.

Figure 13N:
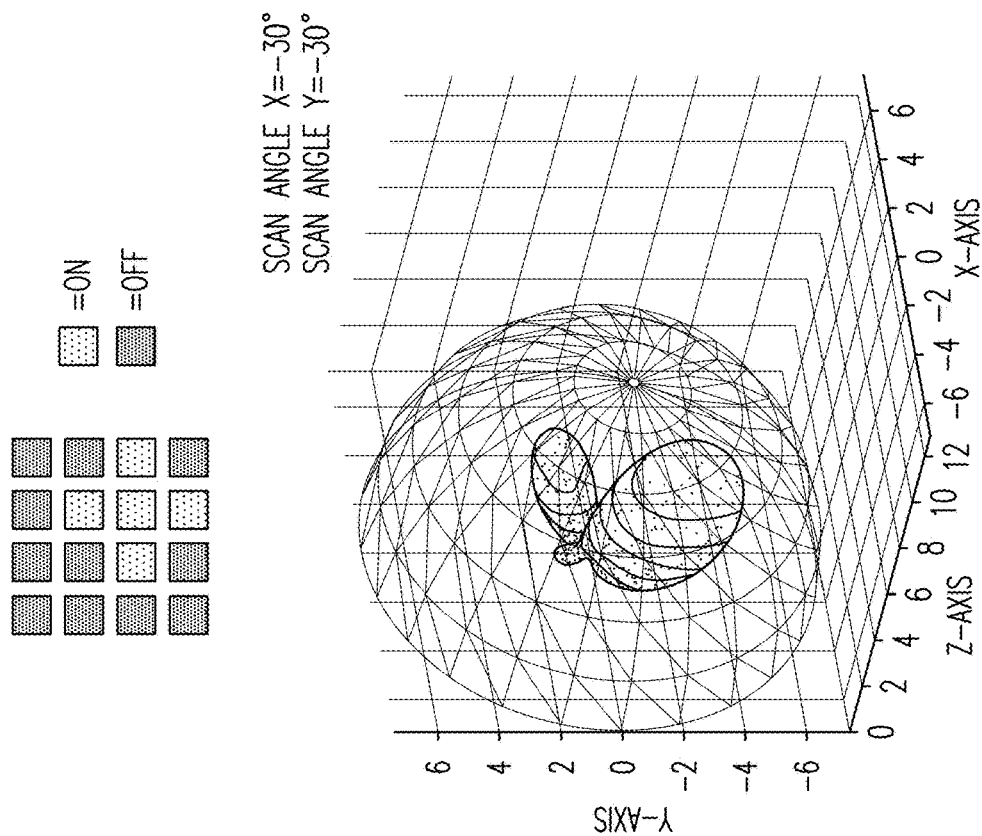
FIG. 13N is graph of simulated beam pattern of a 4×4 array of antenna elements for one scan angle for one example of an antenna pattern configuration with five active antenna elements.
Figure 13M:
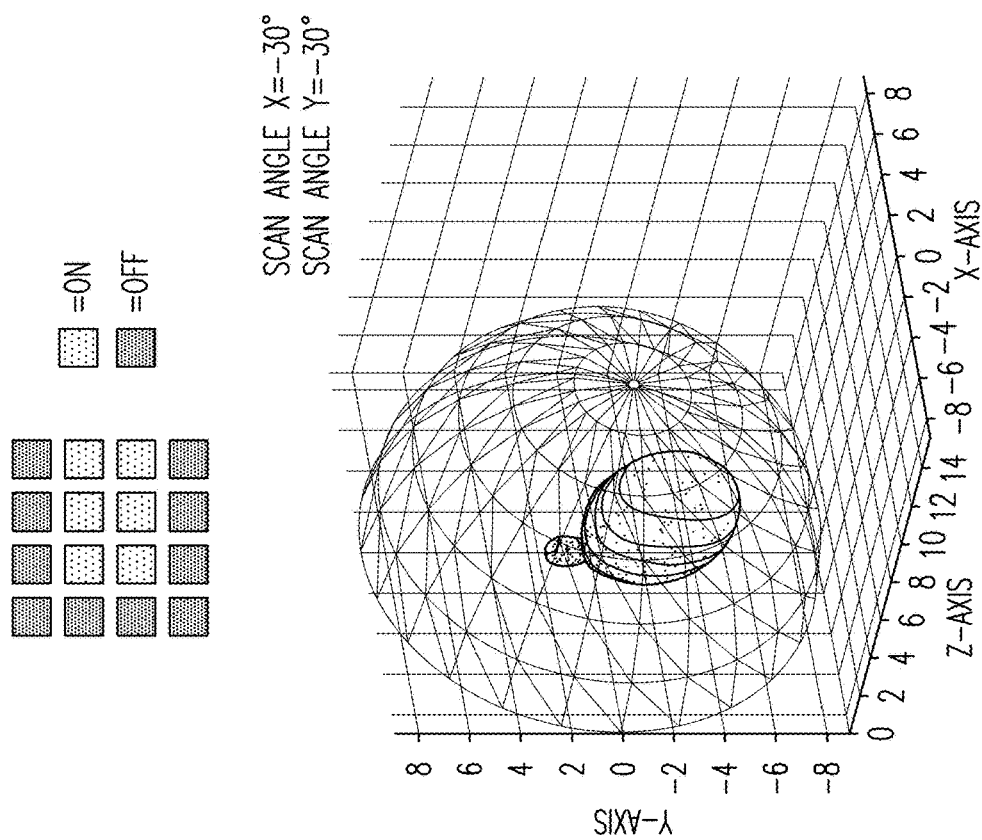
FIG. 13M is graph of simulated beam pattern of a 4×4 array of antenna elements for another scan angle for another example of an antenna pattern configuration with six active antenna elements.

FIG. 13M is graph of simulated beam pattern of a 4×4 array of antenna elements for another scan angle for another example of an antenna pattern configuration with six active antenna elements.

FIG. 13N is graph of simulated beam pattern of a 4×4 array of antenna elements for one scan angle for one example of an antenna pattern configuration with five active antenna elements.

Figure 13P:
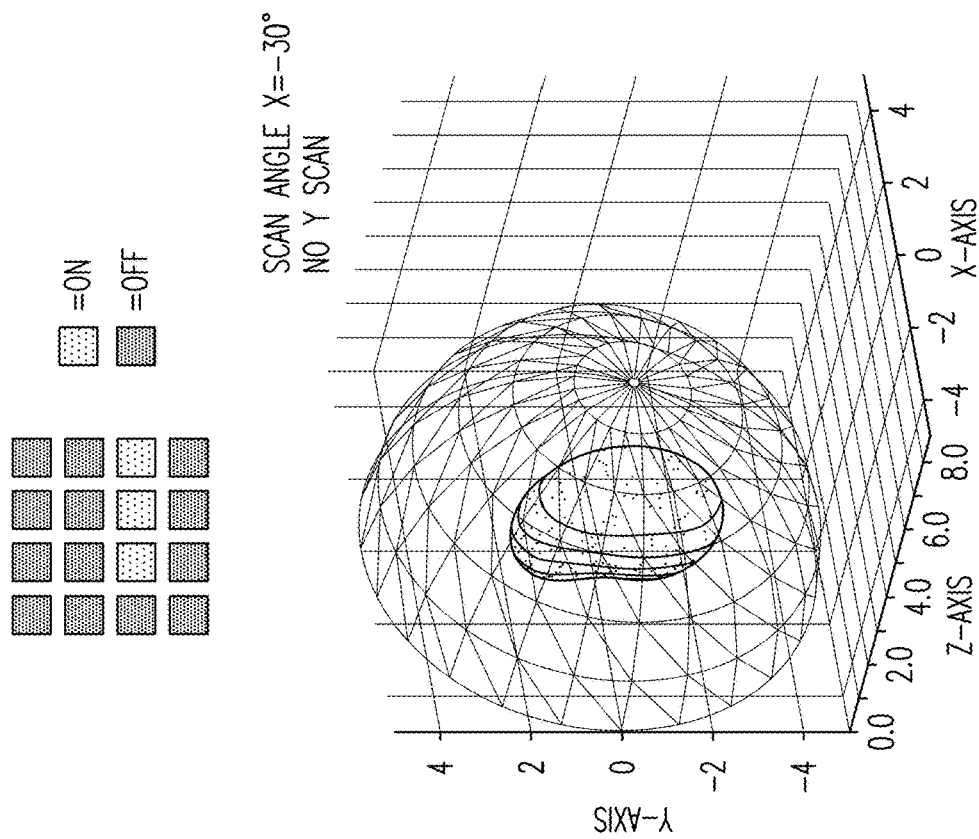
FIG. 13P is graph of simulated beam pattern of a 4×4 array of antenna elements for another scan angle for one example of an antenna pattern configuration with three active antenna elements.
Figure 13O:
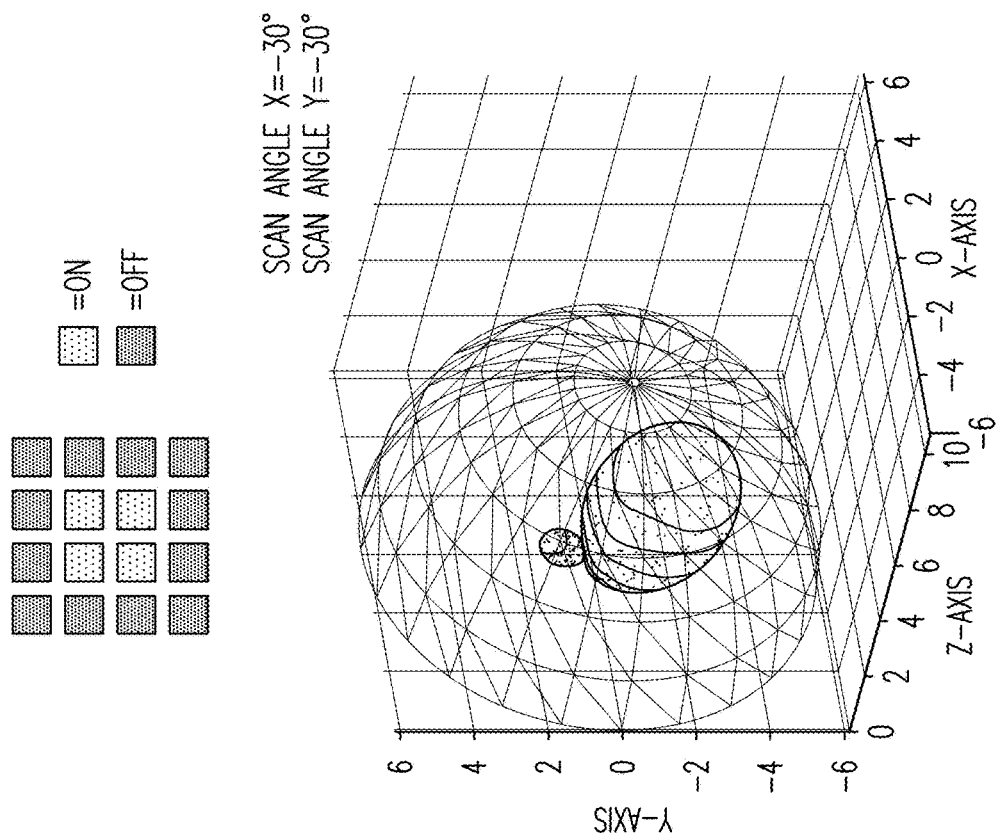
FIG. 13O is graph of simulated beam pattern of a 4×4 array of antenna elements for another scan angle for one example of an antenna pattern configuration with four active antenna elements.

FIG. 13O is graph of simulated beam pattern of a 4×4 array of antenna elements for another scan angle for one example of an antenna pattern configuration with four active antenna elements.

FIG. 13P is graph of simulated beam pattern of a 4×4 array of antenna elements for another scan angle for one example of an antenna pattern configuration with three active antenna elements.

Figure 13R:
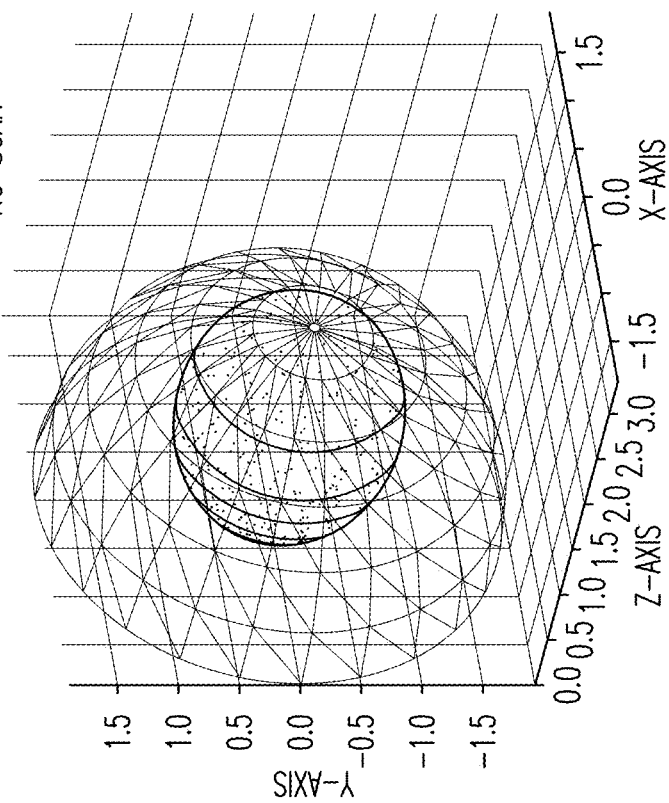
FIG. 13R is graph of simulated beam pattern of a 4×4 array of antenna elements for another scan angle for one example of an antenna pattern configuration with one active antenna elements.
Figure 13Q:
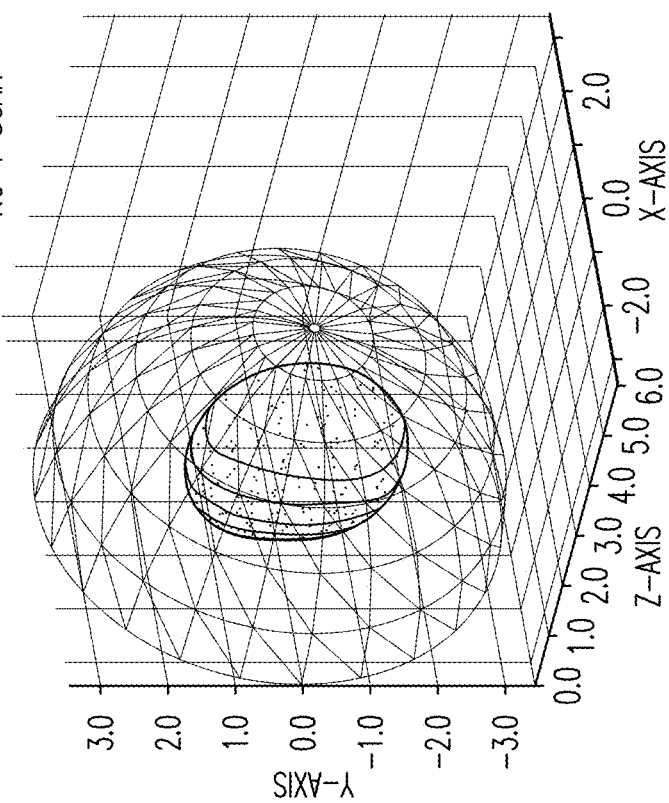
FIG. 13Q is graph of simulated beam pattern of a 4×4 array of antenna elements for another scan angle for one example of an antenna pattern configuration with two active antenna elements.

FIG. 13Q is graph of simulated beam pattern of a 4×4 array of antenna elements for another scan angle for one example of an antenna pattern configuration with two active antenna elements.

FIG. 13R is graph of simulated beam pattern of a 4×4 array of antenna elements for another scan angle for one example of an antenna pattern configuration with one active antenna elements.

With reference to FIGS. 13A-13R, each antenna element is graphically depicted with a fill to indicate whether a particular antenna element is in an activated or ON state or in a deactivated or OFF state. The graphs have also been annotated to show the scan angle for the particular simulated antenna pattern configuration. For FIGS. 13A-13O, the simulations correspond to a scan angle of about −30° with respect to the x-axis and about −30° with respect to the y-axis. Additionally, for FIGS. 13P and 13Q, the simulations correspond to a scan angle of about −30° with respect to the x-axis and about 0° with respect to the y-axis. Furthermore, for FIG. 13R, the simulations correspond to a scan angle of about 0° with respect to the x-axis and about 0° with respect to the y-axis.

With reference to FIGS. 12A-13R, the simulation results relate to beamforming in which antenna pattern configuration provides power control. The simulation results reflect not only conducted power, but also beamforming gain.

As shown by the simulation results, beamforming can result in both a main lobe of energy as well as one or more side lobes of energy. In certain implementations, the main lobe is used for wireless signal communication. Additionally, an antenna pattern configuration is changed to provide power control, thereby changing a magnitude of the beam with relatively small impact on main-lobe width, main-lobe pointing direction, and/or change to side lobes. Thus, power control can be provided while maintaining robust beam characteristics.

In certain implementations, main beam width becomes more focused as a number of active antenna elements increases. For example, as the actual power is increased and the main beam narrows, a magnified increase in EIRP (for instance, an average 2 dB EIRP increase for each 1 dB increase in actual power) is provided, while maintaining the main lobe direction within a few degrees.

Although one example of simulation results is shown, simulation results can vary based on a wide variety of factors, including, but not limited to, simulation parameters (including operating frequency), antenna models, and/or simulation tools.

Examples of Modules and Devices Applicable to Beamforming Communication Systems

Beamforming communication systems can be implemented using a wide variety of modules, semiconductor dies, and/or other components. Furthermore, beamforming communications systems can be included a wide variety of devices, including, but not limited to, mobile phones, tablets, base stations, network access points, customer-premises equipment (CPE), laptops, and wearable electronics. For example, modules, semiconductor dies, and/or other components can be included on circuit boards used in such devices.

Although various examples of such RF electronics is provided below, the teachings herein are applicable to RF electronics implemented in a wide variety of ways. Accordingly, other implementations are possible.

Figure 14:
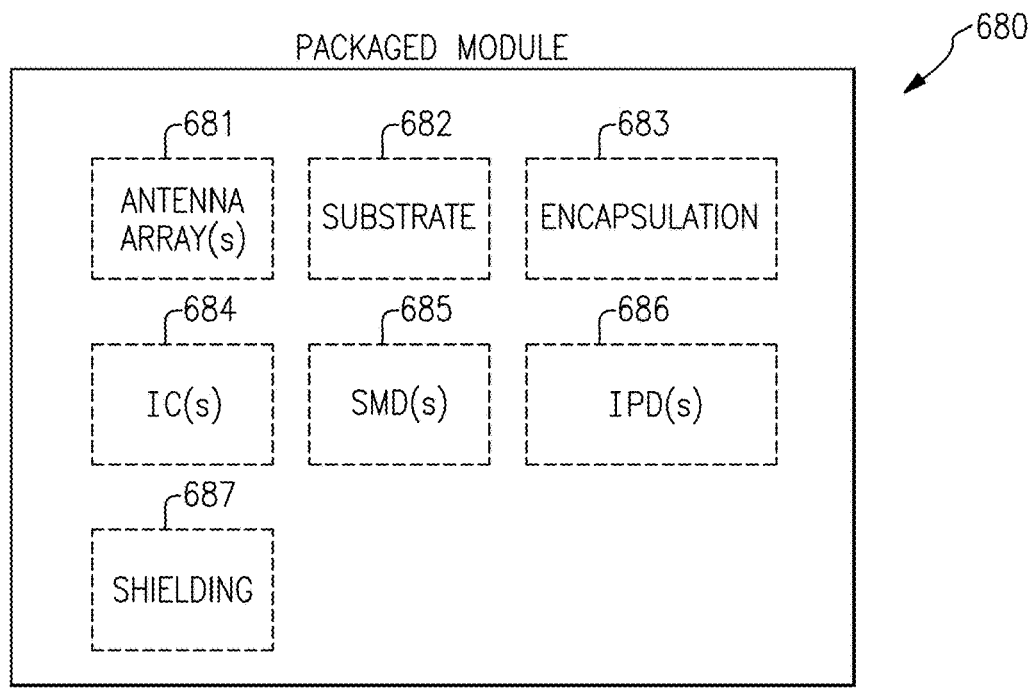
FIG. 14 is a schematic diagram of one embodiment of a module.

FIG. 14 is a schematic diagram of one embodiment of a module 680. The module 680 includes antenna array(s) 681, a substrate 682, encapsulation 683, IC(s) 684, surface mound device(s) or SMD(s) 685, integrated passive device(s) or IPD(s) 686, and shielding 687. The module 680 illustrates various examples of components and structures that can be included in a module of a communication device that provides beam control.

Although one example of a combination of components and structures is shown, a module can include more or fewer components and/or structures.

Figure 15A:
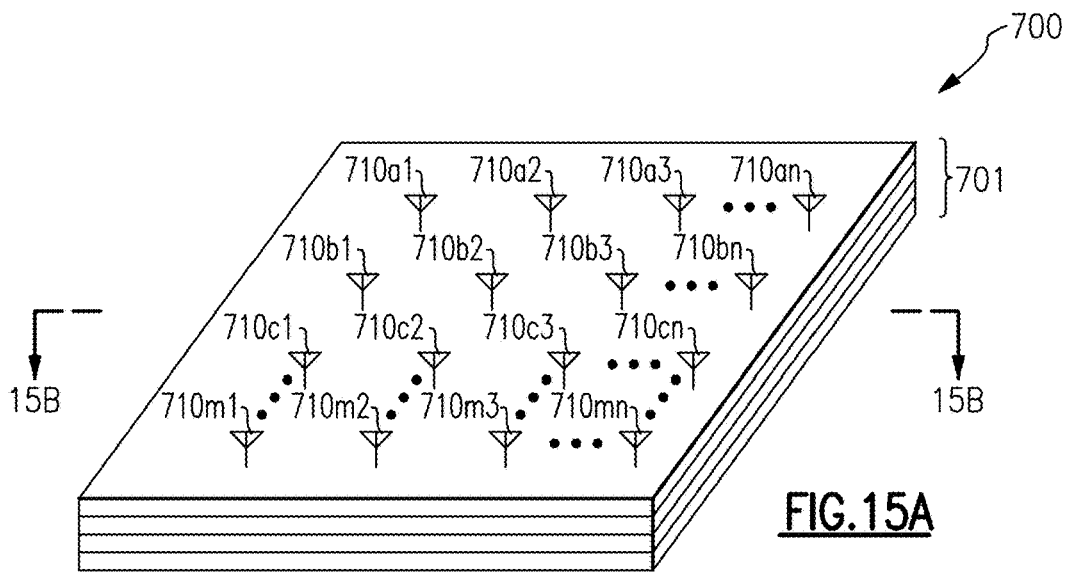
FIG. 15A is a perspective view of another embodiment of a module.
Figure 15B:
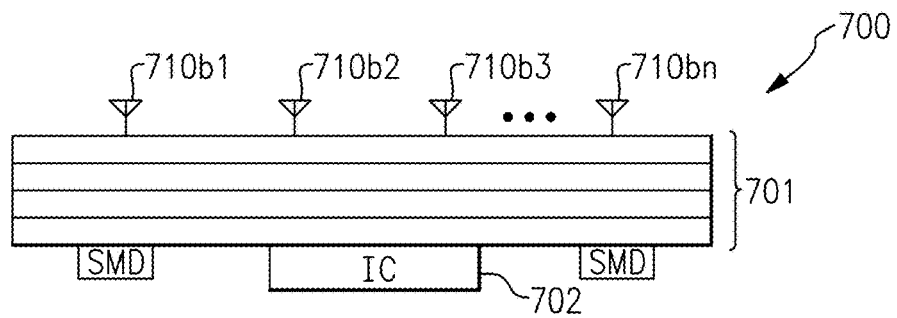
FIG. 15B is a cross-section of the module of FIG. 15A taken along the lines 15B-15B.

FIG. 15A is a perspective view of another embodiment of a module 700. FIG. 15B is a cross-section of the module 700 of FIG. 15A taken along the lines 15B-15B.

The module 700 includes a laminated substrate or laminate 701, a semiconductor die or IC 702 (not visible in FIG. 15A), SMDs (not visible in FIG. 15A), and an antenna array including antenna elements $710a1, 710a2, 710a3 \ldots 710an, 710b1, 710b2, 710b3 \ldots 710bn, 710c1, 710c2, 710c3 \ldots 710cn, 710m1, 710m2, 710m3 \ldots 710mn$.

Although not shown in FIGS. 15A and 15B, the module 700 can include additional structures and components that have been omitted from the figures for clarity. Moreover, the module 700 can be modified or adapted in a wide variety of ways as desired for a particular application and/or implementation.

The antenna elements antenna elements $710a1, 710a2, 710a3 \ldots 710an, 710b1, 710b2, 710b3 \ldots 710bn, 710c1, 710c2, 710c3 \ldots 710cn, 710m1, 710m2, 710m3 \ldots 710mn$ are formed on a first surface of the laminate 701, and can be used to receive and/or transmit signals, based on implementation. Although a 4×4 array of antenna elements is shown, more or fewer antenna elements are possible as indicated by ellipses. Moreover, antenna elements can be arrayed in other patterns or configurations, including, for instance, arrays using non-uniform arrangements of antenna elements. Furthermore, in another embodiment, multiple antenna arrays are provided, such as separate antenna arrays for transmit and receive.

In the illustrated embodiment, the IC 702 is on a second surface of the laminate 701 opposite the first surface. However, other implementations are possible. In one example, the IC 702 is integrated internally to the laminate 701.

In certain implementations, the IC 702 includes signal conditioning circuits associated with the antenna elements $710a1, 710a2, 710a3 \ldots 710an, 710b1, 710b2, 710b3 \ldots 710bn, 710c1, 710c2, 710c3 \ldots 710cn, 710m1, 710m2, 710m3 \ldots 710mn$, and an antenna array management circuit that achieves a desired level of power control based on generating the control signals for the signal conditioning circuits to select an antenna pattern configuration associated with a desired power control level. Although an implementation with one semiconductor chip is shown, the teachings herein are applicable to implementations with additional chips.

The laminate 701 can include various structures including, for example, conductive layers, dielectric layers, and/or solder masks. The number of layers, layer thicknesses, and materials used to form the layers can be selected based on a wide variety of factors, and can vary with application and/or implementation. The laminate 701 can include vias for providing electrical connections to signal feeds and/or ground feeds of the antenna elements. For example, in certain implementations, vias can aid in providing electrical connections between signal conditioning circuits of the IC 702 and corresponding antenna elements.

The antenna elements $710a1, 710a2, 710a3 \ldots 710an, 710b1, 710b2, 710b3 \ldots 710bn, 710c1, 710c2, 710c3 \ldots 710cn, 710m1, 710m2, 710m3 \ldots 710mn$ can correspond to antenna elements implemented in a wide variety of ways. In one example, the array of antenna elements includes patch antenna element formed from a patterned conductive layer on the first side of the laminate 701, with a ground plane formed using a conductive layer on opposing side of the laminate 701 or internal to the laminate 701. Other examples of antenna elements include, but are not limited to, dipole antenna elements, ceramic resonators, stamped metal antennas, and/or laser direct structuring antennas.

Figure 16:
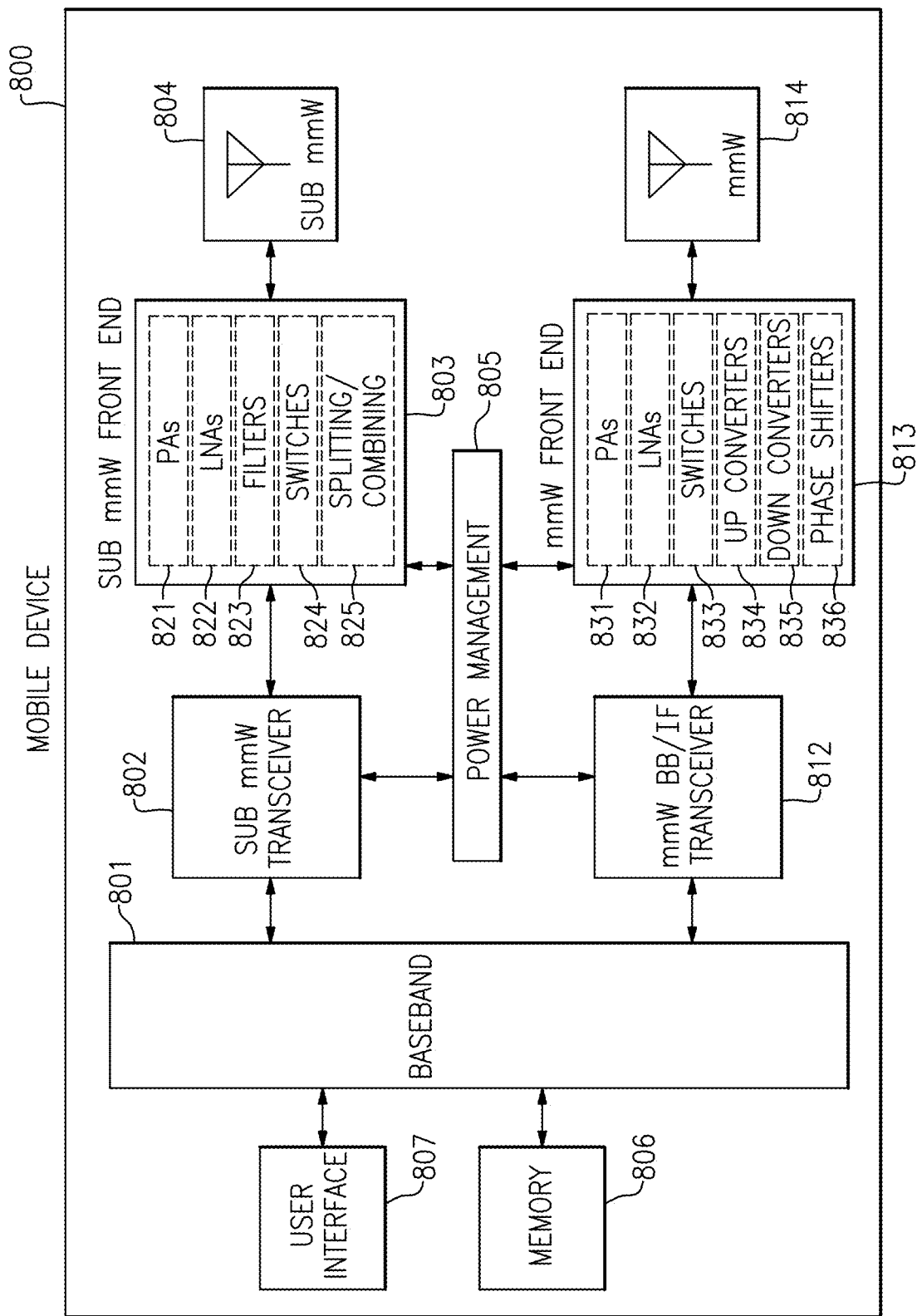
FIG. 16 is a schematic diagram of one embodiment of a mobile device.

FIG. 16 is a schematic diagram of one embodiment of a mobile device 800. The mobile device 800 includes a baseband system 801, a sub millimeter wave (mmW) transceiver 802, a sub mmW front end system 803, sub mmW antennas 804, a power management system 805, a memory 806, a user interface 807, a mmW baseband (BB)/intermediate frequency (IF) transceiver 812, a mmW front end system 813, and mmW antennas 814.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

In the illustrated embodiment, the sub mmW transceiver 802, sub mmW front end system 803, and sub mmW antennas 804 serve to transmit and receive centimeter waves and other radio frequency signals below millimeter wave frequencies. Additionally, the mmW BB/IF transceiver 812, mmW front end system 813, and mmW antennas 814 serve to transmit and receive millimeter waves. Although one specific example is shown, other implementations are possible, including, but not limited to, mobile devices operating using circuitry operating over different frequency ranges and wavelengths.

The sub mmW transceiver 802 generates RF signals for transmission and processes incoming RF signals received from the sub mmW antennas 804. It will be understood that various functionalities associated with the transmission and receiving of RF signals can be achieved by one or more components that are collectively represented in FIG. 16 as the sub mmW transceiver 802. In one example, separate components (for instance, separate circuits or dies) can be provided for handling certain types of RF signals.

The sub mmW front end system 803 aids is conditioning signals transmitted to and/or received from the antennas 804. In the illustrated embodiment, the front end system 803 includes power amplifiers (PAs) 821, low noise amplifiers (LNAs) 822, filters 823, switches 824, and signal splitting/combining circuitry 825. However, other implementations are possible.

For example, the sub mmW front end system 803 can provide a number of functionalizes, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The sub mmW antennas 804 can include antennas used for a wide variety of types of communications. For example, the sub mmW antennas 804 can include antennas for transmitting and/or receiving signals associated with a wide variety of frequencies and communications standards.

The mmW BB/IF transceiver 812 generates millimeter wave signals for transmission and processes incoming millimeter wave signals received from the mmW antennas 814. It will be understood that various functionalities associated with the transmission and receiving of RF signals can be achieved by one or more components that are collectively represented in FIG. 16 as the mmW transceiver 812. The mmW BB/IF transceiver 812 can operate at baseband or intermediate frequency, based on implementation.

The mmW front end system 813 aids is conditioning signals transmitted to and/or received from the mmW antennas 814. In the illustrated embodiment, the front end system 803 includes power amplifiers 831, low noise amplifiers 832, switches 833, up converters 834, down converters 835, and phase shifters 836. However, other implementations are possible. In one example, the mobile device 800 operates with a BB mmW transceiver, and up converters and down-converters are omitted from the mmW front end system. In another example, the mmW front end system further includes filters for filtering millimeter wave signals.

The mmW antennas 814 can include antennas used for a wide variety of types of communications. The mmW antennas 814 can include antenna elements implemented in a wide variety of ways, and in certain configurations the antenna elements are arranged to form one or more antenna arrays. Examples of antenna elements for millimeter wave antenna arrays include, but are not limited to, patch antennas, dipole antenna elements, ceramic resonators, stamped metal antennas, and/or laser direct structuring antennas.

In certain implementations, the mobile device 800 supports MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

In certain implementations, the mobile device 800 operates with beamforming. For example, the mmW front end system 803 includes amplifiers having controllable gain and phase shifters having controllable phase to provide beam formation and directivity for transmission and/or reception of signals using the mmW antennas 814. For example, in the context of signal transmission, the amplitude and phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antenna array from a particular direction.

The baseband system 801 is coupled to the user interface 807 to facilitate processing of various user input and output (I/O), such as voice and data. The baseband system 801 provides the sub mmW and mmW transceivers with digital representations of transmit signals, which are processed by the transceivers to generate RF signals for transmission. The baseband system 801 also processes digital representations of received signals provided by the transceivers. As shown in FIG. 16, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers of the front end systems. For example, the power management system 805 can be configured to change the supply voltage(s) provided to one or more of the power amplifiers to improve efficiency, such as power added efficiency (PAE).

In certain implementations, the power management system 805 receives a battery voltage from a battery. The battery can be any suitable battery for use in the mobile device 800, including, for example, a lithium-ion battery.

Figure 17A:
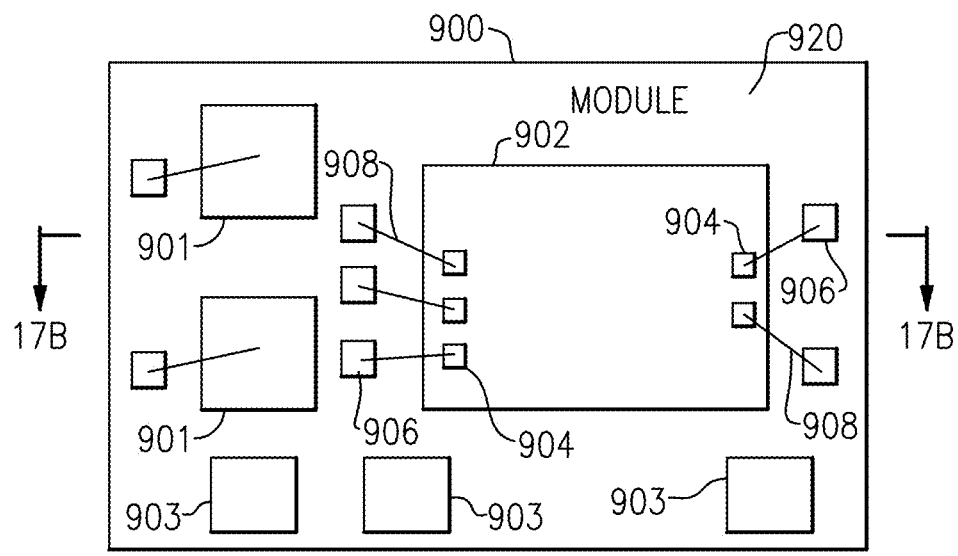
FIG. 17A is a schematic diagram of another embodiment of a module.
Figure 17B:
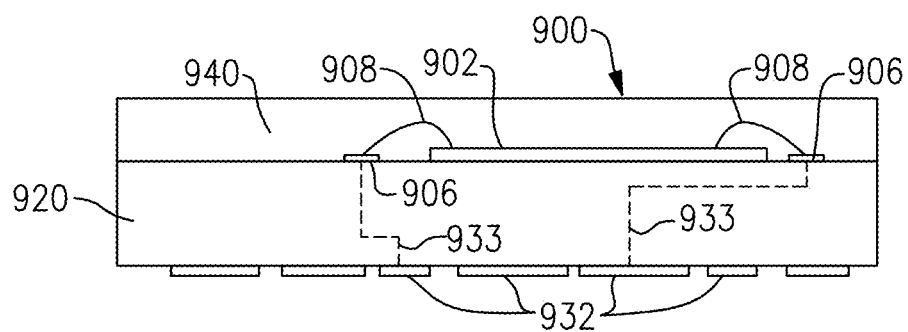
FIG. 17B is a schematic diagram of a cross-section of the module of FIG. 17A taken along the lines 17B-17B.

FIG. 17A is a schematic diagram of another embodiment of a module 900. FIG. 17B is a schematic diagram of a cross-section of the module 900 of FIG. 17A taken along the lines 17B-17B.

The module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

In certain implementations, the semiconductor die 902 includes signal conditioning circuits associated with antenna elements of an antenna array, and an antenna array management circuit that achieves a desired level of power control based on generating the control signals for the signal conditioning circuits to select an antenna pattern configuration associated with a desired power control level. Although an implementation with one semiconductor chip is shown, the teachings herein are applicable to implementations with additional chips.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 17B, the module 900 is shown to include a plurality of contact pads 932 disposed on the side of the module 900 opposite the side used to mount the semiconductor die 902. Configuring the module 900 in this manner can aid in connecting the module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 17B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the module 900 is described in the context of electrical connections based on wirebonds, one or more features of the present disclosure can also be implemented in other packaging configurations, including, for example, flip-chip configurations.

Figure 18A:
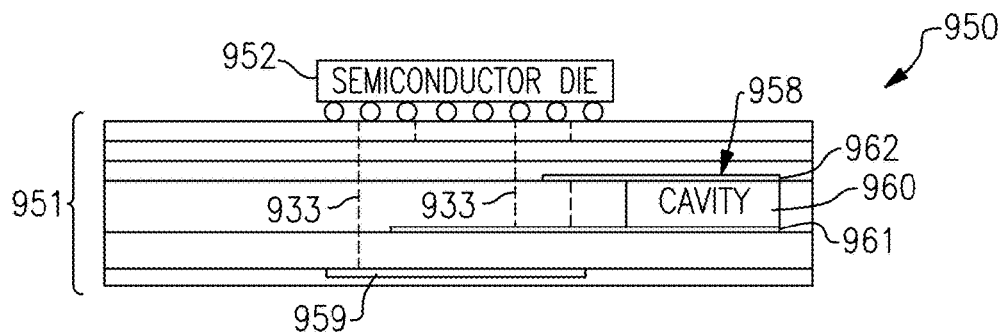
FIG. 18A is a schematic diagram of a cross-section of another embodiment of a module.

FIG. 18A is a schematic diagram of a cross-section of another embodiment of a module 950. The module 950 includes a laminated package substrate 951 and a flip-chip semiconductor die 952.

The laminated package substrate 951 includes a cavity-based antenna 958 associated with an air cavity 960, a first conductor 961, a second conductor 962. The laminated package substrate 951 further includes a planar antenna 959.

In certain implementations herein, a module includes one or more integrated antennas. For example, the module 950 of FIG. 18A includes the cavity-based antenna 958 and the planar antenna 959. By including antennas facing in multiple directions (including, but not limited to, directions that are substantially perpendicular to one another), a range of available angles for communications can be increased. Although one example of a module with integrated antennas is shown, the teachings herein are applicable to modules implemented in a wide variety of ways.

In certain implementations, the semiconductor die 952 includes signal conditioning circuits associated with antenna elements of an antenna array, and an antenna array management circuit that achieves a desired level of power control based on generating the control signals for the signal conditioning circuits to select an antenna pattern configuration associated with a desired power control level. Although an implementation with one semiconductor chip is shown, the teachings herein are applicable to implementations with additional chips.

Figure 18B:
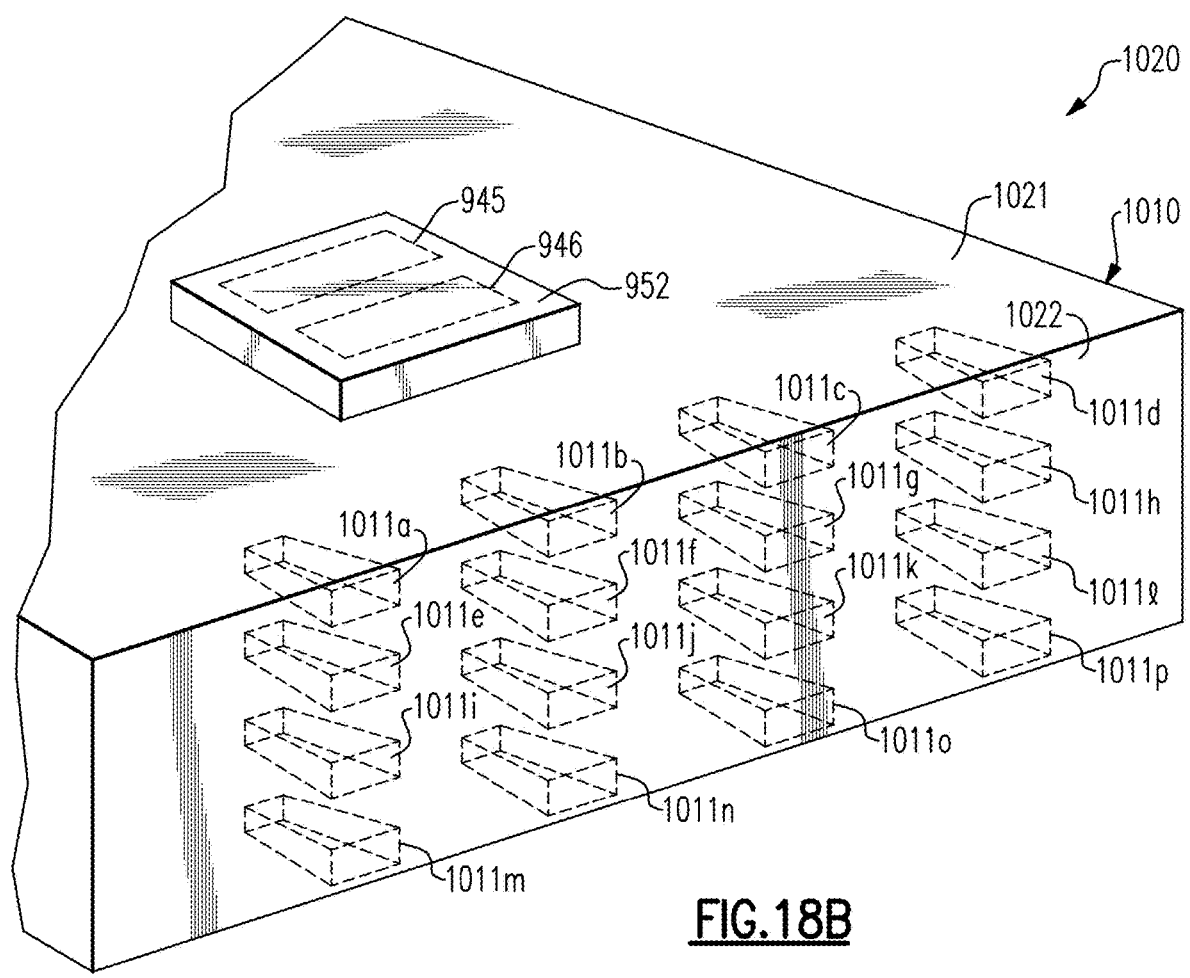
FIG. 18B is a perspective view of another embodiment of a module.

FIG. 18B is a perspective view of another embodiment of a module 1020. The module 1020 includes a laminated substrate 1010 and a semiconductor die 1012. The semiconductor die 1012 includes at least one of a front end system 945 or a transceiver 946. For example, the front end system 945 can include signal conditioning circuits, such as controllable amplifiers and/or controllable phase shifters, to aid in providing beamforming.

In the illustrated the embodiment, cavity-based antennas 1011a-1011p have been formed on an edge 1022 of the laminated substrate 1010. In this example, sixteen cavity-based antennas have been provided in a four-by-four (4×4) array. However, more or fewer antennas can be included and/or antennas can be arrayed in other patterns.

In another embodiment, the laminated substrate 1010 further include another antenna array (for example, a patch antenna array) formed on a second major surface of the laminated substrate 1010 opposite the first major surface 1021. Implementing the module 1020 aids in increasing a range of angles over which the module 1020 can communicate.

The module 1020 illustrates another embodiment of a module including an array of antennas that are controllable to provide beamforming. Implementing an array of antennas on a side of module aids in communicating at certain angles and/or directions that may otherwise be unavailable due to environmental blockage. Although an example with cavity-based antennas is shown, the teachings herein are applicable to implementations using other types of antennas.

Applications

The principles and advantages of the embodiments described herein can be used for a wide variety of applications.

For example, dynamically managed antenna arrays can be included in various electronic devices, including, but not limited to consumer electronic products, parts of the consumer electronic products, electronic test equipment, etc. Example electronic devices include, but are not limited to, a base station, a wireless network access point, a mobile phone (for instance, a smartphone), a tablet, a television, a computer monitor, a computer, a hand-held computer, a personal digital assistant (PDA), a microwave, a refrigerator, an automobile, a stereo system, a disc player, a digital camera, a portable memory chip, a washer, a dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A beamforming communication system comprising:
   an antenna array including a plurality of antenna elements;
   a plurality of signal conditioning circuits, each signal conditioning circuit operatively associated with a corresponding one of the plurality of antenna elements;
   an antenna array management circuit configured to generate a plurality of control signals each operable to individually control a corresponding one of the plurality of signal conditioning circuits to operate the antenna array in a selected antenna pattern configuration, the selected antenna pattern configuration chosen from a plurality of antenna pattern configurations providing different levels of power control; and
   a power amplifier output tuning control circuit configured to tune an output impedance of each power amplifier to compensate for variation in output impedance associated with a selected antenna pattern configuration.

2. The beamforming communication system of claim 1 wherein the plurality of control signals are each operable to set a corresponding signal conditioning circuit in an on state or an off state.

3. The beamforming communication system of claim 1 wherein the plurality of control signals are each operable to set a corresponding signal conditioning circuit in an on state, an off state, or an attenuated state, the attenuated state providing a portion of a gain provided by the on state.

4. The beamforming communication system of claim 1 wherein the selected antenna pattern configuration provides a coarse power control adjustment.

5. The beamforming communication system of claim 4 wherein the selected antenna pattern configuration includes one or more active antenna elements, the antenna array management circuit further configured to provide a fine power control adjustment by setting a signal path gain of each of the one or more active antenna elements.

6. The beamforming communication system of claim 1 further comprising a plurality of antenna termination circuits each connected to a corresponding one of the plurality of antenna elements, the antenna array management circuit further configured to control the plurality of antenna termination circuits based on the selected antenna pattern configuration.

7. The beamforming communication system of claim 6 wherein the selected antenna pattern configuration includes one or more inactive antenna elements, the antenna array management circuit further configured to terminate each of the one or more inactive antenna elements using the corresponding one of the plurality of antenna termination circuits.

8. The beamforming communication system of claim 1 wherein each of the plurality of signal conditioning circuits includes a power amplifier, the beamforming communication system further comprising a tunable output impedance circuit.

9. The beamforming communication system of claim 1 wherein each of the plurality of signal conditioning circuits includes a low noise amplifier, the beamforming communication system further comprising a low noise amplifier input tuning control circuit configured to tune an input impedance of each low noise amplifier to compensate for variation in input impedance associated with the selected antenna pattern configuration.

10. A radio frequency module for a beamforming communication system, the radio frequency module comprising:
    a substrate;
    an antenna array attached to the substrate and including a plurality of antenna elements; and
    a semiconductor die attached to the substrate and including a plurality of signal conditioning circuits, each signal conditioning circuit operatively associated with a corresponding one of the plurality of antenna elements, the semiconductor die further including an antenna array management circuit configured to generate a plurality of control signals each operable to individually control a corresponding one of the plurality of signal conditioning circuits to operate the antenna array in a selected antenna pattern configuration, the selected antenna pattern configuration chosen from a plurality of antenna pattern configurations providing different levels of power control, the semiconductor die further including a power amplifier output tuning control circuit configured to tune an output impedance of each power amplifier to compensate for variation in output impedance associated with a selected antenna pattern configuration.

11. The radio frequency module of claim 10 wherein the plurality of control signals are each operable to set a corresponding signal conditioning circuit in an on state, an off state, or an attenuated state, the attenuated state providing a portion of a gain provided by the on state.

12. The radio frequency module of claim 10 wherein the selected antenna pattern configuration provides a coarse power control adjustment.

13. The radio frequency module of claim 12 wherein the selected antenna pattern configuration includes one or more active antenna elements, the antenna array management circuit further configured to provide a fine power control adjustment by setting a signal path gain of each of the one or more active antenna elements.

14. A method of power control in a beamforming communication system, the method comprising:

selecting an antenna pattern configuration from a plurality of available antenna pattern configurations providing different levels of power control;

generating a plurality of control signals based on the selected antenna pattern configuration using an antenna array management circuit;

operating an array of antenna elements in the selected antenna pattern configuration by controlling a plurality of signal conditioning circuits with the plurality of control signals, each of the plurality of signal conditioning circuits coupled to a corresponding antenna element of the array; and tuning an output impedance of each power amplifier to compensate for variation in output impedance associated with the selected antenna pattern configuration.

15. The method of claim 14 wherein controlling the plurality of signal conditioning circuits with the plurality of control signals includes individually setting each signal conditioning circuit in an on state, an off state, or an attenuated state, the attenuated state providing a portion of a gain provided by the on state.

16. The method of claim 14 further comprising providing a coarse power control adjustment using the selected antenna pattern configuration.

17. The method of claim 16 wherein the selected antenna pattern configuration includes one or more active antenna elements chosen from the array of antenna elements, the method further comprising providing a fine power control adjustment by setting a signal path gain of each of the one or more active antenna elements.

18. The method of claim 14 further comprising controlling a plurality of antenna termination circuits based on the selected antenna pattern configuration, each of the plurality of antenna termination circuits connected to a corresponding antenna element of the array.

19. The method of claim 14 further wherein each of the plurality of signal conditioning circuits includes a power amplifier, the method further comprising tuning a tunable output impedance circuit.

20. The method of claim 14 wherein each of the plurality of signal conditioning circuits includes a low noise amplifier, the method further comprising tuning an input impedance of each low noise amplifier to compensate for variation in input impedance associated with pattern the selected antenna pattern configuration.

* * * * *